United States Patent
Corum et al.

(10) Patent No.: US 10,630,111 B2
(45) Date of Patent: Apr. 21, 2020

(54) ADJUSTMENT OF GUIDED SURFACE WAVEGUIDE PROBE OPERATION

(71) Applicant: CPG Technologies, LLC, Italy, TX (US)

(72) Inventors: James F. Corum, Morgantown, WV (US); Kenneth L. Corum, Plymouth, NH (US)

(73) Assignee: CPG TECHNOLOGIES, LLC, Italy, TX (US)

( * ) Notice: Subject to any disclaimer, the term of this patent is extended or adjusted under 35 U.S.C. 154(b) by 194 days.

(21) Appl. No.: 15/909,596

(22) Filed: Mar. 1, 2018

(65) Prior Publication Data

US 2018/0262053 A1    Sep. 13, 2018

Related U.S. Application Data

(60) Provisional application No. 62/468,130, filed on Mar. 7, 2017.

(51) Int. Cl.

| H02J 50/12 | (2016.01) |
|---|---|
| H01P 5/00 | (2006.01) |
| H02J 50/20 | (2016.01) |
| H04B 13/00 | (2006.01) |
| H01Q 1/36 | (2006.01) |
| H02J 50/27 | (2016.01) |
| H02J 50/23 | (2016.01) |

(52) U.S. Cl.
CPC ............... *H02J 50/12* (2016.02); *H01P 5/00* (2013.01); *H01Q 1/36* (2013.01); *H02J 50/20* (2016.02); *H02J 50/23* (2016.02); *H02J 50/27* (2016.02); *H04B 13/00* (2013.01)

(58) Field of Classification Search
CPC    H04B 3/52; H04B 5/0037; H04B 7/00; H02J 17/00; H02J 50/20; H01P 3/00; H01P 5/00
See application file for complete search history.

(56) References Cited

U.S. PATENT DOCUMENTS

| 645,576 A | 3/1900 | Tesla |
|---|---|---|
| 649,621 A | 5/1900 | Tesla |
| 685,012 A | 10/1901 | Tesla |
| 685,953 A | 11/1901 | Tesla |
| 685,954 A | 11/1901 | Tesla |

(Continued)

FOREIGN PATENT DOCUMENTS

| EP | 0639301 | 2/1995 |
|---|---|---|
| EP | 1898532 | 3/2008 |

(Continued)

OTHER PUBLICATIONS

Open Tesla Research, "The Wardenclyffe Laboratory & the World Wireless System (1901-1906)", 2013 (Year: 2013).*

(Continued)

*Primary Examiner* — Dean O Takaoka
*Assistant Examiner* — Alan Wong
(74) *Attorney, Agent, or Firm* — Thomas Horstemeyer, LLP

(57) ABSTRACT

Disclosed are various embodiments for transmitting and receiving energy conveyed in the form of a guided surface-waveguide mode along the surface of a lossy medium such as, e.g., a terrestrial medium excited by a guided surface waveguide probe.

20 Claims, 24 Drawing Sheets

(56) References Cited

U.S. PATENT DOCUMENTS

| | | |
|---|---|---|
| 685,955 A | 11/1901 | Tesla |
| 685,956 A | 11/1901 | Tesla |
| 723,188 A | 3/1903 | Tesla |
| 725,605 A | 4/1903 | Tesla |
| 787,412 A | 4/1905 | Tesla |
| 851,336 A | 4/1907 | Von Arco |
| 1,119,732 A | 12/1914 | Tesla |
| 1,452,849 A | 4/1923 | Round |
| 1,652,516 A | 12/1927 | Conrad |
| 1,691,338 A | 11/1928 | Conrad |
| 1,947,256 A | 2/1934 | Friis |
| 2,685,068 A | 7/1954 | Goubau |
| 2,921,277 A | 1/1960 | Goubau |
| 3,123,767 A | 3/1964 | Ghose |
| 3,219,954 A | 11/1965 | Rutelli |
| 3,445,844 A | 5/1969 | Grossi et al. |
| 3,582,838 A | 6/1971 | DeVries |
| 3,670,247 A | 6/1972 | Gutton et al. |
| 3,742,509 A | 6/1973 | De Bettencourt et al. |
| 3,742,511 A | 6/1973 | Smith et al. |
| 4,751,515 A | 6/1988 | Corum |
| 4,808,950 A | 2/1989 | Apostolos et al. |
| 5,045,825 A | 9/1991 | McJunkin |
| 5,074,489 A | 12/1991 | Gamzon |
| 5,155,495 A | 10/1992 | Hately et al. |
| 5,293,308 A | 3/1994 | Boys et al. |
| 5,301,096 A | 3/1994 | Klontz et al. |
| 5,714,917 A | 2/1998 | Ella |
| 5,835,067 A | 11/1998 | Goodman |
| 5,920,261 A | 7/1999 | Hughes |
| 6,025,813 A | 2/2000 | Hately et al. |
| 6,075,498 A | 6/2000 | Talwar |
| 6,104,107 A | 8/2000 | Avramenko et al. |
| 6,107,791 A | 8/2000 | Lee |
| 6,486,846 B1 | 11/2002 | Hart |
| 6,515,878 B1 | 2/2003 | Meins et al. |
| 6,650,556 B2 | 11/2003 | Dinh |
| 6,864,849 B2 | 3/2005 | Hart |
| 6,956,535 B2 | 10/2005 | Hart |
| 7,113,138 B2 | 9/2006 | Hately |
| 7,307,589 B1 | 12/2007 | Gregoire |
| 7,561,096 B2 | 7/2009 | Hellsten |
| 7,741,734 B2 | 6/2010 | Joannopoulos et al. |
| 7,775,112 B2 | 8/2010 | Amemiya |
| 7,782,264 B1 | 8/2010 | Vincent |
| 7,825,543 B2 | 11/2010 | Karalis et al. |
| 7,890,053 B2 | 2/2011 | Washiro |
| 7,894,770 B2 | 2/2011 | Washiro |
| 8,063,717 B2 | 11/2011 | Bradley et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,299,936 B2 | 10/2012 | Papadopoulos |
| 8,338,991 B2 | 12/2012 | Von Novak et al. |
| 8,350,769 B1 | 1/2013 | Crawley |
| 8,378,524 B2 | 2/2013 | Mita |
| 8,384,247 B2 | 2/2013 | Yerazunis et al. |
| 8,395,282 B2 | 3/2013 | Joannopoulos et al. |
| 8,536,738 B2 | 9/2013 | Bella |
| 8,587,490 B2 | 11/2013 | Niver et al. |
| 8,890,472 B2 | 11/2014 | Mashinsky |
| 8,897,697 B1 | 11/2014 | Bennett et al. |
| 8,941,448 B2 | 1/2015 | Yu et al. |
| 9,030,363 B2 | 5/2015 | Kenington et al. |
| 9,042,812 B1 | 5/2015 | Bennett et al. |
| 9,154,966 B2 | 10/2015 | Bennett et al. |
| 9,156,364 B2 | 10/2015 | Miller et al. |
| 9,178,504 B2 | 11/2015 | Komori |
| 2004/0227667 A1 | 11/2004 | Sievenpiper |
| 2004/0263409 A1 | 12/2004 | Hart |
| 2005/0111533 A1 | 5/2005 | Berkman |
| 2005/0128154 A1 | 6/2005 | Hately |
| 2006/0281423 A1 | 12/2006 | Caimi |
| 2007/0035356 A1 | 2/2007 | Ranta |
| 2007/0132489 A1 | 6/2007 | Corum |
| 2008/0122449 A1 | 5/2008 | Besser et al. |
| 2008/0273201 A1 | 11/2008 | Brooks et al. |
| 2010/0194206 A1 | 8/2010 | Burdo |
| 2010/0259111 A1 | 10/2010 | Ruocco et al. |
| 2010/0260076 A1 | 10/2010 | Corman |
| 2010/0264748 A1 | 10/2010 | Tucker |
| 2011/0049997 A1 | 3/2011 | Urano |
| 2011/0062916 A1 | 3/2011 | Farahani |
| 2011/0080050 A1 | 4/2011 | Thundat et al. |
| 2011/0133564 A1 | 6/2011 | Teo |
| 2011/0133565 A1 | 6/2011 | Teo et al. |
| 2011/0156494 A1 | 6/2011 | Mashinsky |
| 2011/0169336 A1 | 7/2011 | Yerazunis |
| 2012/0119575 A1 | 5/2012 | Kurs |
| 2012/0169568 A1 | 7/2012 | Oh et al. |
| 2012/0248889 A1 | 10/2012 | Fukushi |
| 2012/0249449 A1 | 10/2012 | Tseng |
| 2013/0029595 A1 | 1/2013 | Widmer et al. |
| 2013/0049674 A1 | 2/2013 | Davis |
| 2013/0064311 A1 | 3/2013 | Turner et al. |
| 2013/0099584 A1 | 4/2013 | Von Novak |
| 2014/0015344 A1 | 1/2014 | Mohamadi |
| 2014/0062813 A1 | 3/2014 | Alrabadi |
| 2014/0104132 A1 | 4/2014 | Bakalski et al. |
| 2014/0252865 A1 | 9/2014 | Corum et al. |
| 2014/0252886 A1 | 9/2014 | Corum et al. |
| 2014/0308901 A1 | 10/2014 | Turner et al. |
| 2014/0319922 A1 | 10/2014 | Shinohara |
| 2015/0042172 A1 | 2/2015 | Howard |
| 2015/0109181 A1 | 4/2015 | Hyde |
| 2015/0145339 A1 | 5/2015 | Chiyo et al. |
| 2015/0207334 A1 | 7/2015 | Mitcheson et al. |
| 2015/0207335 A1 | 7/2015 | Madawala |
| 2015/0280444 A1 | 10/2015 | Smith et al. |
| 2016/0079754 A1 | 3/2016 | Corum et al. |
| 2016/0079769 A1 | 3/2016 | Corum et al. |
| 2017/0005529 A1 | 1/2017 | Burling |
| 2017/0018852 A1 | 1/2017 | Adriazola et al. |

FOREIGN PATENT DOCUMENTS

| | | |
|---|---|---|
| EP | 1965223 | 9/2008 |
| EP | 2221743 | 8/2010 |
| EP | 2568528 | 3/2013 |
| GB | 20981 | 11/1896 |
| GB | 24421 | 3/1898 |
| GB | 11293 | 11/1901 |
| GB | 13563 | 11/1901 |
| GB | 14579 | 4/1902 |
| GB | 8200 | 4/1906 |
| GB | 142352 | 8/1912 |
| GB | 1471860 | 4/1977 |
| GB | 2215524 | 9/1989 |
| GB | 2330695 B | 6/2002 |
| GB | 2387969 B | 11/2005 |
| JP | S50-103642 A | 8/1975 |
| JP | S58-066428 A | 4/1983 |
| JP | H06225481 | 8/1994 |
| JP | 2007244015 | 9/2007 |
| RU | 2143775 | 12/1999 |
| RU | 2161850 | 1/2001 |
| RU | 2183376 | 6/2002 |
| RU | 2255406 | 6/2005 |
| RU | 2273939 | 4/2006 |
| RU | 2310964 | 11/2007 |
| RU | 2340064 | 11/2008 |
| RU | 2341860 | 12/2008 |
| RU | 2342761 | 12/2008 |
| RU | 2366057 | 8/2009 |
| RU | 2366058 | 8/2009 |
| RU | 2409883 | 1/2011 |
| RU | 2423772 | 7/2011 |
| RU | 2459340 | 8/2012 |
| RU | 2473160 | 1/2013 |
| RU | 2474031 | 1/2013 |
| RU | 2488207 | 7/2013 |
| RU | 2488208 | 7/2013 |
| RU | 2533060 | 11/2014 |
| RU | 2544380 | 3/2015 |

(56) References Cited

FOREIGN PATENT DOCUMENTS

| RU | 2548571 | | 4/2015 |
|---|---|---|---|
| RU | 2554723 | | 6/2015 |
| WO | 9313495 | | 7/1993 |
| WO | WO9323907 | | 11/1993 |
| WO | 9529516 | A1 | 11/1995 |
| WO | 0191238 | A1 | 11/2001 |
| WO | 2007146164 | | 12/2007 |
| WO | 2010020813 | | 2/2010 |
| WO | 2010111541 | | 9/2010 |
| WO | 2010129369 | | 11/2010 |
| WO | 2011097046 | | 8/2011 |
| WO | 2013093922 | | 6/2013 |
| WO | 2017156285 | A1 | 9/2017 |

OTHER PUBLICATIONS

Wolff, Christian, "Over the Horizon Oceanography Radar WERA," Oct. 13, 2011, https://web.archive.org/web/20111013010047/http://www.radartutorial.eu/19.kartei/karte712.en.html.

Kume, Hideyoshi, "Dengyo Converts Microwave Into Electricity with High Efficiency," Nikkei Electronics, May 17, 2011, http://techon.nikkeibp.co.jp/english/NEWS_EN/20110517/191846/.

Examination Report issued in New Zealand Application No. 712566 dated Jun. 10, 2016.

Examination Report issued in New Zealand for Application No. 720048 dated Jun. 28, 2016.

U.S. Appl. No. 15/878,607, filed Jan. 24, 2018, Notice of Allowance dated Feb. 1, 2019.

Zenneck, J., Wireless Telegraphy, Mar. 1918, McGraw-Hill Book Company, Inc., New York, NY, USA. (submitted in 2 parts).

Hendry, J. Surface Waves: what Are They? Why Are They Interesting?, Roke Manor Research Limited, 2009, pp. 1-10, Romsey, England.

Turner, J., Isolation of the Zenneck Surface Wave: Update, Roke Manor Research Limited, Romsey, England.

Schelkunoff, S.A., Modified Sommerfeld's Integral and Its Applications, Proceedings of the Institute of Radio Engineers, Oct. 1936, pp. 1388-1398, vol. 24, No. 10, IEEE, New York, NY, USA.

Wells, C.B., CFA Experiments, Electronics World + Wireless World, Mar. 1990, pp. 253-255, vol. 96.

Wells, C.B., The Cross-Field Antenna in Practice, Electronics World + Wireless World, Nov. 1989, pp. 1109-1111, vol. 95.

Wait, J.R., Theory of Ground Wave Propagation, Electromagnetic Probing in Geophysics, 1971, pp. 163-207, Golem Press.

Sarkar et al., History of Wireless, Jan. 17, 2006, Wiley-IEEE Press, Hoboken, NJ, USA. (submitted in 4 parts).

Stark III, J.C., Wireless Power Transmission Utilizing a Phased Array of Tesla Coils (Master's Thesis), May 13, 2004, pp. 1-247, MIT, Cambridge, MA, USA. (submitted in 2 parts).

Hardesty et al., Electrical Storms in Tesla's Colorado Springs Notes (& the Transmission of Energy w/o Wires), Tesla Science Center Conference, Nov. 5, 2011, Long Island, NY, USA. (Power Point Presentation).

Corum et al., A Technical Analysis of the Extra Coil as a Slow Wave Helical Resonator, Proceedings of the 2nd International Tesla Symposium, 1986, pp. 2-1 to 2-24, International Tesla Society, Colorado Springs, CO, USA.

Corum et al., Dr. Mahlon Loomis: Terra Alta's Neglected Discoverer of RF Communication, Proceedings of the 1992 International Tesla Symposium, pp. 19-34, International Tesla Society, Colorado Springs, CO, USA.

Corum et al., Summary Notes on Tesla Coils, Tesla Conference 2011, Published as Appendix 8 in Electrical Storms in Tesla's Colorado Springs Notes and the Transmission of Energy Without Wires, Nov. 5, 2011, pp. 1-14, Tesla Science Center at Wardenclyffe, Shoreham, NY, USA.

Hardesty et al., Franklin—Loomis—Tesla: The Origin and Development of Wireless Technology, Tesla Science Foundation Conference, Jul. 9-11, 2010, Philadelphia, PA, USA. (Power Point Presentation).

Hardesty et al., Franklin—Loomis—Tesla: The Origin of Modern Wireless Phenomena, Tesla Science Foundation Conference, Jul. 9-11, 2010, pp. 1-99, Philadelphia, PA, USA.

Corum et al., Goodness, Q and Power Factor in Electrical Science and Machinery, Infinite Energy Magazine, Jan./Feb. 2010, pp. 1-17, vol. 15, No. 89, New Energy Foundation, Concord, NH, USA.

Marriott, R. H., How Radio Grew Up, Radio Broadcast, Dec. 1925, pp. 159-162, vol. VIII, No. 2, Doubleday, Page & Co., Garden City, Ny, USA.

Goubau, G., Über die Zennecksche Bodenwelle (on the Zenneck Surface Wave), Zeitschrift fur Angewandte Physik, 1951, pp. 103-107, vol. 3, No. 3/4, as translated by James F. Corum.

Pinzone, B.F., Pinzone Antiskywave Design, Radio World, May 15, 1988, pp. 45-46.

Corum et al., Experimental Replication of Loomis' RF Experiments, AAPT Summer Meeting, Jul. 24, 2006, Syracuse, NY, USA. (Power Point Presentation).

Corum et al., Tesla Coil Research, U.S. Army Armament Research, Development and Engineering Center, Contract No. DAAA21-90-C-0084, Jun. 1992.

Lebo, J.R., The Man Before Marconi: A Biography of Dr. Mahlon Loomis, QST, Aug. 1948, pp. 42-44.

Winters, S.R., The Story of Mahlon Loomis: Pioneer of Radio, Radio News, Nov. 1922, pp. 836-837, 966-980.

Kogan, S.H., Distribution of Waves Along an Infinite Helix, Reports of the Academy of Sciences of the USSR, 1949, pp. 1-5, vol. 66, No. 5, as translated by P.J. Pesavento and E. Corum.

Jahnke et al., Tables of Functions with Formulae and Curves, 1945, p. 145, 4th Edition, Dover Publications, New York.

Milligan, T., Modern Antenna Design, 1985, pp. 8-9, 1st Edition, McGraw-Hill, New York.

Reinartz, J. L., 1XAM's transmitter, QST, Jan. 1924, pp. 26-27.

Sommerfeld, A., Problems of Radio, Partial Differential Equations in Physics—Lectures on Theoretical Physics, 1949, pp. 246-257, vol. VI, Academic Press, New York.

Stratton, J. A., Electromagnetic Theory, 1941, p. 516, McGraw-Hill, New York.

Stutzman et al., Antenna Theory and Design, 1981, p. 82, 92-93, Wiley & Sons, New York.

Wait, J. R., Complex Image Theory—Revisited, IEEE Antennas and Propagation Magazine, Aug. 1991, pp. 27-29, vol. 33, No. 4.

Counterpoises, QST, Sep. 1920, pp. 24-25.

Ashe, G. B., A Counterpoise Investigation, QST, Dec. 1924, pp. 34-35.

Bannister, P. R., Summary of Image Theory Expressions for the Quasi-Static Fields of Antennas at or Above the Earth's Surface, Jul. 1979, pp. 1001-1008, vol. 67, No. 7, Proceedings of the IEEE.

Banos et al., Sommerfeld Surface Wave, Summary of Normal Mode Theory Symposium, IRE Transactions on Antennas and Propagation, Jan. 1956, p. 92, vol. AP-4, No. 1.

Barlow, H. M., Launching a Surface Wave over the Earth, Electronics Letters, Jul. 1967, pp. 304-305, vol. 3, No. 7.

Westman, H. P., Antenna-Counterpoise Fundamentals, QST, May 1926, p. 46.

Beverage, H.H., Improving the CW Ground System, OST, Nov. 1921, pp. 25-26.

Bucher, E. E., The Alexanderson System for Radio Communication, General Electric Review, Oct. 1920, pp. 813-839 (See Fig. 11, p. 820.) vol. 23, No. 10.

Paknys, R., Evaluation of Hankel Functions with Complex Argument and Complex Order, IEEE Transactions on Antennas and Propagation, May 1992, pp. 569-578, vol. 40, No. 5.

Burrows, C. R., Radio Propagation Over Spherical Earth, Proc. IRE, May 1935, pp. 470-480, vol. 23, No. 5; Reprinted in Bell System Tech. Jour., Jul. 1935, pp. 477-488, vol. 14, No. 3.

Wise, W. H., The Physical Reality of Zenneck's Surface Wave, Bell System Technical Journal, No. 1, Jan. 1937, pp. 35-44, vol. 16, No. 1.

Burrows, C. R., Addendum to the Effect of the Earth's Curvature on Ground Wave Propagation, IEEE Transactions on Antennas and Propagation, Nov. 1964, pp. 789-791, vol. 12, No. 6.

Burrows, C. R., Radio Gain, IEEE Transactions on Antennas and Propagation, May 1967, pp. 404-410, vol. AP-15, No. 3.

(56) References Cited

OTHER PUBLICATIONS

Chu et al., Electromagnetic Waves in Hollow Metal Tubes of Rectangular Cross Section, Proceedings of the IRE, Dec. 1938, pp. 1520-1555, vol. 26, No. 12.

Ufimtsev et al., Transformation of Surface Waves in Homogeneous Absorbing Layers, IEEE Transactions on Antennas and Propagation, Feb. 2000, pp. 214-222, vol. 48, No. 2.

Corum et al., Toroidal Helix Antenna, IEEE Antennas and Propagation Society International Symposium, Jun. 14-19, 1987, pp. 832-835, vol. 25.

Pinzone et al., A Novel Structure for Improved Directivity, 1988 Antennas and Propagation Society International Symposium Digest, Jun. 1988, pp. 824-827, vol. 2, IEEE, Syracuse, NY.

Corum et al., Experimental Validation of the Improved Directivity Element—Elevation Plane Control, 1989 Antennas and Propagation Society International Symposium Digest, Jun. 1989, pp. 702-705, vol. 2, IEEE, San Jose, CA.

Corum et al., A Concentric Array for Low and Medium Frequencies, 1990 Antennas and Propagation Society International Symposium Digest, May 1990, pp. 832-835, vol. 2, IEEE, Dallas, Texas.

Deminco, N., Propagation Prediction Techniques and Antenna Modeling (150 to 1750 kHz) for Intelligent Transportation Systems (ITS) Broadcast Applications, IEEE Antennas and Propagation Magazine, Aug. 2000, pp. 9-34, vol. 42, No. 4.

Eckert, R. P., History of Ground Wave Propagation Prediction Curves for AM Standard Broadcast, IEEE Transactions on Broadcasting, Mar. 1986, pp. 1-4, vol. BC-32, No. 1.

Epstein, P., Radio-Wave Propagation and Electromagnetic Surface Waves, Proc. National Academy of Sciences, Jun. 1947, pp. 195-199, vol. 33, No. 6.

Epstein, P., On the Possibility of Electromagnetic Surface Waves, Proc. National Academy of Sciences, Dec. 1954, pp. 1158-1165, vol. 40, No. 12.

Norton, K. A., The Physical Reality of Space and Surface Waves in the Radiation Field of Radio Antennas, Proceedings of the IRE, Sep. 1937, pp. 1192-1202, vol. 25, No. 9.

Goubau, G., Single Conductor Surface Wave Transmission Lines, Proc. IRE, Jun. 1951, pp. 619-624, vol. 39, No. 6.

Norton, K.A., The Propagation of Radio Waves over the Surface of the Earth and in the Upper Atmosphere: Part II The Propagation from Vertical, Horizontal, and Loop Antennas Over a Plane Earth of Finite Conductivity, Proceedings of the IRE, Sep. 1937, pp. 1203-1236, vol. 25, No. 9.

Hately et al., CFA: Working Assumption, Electronics World + Wireless World, Dec. 1990, pp. 1094-1099, vol. 96.

Hill et al., Excitation of the Zenneck Surface Wave by a Vertical Aperture, Radio Science, Nov.-Dec. 1978, pp. 969-977, vol. 13, No. 6.

Kabbary et al., Maxwell's Equations and the Crossed-Field Antenna, Electronics World + Wireless World, Mar. 1989, pp. 216-218, vol. 95.

Trainotti et al., Short Low and Medium Frequency Antenna Performance, IEEE Antennas and Propagation Magazine, Oct. 2005, pp. 66-90, vol. 47, No. 5.

Kabbary et al., Four Egyptian MW Broadcast Crossed-Field Antennas, Proceedings of the National Association of Broadcasters 1999 Engineering Conference, Apr. 1999, pp. 235-241, Las Vegas, Nevada.

Kahan et al., On the Existence of a Surface Wave in Dipole Radiation over a Plane Earth, Proc. IRE, Jul. 1950, pp. 807-812, vol. 38, No. 7.

Karbowiak, A. E., Theory of Composite Guides: Stratified Guides for Surface Waves, Proc. IEE (British), 1954, pp. 238-242, vol. 101, No. 72.

Tesla, N., The True Wireless, Electrical Experimenter, May 1919, pp. 1-13.

King et al., Groundwave Attenuation Function for Propagation Over a Highly Inductive Earth, Radio Science, Jul. 1967, pp. 687-693, vol. 2, No. 7.

Li, R. The Accuracy of Norton's Empirical Approximations for Ground Wave Attenuation, IEEE Trans. Antennas and Propagation, Jul. 1983, pp. 624-628, vol. AP-31, No. 4.

Lindell et al., Exact Image Theory for the Sommerfeld Half-Space Problem, Part I: Vertical Magnetic Dipole, IEEE Transactions on Antennas and Propagation, Feb. 1984, pp. 126-133, vol. AP-32, No. 2.

Lindell et al., Exact Image Theory for the Sommerfeld Half-Space Problem, Part II: Vertical Electric Dipole, IEEE Transactions on Antennas and Propagation, Aug. 1984, pp. 841-847, vol. AP-32, No. 8.

Lindell et al., Exact Image Theory for the Sommerfeld Half-Space Problem, Part III: General Formulation, IEEE Transactions on Antennas and Propagation, Oct. 1984, pp. 1027-1032, vol. AP-32, No. 10.

Lodge et al., Syntonic Wireless Telegraphy; with Specimens of Large-scale Measurements, Proceedings of the Royal Society—London, Series A, May 26, 1909, pp. 227-256, vol. 82, No. 554.

Marincic, A. S., Nikola Tesla and the Wireless Transmission of Energy, IEEE Transactions on Power Apparatus and Systems, Oct. 1982, pp. 4064-4068, vol. PAS-101, No. 10.

Mason, H. F., The Nodal Point Explained, QST, Sep. 1923, pp. 11-14.

Norton, K. A., The Calculation of Ground-Wave Field Intensity Over a Finitely Conducting Spherical Earth, Proceedings of the IRE, Dec. 1941, pp. 623-639, vol. 29, No. 12.

Peterson, G., The Application of Electromagnetic Surface Waves to Wireless Energy Transfer, 2015 IEEE Wireless Power Transfer Conference (WPTC), May 1, 2015, pp. 1-4, Shoreham, Long Island, New York, USA.

Kukushkin, A. V., On the Existence and Physical Meaning of the Zenneck Wave, UFN, 2009, vol. 179, No. 7, 801-803.

Kistovich, Yu. V., On the Possibility of Observing Surface Zenneck Waves in the Radiation of a Source with a Small Vertical Aperture, Journal of Technical Physics, 1989, vol. 59(4), 16-21.

Datsko, V.N. and A.A. Kopylov, On Surface Electromagnetic Waves, UFN, 2008, vol. 178, No. 1, 109-110.

Baybakov et al., Experimental Discovery of Zenneck's Surface Electromagnetic Waves, UFN, 1989, vol. 157, 722-724.

Hesse et al., A Single Probe Spatial Averaging Technique for Guided Waves and Its Application to Surface Wave Rail Inspection, IEEE Transactions on Ultrasonics, Ferroelectrics, and Frequency Control, vol. 54, No. 11, Nov. 2007, 2344-2356.

Andriyas, T., Surface Wave Propagation in a Dielectric Waveguide Loaded with an Anistropic, Conductive, and Spatially Dispersive Substrate, Utah State University, May 2009, p. 12.

U.S. Appl. No. 14/483,089, filed Sep. 10, 2014, Non-Final Office Action dated Apr. 6, 2017.

U.S. Appl. No. 14/728,507, filed Jun. 2, 2015, Final Office Action dated Jul. 28, 2017.

Beaty, W., Tesla's Big Mistake?, Sep. 1999, http://amasci.com/tesla/tmistk.html.

Anonymous, Tesla Wireless Technology, Mar. 8, 2007, http://montalk.net/notes/tesla-wireless-technology.

Examination Report issued in Australian Application No. 2014226221 dated Sep. 20, 2017.

U.S. Appl. No. 14/848,653, filed Sep. 9, 2015, Final Office Action dated Sep. 25, 2017.

Ling et al., The Propagation and Excitation of Surface Waves in an Absorbing Layer, Progress in Electromagnetics Research, 1998, pp. 49-91, vol. 19.

Wise, W. Howard, Note on the Accuracy of Rolfs Graphs of Sommerfeld's Attenuation Formula, Proceedings of the Institute of Radio Engineers, Nov. 1930, pp. 1971-1972, vol. 18, No. 11.

Barlow et al., Surface Waves, The Proceedings of the Institution of Electrical Engineers, Nov. 1953, pp. 329-347, vol. 100, part iii.

Barlow et al., An Investigation of the Characteristics of Cylindrical Surface Waves, The Proceedings of the Institution of Electrical Engineers, Nov. 1953, pp. 321-328, vol. 100, Part III, No. 68.

Brown et al., The Launching of Radial Cylindrical Surface Waves by a Circumferential Slot, The Proceedings of the Institution of Electrical Engineers, Mar. 1959, pp. 123-128, vol. 106, Part B.

(56) References Cited

OTHER PUBLICATIONS

Burrows, Charles R., Radio Propagation Over Plane Earth-Field Strength Curves, Bell System Technical Journal, Jan. 1937, pp. 45-75, vol. 16, No. 1.

Burrows, Charles R., Addendum to: Radio Propagation Over Plane Earth-Field Strength Curves, Bell System Technical Journal, Oct. 1937, pp. 574-577, vol. 16, No. 4.

Burrows, Charles R., Existence of a Surface Wave in Radio Propagation, Nature, Aug. 15, 1936, p. 284, vol. 138, Nature Publishing Group.

Burrows, Charles R., The Surface Wave in Radio Propagation Over Plane Earth, Proceedings of the Institute of Radio Engineers, Feb. 1937, pp. 219-229, vol. 25, No. 2.

Collin, R.E., Hertzian Dipole Radiating Over a Lossy Earth or Sea: Some Early and Late 20th-Century Controversies, IEEE Antennas and Propagation Magazine, Apr. 2004, pp. 64-79, vol. 46, No. 2.

Jones, E.M.T., An Annular Corrugated-Surface Antenna, Proceedings of the I.R.E., Jun. 1952, pp. 721-725, vol. 40.

Fernando et al., An Investigation of the Properties of Radial Cylindrical Surface Waves Launched Over Flat Reactive Surfaces, The Proceedings of the Institution of Electrical Engineers, May 1956, pp. 307-318, vol. 103, Part B.

Belrose, John S., A Radioscientist's Reaction to Marconi's First Transatlantic Wireless Experiment—Revisited, Conference Digest, Jul. 2001, pp. 22-25, vol. 1, IEEE Antennas & Propagation Society International Symposium, Boston, MA, US.

Marconi, Guglielmo, Wireless Telegraphic Communication, Nobel Lecture, Dec. 11, 1909, pp. 196-222.

Norton, K.A., Propagation of Radio Waves Over a Plane Earth, Nature, Jun. 8, 1935, pp. 954-955, Nature Publishing Group.

Kukushkin, A.V., On the Existence and Physical Meaning of the Zenneck Wave, Physics—Uspekhi, 2009, pp. 755-756, vol. 52, No. 7, Uspekhi Fizicheskikh Nauk, Russian Academy of Sciences.

Michaels, Charles J., A Load-Tracking L Network, QST, Apr. 1992, p. 74, American Radio Relay League, Inc.

Feldman, C.B., The Optical Behavior of the Ground for Short Radio Waves, Proceedings of the IRE, Jun. 1933, pp. 764-801, vol. 21, No. 6.

Rolf, Bruno, Graphs to Prof. Sommerfeld's Attenuation Formula for Radio Waves, Proceedings of the Institute of Radio Engineers, Mar. 1930, pp. 391-402, vol. 18, No. 3.

Wait, James R., The Ancient and Modern History of EM Ground-Wave Propagation, IEEE Antennas and Propagation Magazine, Oct. 1998, pp. 7-24, vol. 40, No. 5.

Zucker, Francis J., Surface-Wave Antennas, Antenna Engineering Handbook, 2007, pp. 10.1-10.32, Chp. 10, McGraw-Hill.

Smith, Carl E., Short Low Loss AM Antenna, IEEE Transactions on Broadcasting, Jun. 1989, pp. 237-240, vol. 35, No. 2, IEEE.

Belrose, John S., An Electrically Small Umbrella Antenna for 160 Meters, ARRL Antenna Compendium, 2002, pp. 3-8, vol. 7.

Belrose, John S., Characteristics of the Crossed Field Antenna Obtained by Numerical and Experimental Modelling, IEEE Antennas and Propagation Society International Symposium, 2005, pp. 21-24, vol. 1B.

Belrose, John S., Radiation Characteristics of an Electrically Small MF Broadcast Antenna—by Simulation, 11th International Conference on Antennas and Propagation, Apr. 17-20, 2001, pp. 90-94, IEEE Conference Publication No. 480.

Cobos et al., A Modified Goubau-Type Antenna with Two Octaves of Impedance Bandwidth, Antennas and Propagation Society International Symposium, Jun. 2004, pp. 3051-3054, vol. 3, IEEE.

Goubau, Georg, Surface Waves and Their Application to Transmission Lines, Journal of Applied Physics, Nov. 1950, pp. 1119-1128, vol. 21.

Ravipati et al., The Goubau Multi Element Monopole Antenna—Revisited, Antennas and Propagation Society International Symposium, Jun. 2007, pp. 233-236, IEEE.

Pinzone et al., A New Low Profile Anti-Skywave Antenna for AM Broadcasting, NAB Engineering Conference Proceedings, 1988, 7-15.

Underhill, Mike, All sorts of small antennas—they are better than you think—heuristics shows why!, Lecture Presentation to the Adelaide Hills Amateur Radio Society, Feb. 2008, pp. 1-144.

Belrose, John S., The Crossed Field Antenna—Analyzed by Simulation and Experiment, ICAP-JINA Millennium Conference on Antennas and Propagation, Apr. 9-12, 2000, pp. 1-4, Davos, Switzerland.

Belrose, John S., The Truth and Untruth About Electrically Small Antennas, Amateur Radio Technical Session, QCWA 2004 International Convention, Oct. 15, 2004, pp. 1-8, Ottawa, ON, Canada.

Hately et al., An Operational MF Broadcast Antenna Using Poynting Vector Synthesis, IEEE ICAP Seventh International Conference 1991, Apr. 1991, pp. 645-648, Conference Publication 333, Part 2.

Kabbary et al., Phasing and Matching Units for the CFA, URSI Seventeenth National Radio Science Conference, Feb. 22-24, 2000, pp. B22.1-B22.8, Minufiya University, Egypt.

Underhill, M.J., The Estimation and Measurement of the Efficiency and Effectiveness of Small Antennas in an Environment, HF Radio 2003—Ninth International IEE Conference on HF Radio Systems and Techniques, Jun. 23-26, 2003, pp. 1-6, University of Bath, UK.

Trainotti et al., On the Crossed Field Antenna Performance, IEEE Transactions on Broadcasting, Sep. 2006, pp. 299-317, vol. 52, No. 3.

Trainotti, Valentin, Short Medium Frequency AM Antennas, IEEE Transactions on Broadcasting, Sep. 2001, pp. 263-284, vol. 47, No. 3.

Underhill, Mike, Tuneable Coupled (Multi-) Mode Small Antennas—CFA, CFL, EH etc?, Lecture Presentation at the Radio Society of Great Britain Convention, Oct. 2010, pp. 1-167.

Letter to James Corum from John Musselman regarding the Antenna Installation at Kodiak, Alaska, Jun. 2011.

Smith, Carl E., Antenna Coupling Unit Network Fig. 2.4, Installed at Radio Station KVOK, exact date unknown, installed some time around or before 1980, Kodiak, Alaska.

Rice, S.O., Series for the Wave Functions of a Radiating Dipole at the Earth's Surface, BSTJ, Jan. 1937, pp. 101-109, vol. 16, No. 1.

McDonald, Kirk T., "Crossed-Field" and "EH" Antennas Including Radiation from the Feed Lines and Reflection from the Earth's Surface, Published at http://www.physics.princeton.edu/~mcdonald/examples/crossedfield.pdf, Jul. 2006; updated Mar. 2010, pp. 1-11.

McDonald, Kirk T., "Crossed-Field" and "EH" Antennas Including Radiation from the Feed Lines and Reflection from the Earth's Surface, Published at http://www.physics.princeton.edu/~mcdonald/examples/crossedfield.pdf, Jul. 2006; updated Jun. 2008, pp. 1-18.

Belrose, John S., On the EH Antenna, antenneX Online, Apr. 2003, pp. 1-4, Issue No. 72.

Stewart, Brian G., Planning Application submitted by Isle of Man International Broadcasting plc to construct a Crossed Field Antenna at Cranstal, near Bride, Isle of Man, Department of Engineering Glasgow Caledonian University, Aug. 2000, pp. 1-19.

Hendry et al., Surface Waves for Communication Systems, 3rd SEAS DTC Technical Conference, 2008, A18, Edinburgh, Scotland.

Watson, W.H., The Physical Principles of Wave Guide Transmission and Antenna Systems, 1947, p. 25, Oxford at the Clarendon Press.

Pover et al., The Silsden Crossed Field Antenna, Extracts from the report on the performance of an elevated 8 Metre CFA constructed and tested at Silsden in West Yorkshire on Sep. 23-26, 2009.

Holland, Ralph, Egyptian Daytime Wave Pockets—Speculative Causes, antenneX Online, Apr. 2002, pp. 1-38, Issue No. 60.

Corum et al., Multiple Resonances in RF Coils and the Failure of Lumped Inductance Models, Sixth International Symposium Nikola Tesla, Oct. 18-20, 2006, Belgrade, SASA, Serbia.

PCT Patent Application PCT/US2018/020731 filed on Mar. 2, 2018, International Preliminary Report on Patentablilty dated May 29, 2019.

U.S. Appl. No. 16/168,248, filed Oct. 23, 2018, Notice of Allowance dated Mar. 6, 2019.

U.S. Appl. No. 15/889,827, filed Feb. 6, 2018, Final Office Action dated May 2, 2019.

U.S. Appl. No. 14/849,643, filed Sep. 10, 2015, Non-Final Office Action dated Nov. 17, 2017.

International Search Report and Written Opinion for PCT/US2018/020731 dated Jun. 1, 2018, 14 pages.

(56) References Cited

OTHER PUBLICATIONS

Notice of Allowance dated Aug. 13, 2018 in U.S. Appl. No. 16/017,516.
Niessen, K.F., Zur Entscheidung zwischen den beiden Sommerfeldschen Formeln für die Fortpflanzung von drahtlosen Wellen, Ann. der Physik, 1937, pp. 585-596, vol. 29 (Includes English Translation and German Original).
Niessen, K.F., Über die entfernten Raumwellen eines vertikalen Dipolsenders oberhalb einer ebenen Erde von beliebiger Dielektrizitätskonstante und beliebiger Leitfähigkeit, Ann. der Physik, Dec. 24, 1933, pp. 893-912, Series 5, vol. 18 (Includes English Translation and German Original).
Niessen, K.F., Bemerkung zu einer Arbeit von Murray und einer Arbeit von van der Pol und Niessen über die Ausbreitung elektromagnetischer Wellen, Ann. der Physik, Apr. 3, 1933, pp. 810-820, Series 5, vol. 16 (Includes English Translation and German Original).
Hack, F., Die Ausbreitung ebener elektromagnetischer Wellen längs eines geschichteten Leiters, besonders in den Fällen der drahtlosen Telegraphie, Annalen der Physik, 1908, pp. 43-63, vol. 27 (Includes English Translation and German Original).
True, H., Über die Erdströme in der Nähe einer Sendeantenne für drahtlose Telegraphie, Jahrbuch der drahtlosen Telegraphie und Telephonie, Feb. 1911, pp. 125-175, vol. 5, No. 2 (Includes English Translation and German Original).
Van Der Pol et al., Über die Ausbreitung elektromagnetischer Wellen über eine ebene Erde, Ann. der Physik, Aug. 22, 1930, pp. 273-294, Ser. 5, vol. 6 (Includes English Translation and German Original).
Van Der Pol, B., Über die Ausbreitung elektromagnetischer Wellen, Jahrbuch der drahtlosen Telegraphie und Telephonie, Apr. 1931, pp. 152-156, vol. 37 (Includes English Translation and German Original).
Zenneck, J., "Über die Fortpflanzung ebener elektromagnetischer Wellen längs einer ebenen Leiterfläche und ihre Beziehung zur drahtlosen Telegraphie," (on the propagation of plane electromagnetic waves along a flat conducting surface and their relation to wireless telegraphy), Annalen der Physik, Sep. 20, 1907, pp. 846-866, Serial 4, vol. 23 (Includes English Translation and German Original).
Sommerfeld, A., Über die Ausbreitung der Wellen in der drahtlosen Telegraphie, Annalen der Physik, 1909, pp. 665-737, vol. 28, No. 4 (Includes English Translation and German Original).
Weyl, H., Ausbreitung elektromagnetischer Wellen über einem ebenen Leiter (Propagation of Electromagnetic Waves Over a Plane Conductor), Annalen der Physik, Nov. 1919, pp. 97-109, vol. 60 (Includes English Translation and German Original).
Sommerfeld, A., Ausbreitung der Wellen in der drahtlosen Telegraphie. Einfluss der Bodenbeschaffenheit auf gerichtete und ungerichtete Wellenzüge, Jahrbuch der drahtlosen Telegraphie und Telephonie, Dec. 1910, pp. 157-176 (Includes English Translation and German Original).
Van Der Pol et al., Über die Raumwellen von einem vertikalen Dipolsender auf ebener Erde, Ann. der Physik, Jul. 21, 1931, pp. 485-510, Ser. 5, vol. 10 (Includes English Translation and German Original).
Sommerfeld, A., Über die Fortpflanzung elektrodynamischer Wellen längs eines Drahtes, Annalen der Physik, 1899, pp. 233-290, vol. 67 (Includes English Translation and German Original).
Sommerfeld, A., Über die Ausbreitung der Wellen in der drahtlosen Telegraphie, Annalen der Physik, Dec. 1926, pp. 1135-1153, vol. 81 (Includes English Translation and German Original).
Weyl, H., Erwiderung auf Herrn Sommerfelds Bemerkungen über die Ausbreitung der Wellen in der drahtlosen Telegraphie, Annalen der Physik, 1920, pp. 110-112, vol. 62 (Includes English Translation and German Original).
Sommerfeld, A., Über die Ausbreitung der Wellen in der drahtlosen Telegraphie, Annalen der Physik, 1920, pp. 95-96, vol. 367, No. 9 (Includes English Translation and German Original).
Wu, Ke et al., Wireless Power Transmission, Technology, and Applications, Proceedings of the IEEE, Jun. 2013, pp. 1271-1275, vol. 101, No. 6.
Massa, Andrea et al., Array Designs for Long-Distance Wireless Power Transmission: State-of-the-Art and Innovative Solutions, Proceedings of the IEEE, Jun. 2013, pp. 1464-1481, vol. 101, No. 6.
Norton, K. A., The Propagation of Radio Waves Over the Surface of the Earth and in the Upper Atmosphere: Part I Ground-Wave Propagation from Short Antennas, Proc. IRE, Oct. 1936, pp. 1367-1387, vol. 24, No. 10.
Shinohara, Naoki, Beam Control Technologies with a High-Efficiency Phased Array for Microwave Power Transmission in Japan, Proceedings of the IEEE, Jun. 2013, pp. 1448-1463, vol. 101, No. 6.
Miyakoshi, Junji, Cellular and Molecular Responses to Radio-Frequency Electromagnetic Fields, Proceedings of the IEEE, Jun. 2013, pp. 1494-1502, vol. 101, No. 6.
Kim, Jiseong et al., Coil Design and Shielding Methods for a Magnetic Resonant Wireless Power Transfer System, Proceedings of the IEEE, Jun. 2013, pp. 1332-1342, vol. 101, No. 6.
Shoki, Hiroki, Issues and Initiatives for Practical Deployment of Wireless Power Transfer Technologies in Japan, Proceedings of the IEEE, Jun. 2013, pp. 1312-1320, vol. 101, No. 6.
Covic, Grant A. et al., Inductive Power Transfer, Proceedings of the IEEE, Jun. 2013, pp. 1276-1289, vol. 101, No. 6.
Strassner, Bernd et al., Microwave Power Transmission: Historical Milestones and System Components, Proceedings of the IEEE, Jun. 2013, pp. 1379-1396, vol. 101, No. 6.
Christ, Andreas et al., Assessing Human Exposure to Electromagnetic Fields from Wireless Power Transmission Systems, Proceedings of the IEEE, Jun. 2013, pp. 1482-1493, vol. 101, No. 6.
Jaffe, Paul et al., Energy Conversion and Transmission Modules for Space Solar Power, Proceedings of the IEEE, Jun. 2013, pp. 1424-1437, vol. 101, No. 6.
Tesla, Nikola, The Transmission of Electrical Energy Without Wires, Electrical World & Engineer, Mar. 5, 1904, pp. 429-431.
Hui, S. Y., Planar Wireless Charging Technology for Portable Electronic Products and Qi, Proceedings of the IEEE, Jun. 2013, pp. 1290-1301, vol. 101, No. 6.
Sasaki, Susumu et al., Microwave Power Transmission Technologies for Solar Power Satellites, Proceedings of the IEEE, Jun. 2013, pp. 1438-1447, vol. 101, No. 6.
Wang, Bingnan et al., Wireless Power Transfer: Metamaterials and Array of Coupled Resonators, Proceedings of the IEEE, Jun. 2013, pp. 1359-1368, vol. 101, No. 6.
Sample, Alanson P. et al., Enabling Seamless Wireless Power Delivery in Dynamic Environments, Proceedings of the IEEE, Jun. 2013, pp. 1343-1358, vol. 101, No. 6.
Visser, Hubregt J. et al., RF Energy Harvesting and Transport for Wireless Sensor Network Applications: Principles and Requirements, Proceedings of the IEEE, Jun. 2013, pp. 1410-1423, vol. 101, No. 6.
Popovic, Zoya et al., Low-Power Far-Field Wireless Powering for Wireless Sensors, Proceedings of the IEEE, Jun. 2013, pp. 1397-1409, vol. 101, No. 6.
Mayordomo, Iker et al., An Overview of Technical Challenges and Advances of Inductive Wireless Power Transmission, Proceedings of the IEEE, Jun. 2013, pp. 1302-1311, vol. 101, No. 6.
Garnica, Jaime et al., Wireless Power Transmission: From Far Field to Near Field, Proceedings of the IEEE, Jun. 2013, pp. 1321-1331, vol. 101, No. 6.
Ho, John S. et al., Midfield Wireless Powering for Implantable Systems, Proceedings of the IEEE, Jun. 2013, pp. 1369-1378, vol. 101, No. 6.
O'Neill, John J., Prodigal Genius: The Life of Nikola Tesla, 2008, pp. 121-217, Adventures Unlimited Press, Kempton, Illinois.
Cheney, Margaret, Tesla: Man Out of Time, 1981, pp. 171-191, Touchstone, New York, NY.
Burrows, C. R., The Surface Wave in Radio Transmission, Bell Laboratories Record, Jun. 1937, pp. 321-324, vol. 15.

(56) References Cited

OTHER PUBLICATIONS

Valone, Thomas, Harnessing the Wheelwork of Nature, Tesla's Science of Energy, 2002, pp. 147-269, Adventures Unlimited Press, Kempton, Illinois.
Tesla, Nikola, My Inventions, The Autobiography of Nikola Tesla, 2013, pp. 61-72, Lexington, KY.
Tesla, Nikola, From Colorado Springs to Long Island, Research Notes: Colorado Springs 1899-1900 New York 1900-1901, 2008, Nikola Tesla Museum.
McMichael, I., A Note on the Brewster Angle in Lossy Dielectric Media, Night Vision and Electronic Sensors Directorate, Oct. 2010, pp. 1-11, US Army RDECOM CERDEC NVESD, Fort Belvior, Virginia.
Karalis, A., et al., Efficient Wireless Non-radiative Mid-range Energy Transfer, Annals of Physics, 2008, pp. 34-48, No. 323, Elsevier, Inc. (also made available online on Apr. 27, 2007).
Wadsworth, D., Approximate Integration Methods Applied to Wave Propagation (Thesis), Department of Geology and Geophysics, Massachusetts Institute of Technology, Thesis Submitted in Feb. 1958, pp. 1-128, Massachusetts Institute of Technology, Cambridge, Massachusetts, United States.
Pover, B., Report on the Performance of the Silsden 8 Metre Crossed Field Antenna, Published on the Internet at ok1mjo.com/all/ostatni/t-dab_dvb-t.../CFA_antena_silsden-report.pdf, Oct. 2009, pp. 1-28.
Corum, J. et al., The Application of Transmission Line Resonators to High Voltage RF Power Processing: History, Analysis and Experiment, IEEE 19th Southeastern Symposium on System Theory, Mar. 1987, pp. 45-50, Held at Clemson University, Clemson, South Carolina, United States.
Search Report and Written Opinion, PCT/US2014/019477, International Publication No. WO 2014/137817, entitled Excitation and Use of Guided Surface Waves on Lossy Media, International Publication Date: Sep. 12, 2014, International Filing Date: Feb. 28, 2014.
Wait, J. R., Excitation of Surface Waves on Conducting, Stratified, Dielectric-clad and Corrugated Surfaces, Research of the National Bureau of Standards, Dec. 1957, pp. 365-377, vol. 59, No. 6.
Marincic, A. S., Nikola Tesla and the Wireless Transmission of Energy, IEEE Transactions on Power Apparatus and Systems, Oct. 1982, pp. 58-59, vol. PAS-101, No. 10, IEEE, University of Belgrade, Belgrade, Yugoslavia.
Valentinuzzi, M.E., Nikola Tesla: Why Was He So Much Resisted and Forgotten?, IEEE Engineering in Medicine and Biology Magazine, Jul./Aug. 1998, pp. 74-75, vol. 17, No. 4, IEEE, Inst. de Bioingenieria, Univ. Nacional de Tucuman, Mexico.
Leyh, G.E. et al., Efficient Wireless Transmission of Power Using Resonators with Coupled Electric Fields, Power Symposium, 2008. NAPS '08. 40th North American, pp. 1-4, IEEE, Nevada Lightning Lab., NV, USA.
Marincic, A. et al., Tesla's Contribution to Radiowave Propagation, Telecommunications in Modern Satellite, Cable and Broadcasting Service, Sep. 2001, pp. 327-331, vol. 1, IEEE, Belgrade, Serbia.
Garnica, J. et al., Wireless Power Transmission: From Far Field to Near Field, Proceedings of the IEEE, Apr. 4, 2013, pp. 1321-1331, vol. 101, No. 6, IEEE, Gainesville, FL, USA.
Poljak, D. et al., Full Wave Model versus Transmission Line Representation of Tesla's Wave Propagation: 155th Anniversary of Birth of Nikola Tesla, 2011 19th International Conference on Software, Telecommunications and Computer Networks (SoftCOM), Sep. 15-17, 2011, pp. 1-5, IEEE, Split, Croatia.
Li, Joshua Le-Wei et al., Keynote Speakers: Wireless Power Transfer: From Long-Distance Transmission to Short-Range Charging, 2013 IEEE International RF and Microwave Conference (RFM), Dec. 9-11, 2013, IEEE, Penang, Malaysia.
Keller, J. B. et al., Surface Waves Excitation and Propagation, Journal of Applied Physics, Jun. 1960, pp. 1039-1046, vol. 31, No. 6., AIP Publishing.

Chu, L. J., Physical Limitations on Omni-Directional Antennas, Journal of Applied Physics, Dec. 1948, pp. 1163-1175, vol. 19, AIP Publishing.
Wise, W. H., Note on Dipole Radiation Theory, Journal of Applied Physics, Oct. 1933, pp. 354-358, vol. 4, AIP Publishing.
Van Der Pol, B., Theory of the Reflection of the Light from a Point Source by a Finitely Conducting Flat Mirror, with an Application to Radiotelegraphy, Physica, Aug. 1935, pp. 843-853, vol. 2.
Friedman, B., Excitation of Surface Waves, The Institution of Electrical Engineers, Jan. 1958, pp. 252-258, Monograph No. 277 R.
Kabbary, F. M., Extremely Small High Power MW Broadcasting Antennas, IEE International Broadcasting Convention, Sep. 12-16, 1997, Conference Publication No. 447, Amsterdam.
Jordan, E. C. et al., Electromagnetic Waves and Radiating Systems, Second Edition, 1968, pp. 558-560, 730-734, Prentice-Hall, Inc., Englewood Cliffs, New Jersey.
Smythe, W. R., Static and Dynamic Electricity, 1950, pp. 542-547, McGraw-Hill Book Company, Inc., New York.
Office Action dated Oct. 10, 2018 (Philippines Application No. 1-2015-501919).
U.S. Appl. No. 13/789,525, filed Mar. 7, 2013, Restriction Requirement dated Oct. 7, 2015.
U.S. Appl. No. 13/789,525, filed Mar. 7, 2013, Response to Restriction Requirement dated Oct. 7, 2015.
U.S. Appl. No. 13/789,525, filed Mar. 7, 2013, Non-Final Office Action dated Feb. 11, 2016.
U.S. Appl. No. 13/789,525, filed Mar. 7, 2013, Response to Non-Final Office Action dated Feb. 11, 2016.
U.S. Appl. No. 13/789,525, filed Mar. 7, 2013, Final Office Action dated Sep. 16, 2016.
International Search Report and Written Opinion for PCT/US2015/053242 dated Jan. 25, 2016.
Examination Report issued in New Zealand Application No. 712566 dated Nov. 30, 2015.
Office Action Issued in Chilean Application No. 2506-2015 dated Sep. 29, 2016. (Partial English Translation included).
"Wireless Transmission Theory, the Tesla Effect," Tesla Radio, Dec. 23, 2011, pp. 1-6.
Peterson, Gary, "Comparing the Hertz-Wave and Tesla Wireless Systems," Feedline, Oct. 27, 2012, pp. 1-7, 9, 21st Century Books, Breckenridge, CO.
International Search Report and Written Opinion for PCT/US2015/035598 dated Sep. 11, 2015.
Examination Report issued in Australian Application No. 2014226221 dated Sep. 22, 2016.
U.S. Appl. No. 13/789,538, filed Mar. 7, 2013, Restriction Requirement dated Oct. 7, 2015.
U.S. Appl. No. 13/789,538, filed Mar. 7, 2013, Response to Restriction Requirement dated Oct. 7, 2015.
U.S. Appl. No. 13/789,538, filed Mar. 7, 2013, Non-Final Office Action dated Feb. 8, 2016.
U.S. Appl. No. 13/789,538, filed Mar. 7, 2013, Response to Non-Final Office Action dated Feb. 8, 2016.
U.S. Appl. No. 13/789,538, filed Mar. 7, 2013, Notice of Allowance dated Oct. 7, 2016.
Hill, et. al. "On the excitation of the Zenneck surface wave over the ground at 10Hz," May 1980, Ann ales des Telecommunications, vol. 35, Issue 5, pp. 179-182.
U.S. Appl. No. 13/789,525, filed Mar. 7, 2013, Response to Final Office Action dated Sep. 16, 2016.
Peterson, Gary, "Rediscovering the zenneck surface wave," Feb. 8, 2008, Feedline No. 4, 1-5.
U.S. Appl. No. 14/728,492, filed Jun. 2, 2015, Non-Final Office Action dated Dec. 16, 2016.
U.S. Appl. No. 14/728,507, filed Jun. 2, 2015, Non-Final Office Action dated Jan. 3, 2017.
Fujimoto et al., Small Antennas, Research Studies Press, 1987, p. 4.
Corum et al., Class Notes: Tesla Coils and the Failure of Lumped-Element Circuit Theory, published on the World Wide Web at http://www.teslatechnologyresearch.com/corum/, 1999.

(56) References Cited

OTHER PUBLICATIONS

Corum et al., RF Coils, Helical Resonators and Voltage Magnification by Coherent Spatial Modes, Microwave Review, Sep. 2001, pp. 36-45.
Burrows, Charles R., The Surface Wave in Radio Propagation, Proceedings of the Radio Club of America, Aug. 1937, pp. 15-18, vol. 14, No. 2.
Burrows, Charles R., The History of Radio Wave Propagation Up to the End of World War I, Proceedings of the IRE, May 1962, pp. 682-684, vol. 50, Issue 5.
Wolff, Edward A., Antenna Analysis, 1966, p. 33, John Wiley & Sons, Inc.
Vogler, L.E., A Note on the Attenuation Function for Propagation Over a Flat Layered Ground, IEEE Transactions on Antennas and Propagation, Mar. 1964, pp. 240-242, vol. AP-12, No. 2.
Banos, A., Dipole Radiation in the Presence of a Conducting Half-Space, 1966, pp. 148-158, Pergamon Press.
Barlow et al., Radio Surface Waves, 1962, pp. 1-5, 10-12, 29-33, Oxford University Press.
Brainerd et al., Ultra High Frequency Techniques, 1942, pp. 477-480, D. Van Nostrand Company, Inc., New York.
Bronwell et al., Theory and Application of Microwaves, 1947, pp. 384-387, 390, McGraw-Hill.
Clemmow, P.C., The Plane Wave Spectrum Representation of Electromagnetic Fields, 1966, pp. 30-31, Pergamon Press.
Collin, R.E., Field Theory of Guided Waves, 1960, pp. 453-454, McGraw-Hill.
Collin et al., Electromagnetic Fields, Antenna Theory—Part 1, 1969, p. 18, vol. 7, McGraw-Hill.
Collin, R.E., Antennas and Radiowave Propagation, 1985, pp. 377-385, McGraw-Hill.
Everitt et al., Communication Engineering, 3rd edition, 1956, p. 407, McGraw-Hill.
Felsen et al., Radiation and Scattering of Waves, 1973, pp. 506-513, 554-559, Prentice-Hall.
Friedman, B., Principles and Techniques of Applied Mathematics, 1956, pp. 213-214, 283-286, 290, 298-300, Wiley.
Hansen, R.C., Electrically Small, Superdirective, and Superconducting Antennas, 2006, pp. 62-64, Wiley Interscience.
Hansen et al., Small Antenna Handbook, 2011, pp. 147-150, Wiley, New Jersey.
Harrington, R.F., Time-Harmonic Electromagnetic Fields, 1961, pp. 460-463, McGraw-Hill.
Ishimaru, A., Electromagnetic Wave Propagation, Radiation and Scattering, 1991, pp. 456-461, Prentice-Hall, New Jersey.
Wise, W.H., The Grounded Condenser Antenna Radiation Formula, Proc. IRE, Sep. 1931, pp. 1684-1689, vol. 19, No. 9.
Kraus, J.D., Antennas, 1950, pp. 33-34, 452-453, 461-463, McGraw-Hill.
Wise, W.H., Asymptotic Dipole Radiation Formulas, Bell System Technical Journal, Oct. 1929, pp. 662-671, vol. 8.
Ramo et al., Fields and Waves in Communication Electronics, 3rd Edition, 1994, pp. 435-437, Wiley.
Ryder, J.D., Networks, Lines and Fields, 1949, pp. 422-425, Prentice Hall, New York.
Reich et al., Microwave Theory and Techniques, 1953, pp. 291-293, Van Nostrand.
Sarbacher et al., Hyper and Ultrahigh Frequency Engineering, 1943, pp. 201-202, Wiley & Sons, Inc.
Schelkunoff, S.A., Electromagnetic Waves, 1943, pp. 49, 428-437, Van Nostrand Company, New York.
Tesla, N., The Problem of Increasing Human Energy with Special References to the Harnessing of the Sun's Energy, The Century Illustrated Monthly Magazine, Jun. 1900, pp. 1-35.
Van Der Pol, B., On Discontinuous Electromagnetic Waves and the Occurrence of a Surface Wave, IEEE Transactions on Antennas and Propagation, Jul. 1956, pp. 288-293, vol. AP-4.
Eckert, Robert P., Modern Methods for Calculating Ground-Wave Field Strength Over a Smooth Spherical Earth, Report to the Federal Communications Division, Feb. 1986.
Wait et al., Radiation from a Vertical Dipole over a Stratified Ground (Part II), IRE Transactions on Antennas and Propagation, Oct. 1954, pp. 144-146, vol. AP-3, No. 4.
Tesla, N., From Colorado Springs to Long Island, Nikola Tesla Museum, 2008, pp. 485, 487, Nikola Tesla Museum.
Cross et al., An Advanced VHF/UHF Short Range, Groundwave Propagation Model for Paths with Near-Earth Antennas, MegaWave Corporation, Nov. 1, 2006, Boylston, MA.
Tyras, G., Radiation and Propagation of Electromagnetic Waves, 1969, pp. 33-36, Academic Press.
Wait, J.R., Wave Propagation Theory, 1981, pp. 67-75, 117-127, Pergamon Press.
Wait, J.R., Electromagnetic Wave Theory, 1985, pp. 254-259, Harper and Row, Publishers, New York.
Wait, J.R., Electromagnetic Waves in Stratified Media, 1996, pp. 8-10, IEEE Press, Reprint from 1962 edition, Pergamon Press.
Hessel, A., General Characteristics of Traveling-Wave Antennas, Antenna Theory—Part 2, Chapter 19, Appendix B, 1969, pp. 238-241, McGraw-Hill Book Company, New York.
Sarkar et al., Electromagnetic Macro Modeling of Propagation in Mobile Wireless Communication: Theory and Experiment, IEEE Antennas and Propagation Magazine, Dec. 2012, pp. 17-43, vol. 54, No. 6.
Wait, J.R., Characteristics of Antennas over Lossy Earth, Antenna Theory—Part 2, Chapter 23, 1969, pp. 386-391, McGraw-Hill Book Company, New York.
Wait, J.R., Theory of Ground Wave Propagation, Electromagnetic Probing in Geophysics, Chapter 5, 1971, pp. 163-172, 204-207, Golem Press, Boulder, Colorado.
Smith, M.S., Conventional Explanation for Crossed-Field Antenna, Electronics Letters, Feb. 13, 1992, pp. 360-361, vol. 28, No. 4.
Tesla, N., The Transmission of Electrical Energy Without Wires as a Means of Furthering Peace, Electrical World and Engineer, Jan. 7, 1905, pp. 21-24.
Wait et al., Excitation of the HF Surface Wave by Vertical and Horizontal Antennas, Radio Science, Sep.-Oct. 1979, pp. 767-780, vol. 14, No. 5.
Wait, J.R., A Note on Surface Waves and Ground Waves, IEEE Transactions on Antennas and Propagation, Nov. 1965, pp. 996-997, vol. AP-13.
Nikola Tesla, Nikola Tesla on His Work With Alternating Currents and Their Application to Wireless Telegraphy, Telephony, and Transmission of Power, 2002, pp. 1-240, Twenty First Century Books, Breckenridge, Colorado.
Tesla, N., Colorado Springs Notes: 1899-1900, 1978, pp. 1-437, Nolit, Beograd, Yugoslavia.
Singh A. K. et al., Excitation of surface electromagnetic waves on water, App Optics, Nov. 1, 1978, pp. 3459-3465, vol. 17, No. 21.
Olivier Balosso et al., Brief overview about Surface Wave theory and applications, 2012 15th International Symposium on Antenna Technology and Applied Electromagnetics (Antem), Jun. 25, 2012, pp. 1-7, IEEE.
International Search Report and Written Opinion for PCT/US2015/035598 dated Jul. 21, 2014.
Menelle M et al., Full digital high frequency surface wave radar: French trials in the Biscay bay, 2008 International Conference on RADAR, Sep. 2, 2008, pp. 224-229, IEEE, Piscataway, NJ, USA.
J. O. Hinz et al., A MIMO FMCW radar approach to HFSWR, Advances in Radio Science: ARS, Jul. 29, 2011, pp. 159-163, retrieved from the Internet: http://www.adv-radio-sci.net/9/159/2011/ars-9-159-2011.pdf (retrieved on Dec. 4, 2015), Katlenburg-Lindau, Germany.
Guohua Wang et al., High Resolution MIMO-HFSWR Radar Using Sparse Frequency Waveforms, Wireless Sensor Network, Oct. 1, 2009, pp. 152-162, vol. 1, No. 3.
International Search Report and Written Opinion for PCT/US2015/049505 dated Dec. 14, 2015.
International Search Report and Written Opinion for PCT/US2015/049394 dated Dec. 14, 2015.
International Search Report and Written Opinion for PCT/US2015/049064 dated Dec. 11, 2015.
International Search Report and Written Opinion for PCT/US2015/049509 dated Dec. 18, 2015.

(56) References Cited

OTHER PUBLICATIONS

H. M. Barlow et al., Surface Waves, Proceedings of the IRE, Nov. 1, 1953, pp. 329-341, vol. 100, No. 68, US.
International Search Report and Written Opinion for PCT/US2015/049171 dated Dec. 16, 2015.
International Search Report and Written Opinion for PCT/US2015/049435 dated Dec. 22, 2015.
International Search Report and Written Opinion for PCT/US2015/049424 dated Dec. 18, 2015.
International Search Report and Written Opinion for PCT/US2015/049151 dated Dec. 17, 2015.
International Search Report and Written Opinion for PCT/US2015/049161 dated Dec. 17, 2015.
International Search Report and Written Opinion for PCT/US2015/049518 dated Dec. 18, 2015.
International Search Report and Written Opinion for PCT/US2015/049154 dated Dec. 15, 2015.
Hambling, David, "Skimming the Surface: The Return of Tesla's Surface Waves", Published by Popular Mechanics on the Internet at http://www.popularmechanics.com/technology/infrastructure/a8778/ skimming-the-surface-the-return-of-teslas-surface-waves-15322250/, Apr. 8, 2013, Popular Mechanics.
Barfield, R. H., "The Attenuation of Wireless Waves Over Land," Journal of the I.E.E. (British), Jan. 1928, pp. 204-214, vol. 66.
Michalski, K. A. et al., "The Sommerfeld half-space problem revisited: from radio frequencies and Zenneck waves to visible light and Fano modes," Journal of Electromagnetic Waves and Applications, Jan. 2016, pp. 1-42, vol. 30, No. 1, Taylor & Francis.
Noether, F., "Spreading of Electric Waves Along the Earth," published in the book translation Theory of Functions as Applied to Engineering Problems, Technology Press, 1942, pp. 167-184, Part 2, Section E, MIT. [Originally published by Springer, Berlin, in 1931 under the title Funktionentheorie und Ihre Anwendung in der Technik, Part II, R. Rothe, F. Ollendorf, and K. Pohlhausen, editors.].
Japanese Office Action with Partial Translation, dated Jan. 9, 2018 (Japanese Patent Application No. 2015-561472).
U.S. Appl. No. 14/728,507, filed Jun. 2, 2015, Non-Final Office Action dated Apr. 6, 2018.
Patent Application PCT/US2016/047344 filed on Aug. 17, 2016, International Search Report dated Feb. 8, 2017.
Patent Application PCT/US2016/047676 filed on Aug. 19, 2016, International Search Report dated Nov. 3, 2017.
Patent Application PCT/US2016/047672 filed on Aug. 19, 2016, International Search Report dated Nov. 3, 2016.
Patent Application PCT/US2016/046488 filed on Aug. 11, 2016, International Search Report dated Dec. 19, 2016.
Patent Application PCT/US2016/047674 filed on Aug. 19, 2016, International Search Report dated Dec. 20, 2016.
Patent Application PCT/US2016/047167 filed on Aug. 16, 2016, International Search Report dated Oct. 27, 2016.
Patent Application PCT/US2016/047375 filed on Aug. 17, 2016, International Search Report dated Dec. 2, 2016.
Patent Application PCT/US2016/047599 filed on Aug. 18, 2016, International Search Report dated Nov. 23, 2016.
Patent Application PCT/US2016/047673 filed on Aug. 19, 2016, International Search Report dated Nov. 29, 2016.
Patent Application PCT/US2016/047446 filed on Aug. 18, 2016, International Search Report dated Nov. 3, 2016.
Patent Application PCT/US2016/047353 filed on Aug. 17, 2016, International Search Report dated Nov. 16, 2016.
Patent Application PCT/US2016/047170 filed on Aug. 16, 2016, International Search Report dated Nov. 11, 2016.
Patent Application PCT/US2016/047611 filed on Aug. 18, 2016, International Search Report dated Nov. 11, 2016.
Patent Application PCT/US2016/047455 filed on Aug. 18, 2016, International Search Report and Written Opinion dated Nov. 7, 2016.
Patent Application PCT/US2016/047452 filed on Aug. 18, 2016, International Search Report and Written Opinion dated Nov. 17, 2016.
Leonhard, W., Electrical Engineering Between Energy and Information, Power Electronics and Motion Control Conference, 2000. Proceedings. PI EMC 2000. The Third International Aug. 15-18, 2000, IEEE, vol. 1, Aug. 15, 2000, pp. 197-202, Piscataway, NJ, USA.
Patent Application PCT/US2016/047451 filed on Aug. 18, 2016, International Search Report and Written Opinion dated Nov. 17, 2016.
Patent Application PCT/US16/47986 filed on Aug. 22, 2016, International Search Report and Written Opinion dated Nov. 17, 2016.
Patent Application PCT/US2016/047954 filed on Aug. 22, 2016, International Search Report and Written Opinion dated Nov. 24, 2016.
Zoran, B. et al, Some Notes on Transmission Line Representations of Tesla's Transmitters, 16th International Conference on Software, Telecommunications and Computer Networks, Softcom 2008, IEEE. Sep. 25, 2008, pp. 60-69, Piscataway. NJ, USA.
Patent Application PCT/US2016/047957 filed on Aug. 22, 2016, International Search Report and Written Opinion dated Nov. 17, 2016.
Patent Application PCT/US2016/048314 filed on Aug. 24, 2016, International Search Report and Written Opinion dated Nov. 17, 2016.
Patent Application PCT/US2016/047675 filed on Aug. 19, 2016, International Search Report and Written Opinion dated Nov. 25, 2016.
Patent Application PCT/US2016/047955 filed on Aug. 22, 2016, International Search Report and Written Opinion dated Nov. 17, 2016.
Patent Application PCT/US2016/047457 filed on Aug. 18, 2016, International Search and Written Opinion dated Nov. 18, 2016.
Patent Application PCT/US2016/047368 filed on Aug. 17, 2016, International Search Report and Written Opinion dated Nov. 4, 2016.
Patent Application PCT/US2016/047338 filed on Aug. 17, 2016, International Search Report and Written Opinion dated Nov. 17, 2016.
Patent Application PCT/US2016/047598 filed on Aug. 18, 2016, International Search Report and Written Opinion dated Nov. 3, 2016.
Patent Application PCT/US2015/049236 filed on Sep. 9, 2015, International Search Report and Written Opinion dated Jan. 4, 2016.
Patent Application PCT/US2015/049511 filed on Sep. 10, 2015, International Search Report and Written Opinion dated Jan. 5, 2016.
Patent Application PCT/US2015/049523 filed on Sep. 10, 2015, International Search Report and Written Opinion dated Jan. 7, 2016.
Patent Application PCT/US2015/049497 filed on Sep. 10, 2015, International Search Report and Written Opinion dated Dec. 23, 2015.
Patent Application PCT/US2015/049520 filed on Sep. 10, 2015, International Search Report and Written Opinion dated Jan. 15, 2016.
Rich, G. J., The Launching of a Plane Surface Wave, Proceedings of the IEEE—Part B: Radio and Electronic Engineering, Mar. 1, 1955, pp. 237-246, vol. 102, No. 2, US.
Ranfagni, A. et al, Observation of Zenneck-type Waves in Microwave Propagation Experiments, Journal of Applied Physics, Jul. 2006, pp. 024910-1-024910-5, vol. 100, No. 2, US.
Mahmoud, S. F. et al, Reflection of Surface Waves on a Dielectric Image Line with Application to 'Guided RADAR', Microwave Symposium, 1972 IEEE GMTT International, May 22, 1972, pp. 139-141, Piscataway, NJ, US.
Examination Report issued in New Zealand Application No. 720048 dated May 12, 2017.
Examination Report issued in New Zealand Application No. 720048 dated Jan. 25, 2017.
Patent Application PCT/US2016/047350 filed on Aug. 17, 2016, International Search Report dated Mar. 9, 2017.

(56) References Cited

OTHER PUBLICATIONS

Patent Application PCT/US2015/049171 filed on Sep. 9, 2015, International Search Report and Written Opinion dated Dec. 16, 2015.
International Search Report and Written Opinion for PCT/US2016/047677 dated Oct. 18, 2016.
International Search Report and Written Opinion for PCT/US2016/047956 dated Oct. 21, 2016.

* cited by examiner

ADJUSTMENT OF GUIDED SURFACE WAVEGUIDE PROBE OPERATION

CROSS REFERENCE TO RELATED APPLICATIONS

This application claims priority to, and the benefit of, U.S. Provisional Patent Application entitled "Adjustment of Guided Surface Waveguide Probe Operation," which was filed on Mar. 7, 2017 and assigned Application No. 62/468,130, and which is hereby incorporated by reference in its entirety.

This application is related to co-pending U.S. Non-provisional patent application entitled "Excitation and Use of Guided Surface Waves," which was filed on Jun. 2, 2015 and assigned application Ser. No. 14/728,507, and was published on Dec. 8, 2016 as Publication Number US2016/0359336 A1, and which is incorporated herein by reference in its entirety. This application is further related to co-pending U.S. Non-provisional patent application entitled "Excitation and Use of Guided Surface Waves," which was filed on Jun. 2, 2015 and assigned application Ser. No. 14/728,492, and was published on Dec. 8, 2016 as Publication Number US2016/0359335 A1, and which is incorporated herein by reference in its entirety. This application is also related to co-pending U.S. Non-provisional patent application entitled "Excitation and Use of Guided Surface Wave Modes on Lossy Media," which was filed on Mar. 7, 2013 and assigned application Ser. No. 13/789,538, and was published on Sep. 11, 2014 as Publication Number US2014/0252886 A1, and which is incorporated herein by reference in its entirety. This application is also related to co-pending U.S. Non-provisional patent application entitled "Excitation and Use of Guided Surface Wave Modes on Lossy Media," which was filed on Mar. 7, 2013 and assigned application Ser. No. 13/789,525, and was published on Sep. 11, 2014 as Publication Number US2014/0252865 A1, and which is incorporated herein by reference in its entirety. This application is further related to co-pending U.S. Non-provisional patent application entitled "Excitation and Use of Guided Surface Wave Modes on Lossy Media," which was filed on Sep. 10, 2014 and assigned application Ser. No. 14/483,089, and which is incorporated herein by reference in its entirety.

BACKGROUND

For over a century, signals transmitted by radio waves involved radiation fields launched using conventional antenna structures. In contrast to radio science, electrical power distribution systems in the last century involved the transmission of energy guided along electrical conductors. This understanding of the distinction between radio frequency (RF) and power transmission has existed since the early 1900's.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
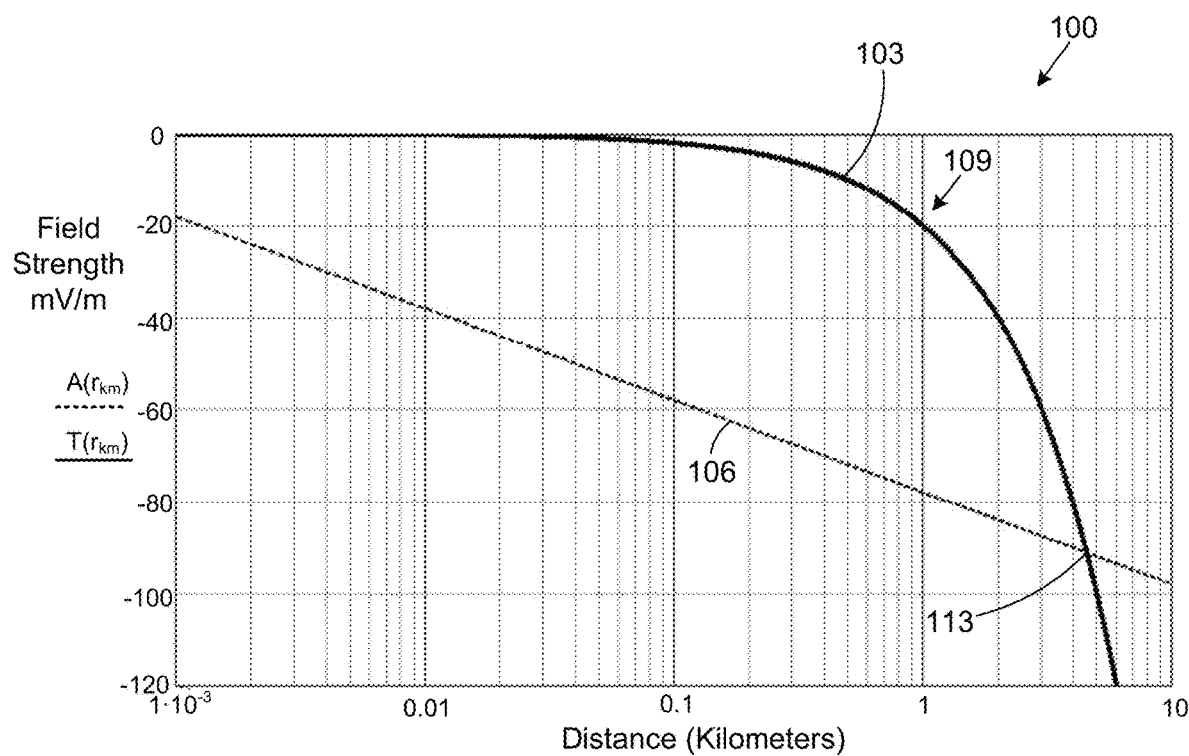
FIG. 1 is a chart that depicts field strength as a function of distance for a guided electromagnetic field and a radiated electromagnetic field.

To begin, some terminology shall be established to provide clarity in the discussion of concepts to follow. First, as contemplated herein, a formal distinction is drawn between radiated electromagnetic fields and guided electromagnetic fields.

As contemplated herein, a radiated electromagnetic field comprises electromagnetic energy that is emitted from a source structure in the form of waves that are not bound to a waveguide. For example, a radiated electromagnetic field is generally a field that leaves an electric structure such as an antenna and propagates through the atmosphere or other medium and is not bound to any waveguide structure. Once radiated electromagnetic waves leave an electric structure such as an antenna, they continue to propagate in the medium of propagation (such as air) independent of their source until they dissipate regardless of whether the source continues to operate. Once electromagnetic waves are radiated, they are not recoverable unless intercepted, and, if not intercepted, the energy inherent in the radiated electromagnetic waves is lost forever. Electrical structures such as antennas are designed to radiate electromagnetic fields by maximizing the ratio of the radiation resistance to the structure loss resistance. Radiated energy spreads out in space and is lost regardless of whether a receiver is present. The energy density of the radiated fields is a function of distance due to geometric spreading. Accordingly, the term "radiate" in all its forms as used herein refers to this form of electromagnetic propagation.

A guided electromagnetic field is a propagating electromagnetic wave whose energy is concentrated within or near boundaries between media having different electromagnetic properties. In this sense, a guided electromagnetic field is one that is bound to a waveguide and may be characterized as being conveyed by the current flowing in the waveguide. If there is no load to receive and/or dissipate the energy conveyed in a guided electromagnetic wave, then no energy is lost except for that dissipated in the conductivity of the guiding medium. Stated another way, if there is no load for a guided electromagnetic wave, then no energy is consumed. Thus, a generator or other source generating a guided electromagnetic field does not deliver real power unless a resistive load is present. To this end, such a generator or other source essentially runs idle until a load is presented. This is akin to running a generator to generate a 60 Hertz electromagnetic wave that is transmitted over power lines where there is no electrical load. It should be noted that a guided electromagnetic field or wave is the equivalent to what is termed a "transmission line mode." This contrasts with radiated electromagnetic waves in which real power is supplied at all times in order to generate radiated waves. Unlike radiated electromagnetic waves, guided electromagnetic energy does not continue to propagate along a finite length waveguide after the energy source is turned off. Accordingly, the term "guide" in all its forms as used herein refers to this transmission mode of electromagnetic propagation.

Referring now to FIG. 1, shown is a graph 100 of field strength in decibels (dB) above an arbitrary reference in volts per meter as a function of distance in kilometers on a log-dB plot to further illustrate the distinction between radiated and guided electromagnetic fields. The graph 100 of FIG. 1 depicts a guided field strength curve 103 that shows the field strength of a guided electromagnetic field as a function of distance. This guided field strength curve 103 is essentially the same as a transmission line mode. Also, the graph 100 of FIG. 1 depicts a radiated field strength curve 106 that shows the field strength of a radiated electromagnetic field as a function of distance.

Of interest are the shapes of the curves 103 and 106 for guided wave and for radiation propagation, respectively. The radiated field strength curve 106 falls off geometrically (1/d, where d is distance), which is depicted as a straight line on the log-log scale. The guided field strength curve 103, on the other hand, has a characteristic exponential decay of $e^{-\alpha d}/\sqrt{d}$ and exhibits a distinctive knee 109 on the log-log scale. The guided field strength curve 103 and the radiated field strength curve 106 intersect at point 113, which occurs at a crossing distance. At distances less than the crossing distance at intersection point 113, the field strength of a guided electromagnetic field is significantly greater at most locations than the field strength of a radiated electromagnetic field. At distances greater than the crossing distance, the opposite is true. Thus, the guided and radiated field strength curves 103 and 106 further illustrate the fundamental propagation difference between guided and radiated electromagnetic fields. For an informal discussion of the difference between guided and radiated electromagnetic fields, reference is made to Milligan, T., *Modern Antenna Design*, McGraw-Hill, 1$^{st}$ Edition, 1985, pp. 8-9, which is incorporated herein by reference in its entirety.

The distinction between radiated and guided electromagnetic waves, made above, is readily expressed formally and placed on a rigorous basis. That two such diverse solutions could emerge from one and the same linear partial differential equation, the wave equation, analytically follows from the boundary conditions imposed on the problem. The Green function for the wave equation, itself, contains the distinction between the nature of radiation and guided waves.

In empty space, the wave equation is a differential operator whose eigenfunctions possess a continuous spectrum of eigenvalues on the complex wave-number plane. This transverse electro-magnetic (TEM) field is called the radiation field, and those propagating fields are called "Hertzian waves." However, in the presence of a conducting boundary, the wave equation plus boundary conditions mathematically lead to a spectral representation of wave-numbers composed of a continuous spectrum plus a sum of discrete spectra. To this end, reference is made to Sommerfeld, A., "Uber die Ausbreitung der Wellen in der Drahtlosen Telegraphie," Annalen der Physik, Vol. 28, 1909, pp. 665-736. Also see Sommerfeld, A., "Problems of Radio," published as Chapter 6 in *Partial Differential Equations in Physics—Lectures on Theoretical Physics: Volume VI*, Academic Press, 1949, pp. 236-289, 295-296; Collin, R. E., "Hertzian Dipole Radiating Over a Lossy Earth or Sea: Some Early and Late $20^{th}$ Century Controversies," *IEEE Antennas and Propagation Magazine*, Vol. 46, No. 2, April 2004, pp. 64-79; and Reich, H. J., Ordnung, P. F, Krauss, H. L., and Skalnik, J. G., *Microwave Theory and Techniques*, Van Nostrand, 1953, pp. 291-293, each of these references being incorporated herein by reference in their entirety.

The terms "ground wave" and "surface wave" identify two distinctly different physical propagation phenomena. A surface wave arises analytically from a distinct pole yielding a discrete component in the plane wave spectrum. See, e.g., "The Excitation of Plane Surface Waves" by Cullen, A. L., (*Proceedings of the IEE* (British), Vol. 101, Part IV, August 1954, pp. 225-235). In this context, a surface wave is considered to be a guided surface wave. The surface wave (in the Zenneck-Sommerfeld guided wave sense) is, physically and mathematically, not the same as the ground wave (in the Weyl-Norton-FCC sense) that is now so familiar from radio broadcasting. These two propagation mechanisms arise from the excitation of different types of eigenvalue spectra (continuum or discrete) on the complex plane. The field strength of the guided surface wave decays exponentially with distance as illustrated by curve 103 of FIG. 1 (much like propagation in a lossy waveguide) and resembles propagation in a radial transmission line, as opposed to the classical Hertzian radiation of the ground wave, which propagates spherically, possesses a continuum of eigenvalues, falls off geometrically as illustrated by curve 106 of FIG. 1, and results from branch-cut integrals. As experimentally demonstrated by C. R. Burrows in "The Surface Wave in Radio Propagation over Plane Earth" (*Proceedings of the IRE*, Vol. 25, No. 2, February, 1937, pp. 219-229) and "The Surface Wave in Radio Transmission" (*Bell Laboratories Record*, Vol. 15, June 1937, pp. 321-324), vertical antennas radiate ground waves but do not launch guided surface waves.

To summarize the above, first, the continuous part of the wave-number eigenvalue spectrum, corresponding to branch-cut integrals, produces the radiation field, and second, the discrete spectra, and corresponding residue sum arising from the poles enclosed by the contour of integration, result in non-TEM traveling surface waves that are exponentially damped in the direction transverse to the propagation. Such surface waves are guided transmission line modes. For further explanation, reference is made to Friedman, B., *Principles and Techniques of Applied Mathematics*, Wiley, 1956, pp. pp. 214, 283-286, 290, 298-300.

In free space, antennas excite the continuum eigenvalues of the wave equation, which is a radiation field, where the outwardly propagating RF energy with $E_z$ and $H_\phi$ in-phase is lost forever. On the other hand, waveguide probes excite discrete eigenvalues, which results in transmission line propagation. See Collin, R. E., *Field Theory of Guided Waves*, McGraw-Hill, 1960, pp. 453, 474-477. While such theoretical analyses have held out the hypothetical possibility of launching open surface guided waves over planar or spherical surfaces of lossy, homogeneous media, for more than a century no known structures in the engineering arts have existed for accomplishing this with any practical efficiency. Unfortunately, since it emerged in the early 1900's, the theoretical analysis set forth above has essentially remained a theory and there have been no known structures for practically accomplishing the launching of open surface guided waves over planar or spherical surfaces of lossy, homogeneous media.

According to the various embodiments of the present disclosure, various guided surface waveguide probes are described that are configured to excite electric fields that couple into a guided surface waveguide mode along the surface of a lossy conducting medium. Such guided electromagnetic fields are substantially mode-matched in magnitude and phase to a guided surface wave mode on the surface of the lossy conducting medium. Such a guided surface wave mode can also be termed a Zenneck waveguide mode. By virtue of the fact that the resultant fields excited by the guided surface waveguide probes described herein are substantially mode-matched to a guided surface waveguide mode on the surface of the lossy conducting medium, a guided electromagnetic field in the form of a guided surface wave is launched along the surface of the lossy conducting medium. According to one embodiment, the lossy conducting medium comprises a terrestrial medium such as the Earth.

Figure 2:
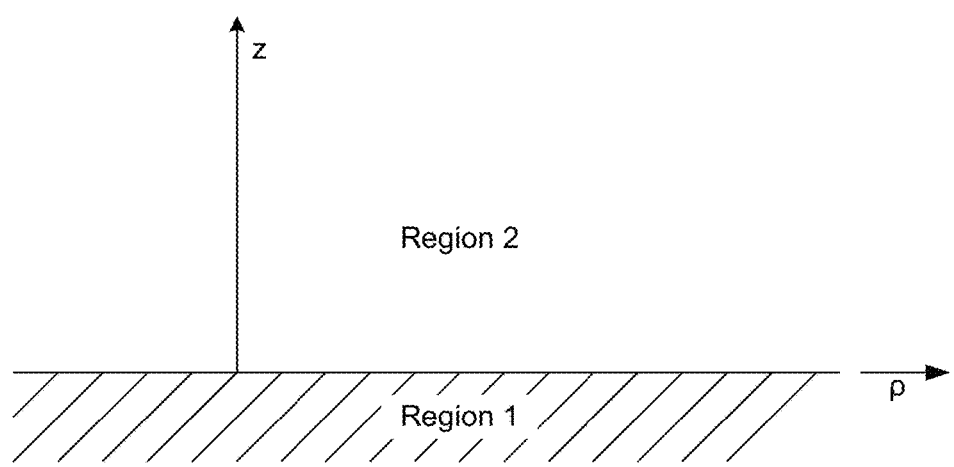
FIG. 2 is a drawing that illustrates a propagation interface with two regions employed for transmission of a guided surface wave according to various embodiments of the present disclosure.

Referring to FIG. 2, shown is a propagation interface that provides for an examination of the boundary value solutions to Maxwell's equations derived in 1907 by Jonathan Zenneck as set forth in his paper Zenneck, J., "On the Propagation of Plane Electromagnetic Waves Along a Flat Conducting Surface and their Relation to Wireless Telegraphy," Annalen der Physik, Serial 4, Vol. 23, Sep. 20, 1907, pp. 846-866. FIG. 2 depicts cylindrical coordinates for radially propagating waves along the interface between a lossy conducting medium specified as Region 1 and an insulator specified as Region 2. Region 1 can comprise, for example, any lossy conducting medium. In one example, such a lossy conducting medium can comprise a terrestrial medium such as the Earth or other medium. Region 2 is a second medium that shares a boundary interface with Region 1 and has different constitutive parameters relative to Region 1. Region 2 can comprise, for example, any insulator such as the atmosphere or other medium. The reflection coefficient for such a boundary interface goes to zero only for incidence at a complex Brewster angle. See Stratton, J. A., *Electromagnetic Theory*, McGraw-Hill, 1941, p. 516.

According to various embodiments, the present disclosure sets forth various guided surface waveguide probes that generate electromagnetic fields that are substantially mode-matched to a guided surface waveguide mode on the surface of the lossy conducting medium comprising Region 1. According to various embodiments, such electromagnetic fields substantially synthesize a wave front incident at a complex Brewster angle of the lossy conducting medium that can result in zero reflection.

To explain further, in Region 2, where an $e^{j\omega t}$ field variation is assumed and where $\rho \neq 0$ and $z \geq 0$ (with z being the vertical coordinate normal to the surface of Region 1, and ρ being the radial dimension in cylindrical coordinates), Zenneck's closed-form exact solution of Maxwell's equations satisfying the boundary conditions along the interface are expressed by the following electric field and magnetic field components:

$$H_{2\phi} = Ae^{-u_2 z} H_1^{(2)}(-j\gamma\rho), \quad (1)$$

$$E_{2\rho} = A\left(\frac{u_2}{j\omega\varepsilon_o}\right)e^{-u_2 z} H_1^{(2)}(-j\gamma\rho), \text{ and} \quad (2)$$

$$E_{2z} = A\left(\frac{-\gamma}{\omega\varepsilon_o}\right)e^{-u_2 z} H_0^{(2)}(-j\gamma\rho). \quad (3)$$

In Region 1, where the $e^{j\omega t}$ field variation is assumed and where $\rho \neq 0$ and $z \leq 0$, Zenneck's closed-form exact solution of Maxwell's equations satisfying the boundary conditions along the interface is expressed by the following electric field and magnetic field components:

$$H_{1\phi} = Ae^{u_1 z} H_1^{(2)}(-j\gamma\rho), \quad (4)$$

$$E_{1\rho} = A\left(\frac{-u_1}{\sigma_1 + j\omega\varepsilon_1}\right)e^{u_1 z} H_1^{(2)}(-j\gamma\rho), \text{ and} \quad (5)$$

$$E_{1z} = A\left(\frac{-j\gamma}{\sigma_1 + j\omega\varepsilon_1}\right)e^{u_1 z} H_0^{(2)}(-j\gamma\rho). \quad (6)$$

In these expressions, z is the vertical coordinate normal to the surface of Region 1 and ρ is the radial coordinate, $H_n^{(2)}(-j\gamma\rho)$ is a complex argument Hankel function of the second kind and order n, $u_1$ is the propagation constant in the positive vertical (z) direction in Region 1, $u_2$ is the propagation constant in the vertical (z) direction in Region 2, $\sigma_1$ is the conductivity of Region 1, ω is equal to 2πf, where f is a frequency of excitation, $\varepsilon_0$ is the permittivity of free space, $\varepsilon_1$ is the permittivity of Region 1, A is a source constant imposed by the source, and γ is a surface wave radial propagation constant.

The propagation constants in the ±z directions are determined by separating the wave equation above and below the interface between Regions 1 and 2, and imposing the boundary conditions. This exercise gives, in Region 2, $$u_2 = \frac{-jk_o}{\sqrt{1+(\varepsilon_r - jx)}} \quad (7)$$

and gives, in Region 1, $$u_1 = -u_2(\varepsilon_r - jx). \quad (8)$$

The radial propagation constant γ is given by $$\gamma = j\sqrt{k_o^2 + u_2^2} = j\frac{k_o n}{\sqrt{1+n^2}}, \quad (9)$$

which is a complex expression where n is the complex index of refraction given by $$n = \sqrt{\varepsilon_r - jx}. \quad (10)$$

In all of the above Equations, $$x = \frac{\sigma_1}{\omega\varepsilon_o}, \text{ and} \quad (11)$$

$$k_o = \omega\sqrt{\mu_o \varepsilon_o} = \frac{\lambda_o}{2\pi}, \quad (12)$$

where $\varepsilon_r$ comprises the relative permittivity of Region 1, $\sigma_1$ is the conductivity of Region 1, $\varepsilon_0$ is the permittivity of free space, and $\gamma_0$ comprises the permeability of free space. Thus, the generated surface wave propagates parallel to the interface and exponentially decays vertical to it. This is known as evanescence.

Thus, Equations (1)-(3) can be considered to be a cylindrically-symmetric, radially-propagating waveguide mode. See Barlow, H. M., and Brown, J., *Radio Surface Waves*, Oxford University Press, 1962, pp. 10-12, 29-33. The present disclosure details structures that excite this "open boundary" waveguide mode. Specifically, according to various embodiments, a guided surface waveguide probe is provided with a charge terminal of appropriate size that is fed with voltage and/or current and is positioned relative to the boundary interface between Region 2 and Region 1. This may be better understood with reference to FIG. 3, which shows an example of a guided surface waveguide probe 300a that includes a charge terminal $T_1$ elevated above a lossy conducting medium 303 (e.g., the earth) along a vertical axis z that is normal to a plane presented by the lossy conducting medium 303. The lossy conducting medium 303 makes up Region 1, and a second medium 306 makes up Region 2 and shares a boundary interface with the lossy conducting medium 303.

According to one embodiment, the lossy conducting medium 303 can comprise a terrestrial medium such as the planet Earth. To this end, such a terrestrial medium comprises all structures or formations included thereon whether natural or man-made. For example, such a terrestrial medium can comprise natural elements such as rock, soil, sand, fresh water, sea water, trees, vegetation, and all other natural elements that make up our planet. In addition, such a terrestrial medium can comprise man-made elements such as concrete, asphalt, building materials, and other man-made materials. In other embodiments, the lossy conducting medium 303 can comprise some medium other than the Earth, whether naturally occurring or man-made. In other embodiments, the lossy conducting medium 303 can comprise other media such as man-made surfaces and structures such as automobiles, aircraft, man-made materials (such as plywood, plastic sheeting, or other materials) or other media.

In the case where the lossy conducting medium 303 comprises a terrestrial medium or Earth, the second medium 306 can comprise the atmosphere above the ground. As such, the atmosphere can be termed an "atmospheric medium" that comprises air and other elements that make up the atmosphere of the Earth. In addition, it is possible that the second medium 306 can comprise other media relative to the lossy conducting medium 303.

The guided surface waveguide probe 300a includes a feed network 309 that couples an excitation source 312 to the charge terminal $T_1$ via, e.g., a vertical feed line conductor. According to various embodiments, a charge $Q_1$ is imposed on the charge terminal $T_1$ to synthesize an electric field based upon the voltage applied to terminal $T_1$ at any given instant. Depending on the angle of incidence ($\theta_i$) of the electric field (E), it is possible to substantially mode-match the electric field to a guided surface waveguide mode on the surface of the lossy conducting medium 303 comprising Region 1.

By considering the Zenneck closed-form solutions of Equations (1)-(6), the Leontovich impedance boundary condition between Region 1 and Region 2 can be stated as $$\hat{z} \times \vec{H}_2(\rho,\varphi,0) = \vec{J}_s, \qquad (13)$$

where $\hat{z}$ is a unit normal in the positive vertical (+z) direction and $\vec{H}_2$ is the magnetic field strength in Region 2 expressed by Equation (1) above. Equation (13) implies that the electric and magnetic fields specified in Equations (1)-(3) may result in a radial surface current density along the boundary interface, where the radial surface current density can be specified by $$J_\rho(\rho') = -A H_1^{(2)}(-j\gamma\rho') \qquad (14)$$

where A is a constant. Further, it should be noted that close-in to the guided surface waveguide probe 300 (for $\rho \ll \lambda$), Equation (14) above has the behavior $$J_{close}(\rho') = \frac{-A(j2)}{\pi(-j\gamma\rho')} = -H_\phi = -\frac{I_o}{2\pi\rho'}. \qquad (15)$$

Figure 3:
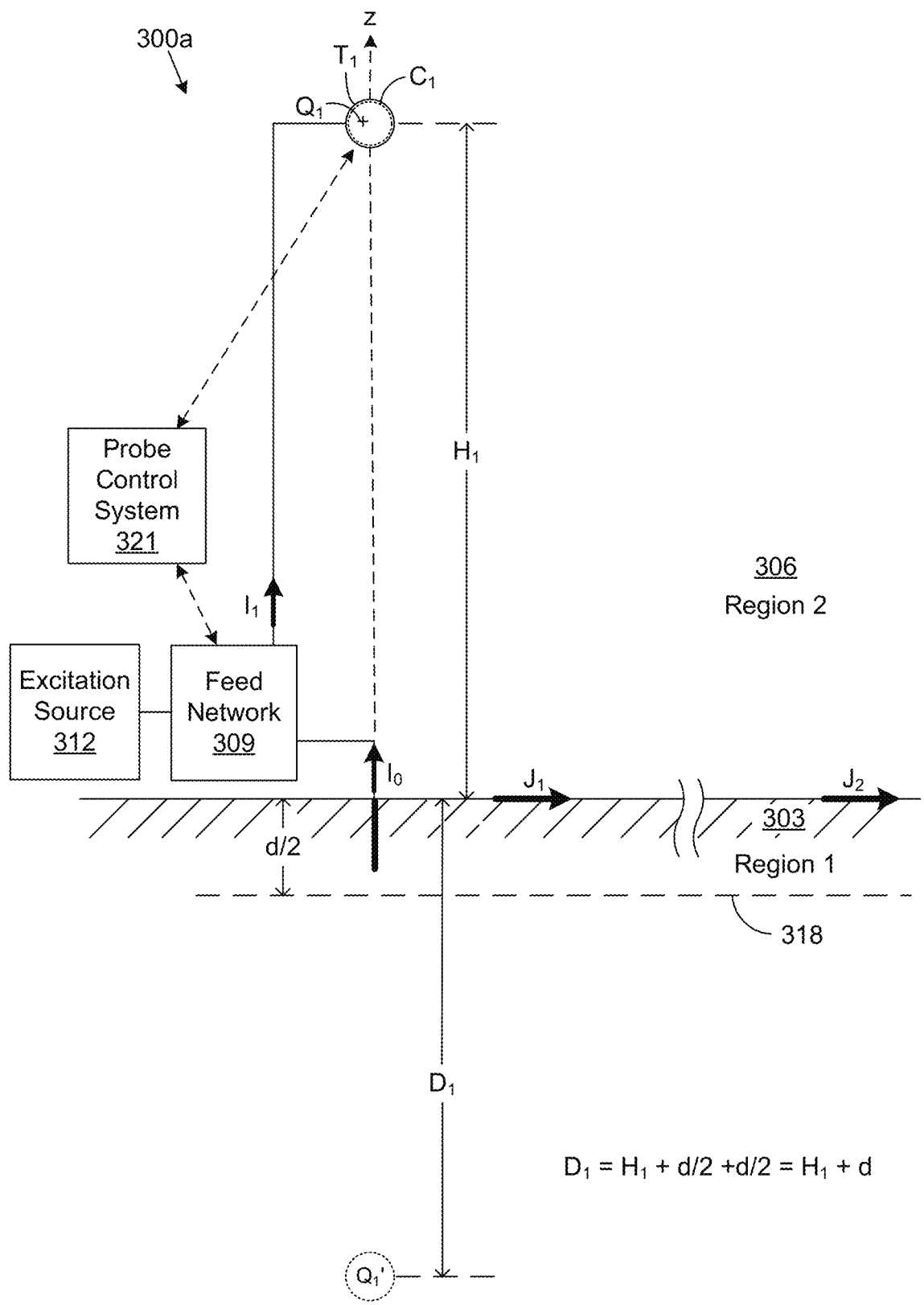
FIG. 3 is a drawing that illustrates a guided surface waveguide probe disposed with respect to a propagation interface of FIG. 2 according to an embodiment of the present disclosure.

The negative sign means that when source current ($I_0$) flows vertically upward as illustrated in FIG. 3, the "close-in" ground current flows radially inward. By field matching on $H_\phi$ "close-in," it can be determined that $$A = -\frac{I_o \gamma}{4} = -\frac{\omega q_1 \gamma}{4} \qquad (16)$$

where $q_1 = C_1 V_1$, in Equations (1)-(6) and (14). Therefore, the radial surface current density of Equation (14) can be restated as $$J_\rho(\rho') = \frac{I_o \gamma}{4} H_1^{(2)}(-j\gamma\rho'). \qquad (17)$$

The fields expressed by Equations (1)-(6) and (17) have the nature of a transmission line mode bound to a lossy interface, not radiation fields that are associated with groundwave propagation. See Barlow, H. M. and Brown, J., *Radio Surface Waves*, Oxford University Press, 1962, pp. 1-5.

At this point, a review of the nature of the Hankel functions used in Equations (1)-(6) and (17) is provided for these solutions of the wave equation. One might observe that the Hankel functions of the first and second kind and order n are defined as complex combinations of the standard Bessel functions of the first and second kinds $$H_n^{(1)} = J_n(x) + j N_n(x), \text{ and} \qquad (18)$$

$$H_n^{(2)}(x) = J_n(x) - j N_n(x), \qquad (19)$$

These functions represent cylindrical waves propagating radially inward ($H_n^{(1)}$) and outward ($H_n^{(2)}$), respectively. The definition is analogous to the relationship $e^{\pm jx} = \cos x \pm j \sin x$. See, for example, Harrington, R. F., *Time-Harmonic Fields*, McGraw-Hill, 1961, pp. 460-463.

That $H_n^{(2)}(k_\rho \rho)$ is an outgoing wave can be recognized from its large argument asymptotic behavior that is obtained directly from the series definitions of $J_n(x)$ and $N_n(x)$. Far-out from the guided surface waveguide probe:

$$H_n^{(2)}(z) \xrightarrow[x \to \infty]{} \sqrt{\frac{2j}{\pi x}} j^n e^{-jx} = \sqrt{\frac{2}{\pi x}} j^n e^{-j(x-\frac{\pi}{4})}, \qquad (20a)$$

which, when multiplied by $e^{j\omega t}$, is an outward propagating cylindrical wave of the form $e^{j(\omega t - k\rho)}$ with a $1/\sqrt{\rho}$ spatial variation. The first order (n=1) solution can be determined from Equation (20a) to be $$H_1^{(2)}(x) \xrightarrow[x \to \infty]{} j \sqrt{\frac{2j}{\pi x}} e^{-jx} = \sqrt{\frac{2}{\pi x}} e^{-j(x-\frac{\pi}{2}-\frac{\pi}{4})}. \qquad (20b)$$

Close-in to the guided surface waveguide probe (for $\rho \ll \lambda$), the Hankel function of first order and the second kind behaves as $$H_1^{(2)}(x) \xrightarrow[x \to 0]{} \frac{2j}{\pi x}. \qquad (21)$$

Note that these asymptotic expressions are complex quantities. When x is a real quantity, Equations (20b) and (21) differ in phase by $\sqrt{j}$, which corresponds to an extra phase advance or "phase boost" of 45° or, equivalently, $\lambda/8$. The close-in and far-out asymptotes of the first order Hankel function of the second kind have a Hankel "crossover" or transition point where they are of equal magnitude at a distance of $\rho = R_x$.

Thus, beyond the Hankel crossover point the "far out" representation predominates over the "close-in" representation of the Hankel function. The distance to the Hankel crossover point (or Hankel crossover distance) can be found by equating Equations (20b) and (21) for $-j\gamma\rho$, and solving for $R_x$. With $x = \sigma/\omega\varepsilon_0$, it can be seen that the far-out and close-in Hankel function asymptotes are frequency dependent, with the Hankel crossover point moving out as the frequency is lowered. It should also be noted that the Hankel function asymptotes may also vary as the conductivity ($\sigma$) of the lossy conducting medium changes. For example, the conductivity of the soil can vary with changes in weather conditions.

Figure 4:
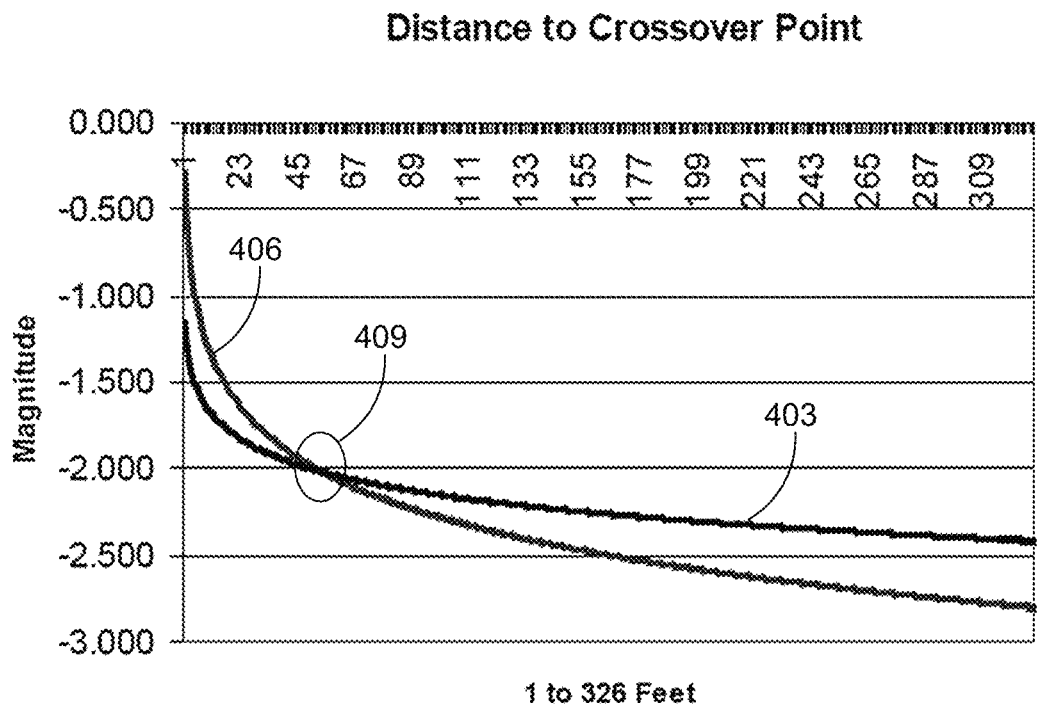
FIG. 4 is a plot of an example of the magnitudes of close-in and far-out asymptotes of first order Hankel functions according to various embodiments of the present disclosure.

Referring to FIG. 4, shown is an example of a plot of the magnitudes of the first order Hankel functions of Equations (20b) and (21) for a Region 1 conductivity of $\sigma = 0.010$ mhos/m and relative permittivity $\varepsilon_r = 15$, at an operating frequency of 1850 kHz. Curve 403 is the magnitude of the far-out asymptote of Equation (20b) and curve 406 is the magnitude of the close-in asymptote of Equation (21), with the Hankel crossover point 409 occurring at a distance of $R_x = 54$ feet. While the magnitudes are equal, a phase offset exists between the two asymptotes at the Hankel crossover point 409. It can also be seen that the Hankel crossover distance is much less than a wavelength of the operation frequency.

Considering the electric field components given by Equations (2) and (3) of the Zenneck closed-form solution in Region 2, it can be seen that the ratio of $E_z$ and $E_\rho$ asymptotically passes to $$\frac{E_z}{E_\rho} = \left(\frac{-j\gamma}{u_2}\right) \frac{H_0^{(2)}(-j\gamma\rho)}{H_1^{(2)}(-j\gamma\rho)} \xrightarrow[\rho \to \infty]{} \sqrt{\varepsilon_r - j\frac{\sigma}{\omega\varepsilon_o}} = n = \tan\theta_i. \qquad (22)$$

where n is the complex index of refraction of Equation (10) and $\theta_i$ is the angle of incidence of the electric field. In addition, the vertical component of the mode-matched electric field of Equation (3) asymptotically passes to $$E_{2z} \xrightarrow[\rho \to \infty]{} \left(\frac{q_{free}}{\varepsilon_o}\right) \sqrt{\frac{\gamma^3}{8\pi}} e^{-u_2 z} \frac{e^{-j(\gamma\rho - \pi/4)}}{\sqrt{\rho}}, \quad (23)$$

which is linearly proportional to free charge on the isolated component of the elevated charge terminal's capacitance at the terminal voltage, $q_{free} = C_{free} \times V_T$.

For example, the height Hi of the elevated charge terminal $T_1$ in FIG. 3 affects the amount of free charge on the charge terminal $T_1$. When the charge terminal $T_1$ is near the ground plane of Region 1, most of the charge $Q_1$ on the terminal is "bound." As the charge terminal $T_1$ is elevated, the bound charge is lessened until the charge terminal $T_1$ reaches a height at which substantially all of the isolated charge is free.

The advantage of an increased capacitive elevation for the charge terminal $T_1$ is that the charge on the elevated charge terminal $T_1$ is further removed from the ground plane, resulting in an increased amount of free charge $q_{free}$ to couple energy into the guided surface waveguide mode. As the charge terminal $T_1$ is moved away from the ground plane, the charge distribution becomes more uniformly distributed about the surface of the terminal. The amount of free charge is related to the self-capacitance of the charge terminal $T_1$.

For example, the capacitance of a spherical terminal can be expressed as a function of physical height above the ground plane. The capacitance of a sphere at a physical height of h above a perfect ground is given by $$C_{elevated\ sphere} = 4\pi\varepsilon_0 a(1 + M + M^2 + M^3 + 2M^4 + 3M^5 + \ldots), \quad (24)$$

where the diameter of the sphere is 2a, and where M=a/2h with h being the height of the spherical terminal. As can be seen, an increase in the terminal height h reduces the capacitance C of the charge terminal. It can be shown that for elevations of the charge terminal $T_1$ that are at a height of about four times the diameter (4D=8a) or greater, the charge distribution is approximately uniform about the spherical terminal, which can improve the coupling into the guided surface waveguide mode.

In the case of a sufficiently isolated terminal, the self-capacitance of a conductive sphere can be approximated by $C = 4\pi\varepsilon_0 a$, where a is the radius of the sphere in meters, and the self-capacitance of a disk can be approximated by $C = 8\varepsilon_0 a$, where a is the radius of the disk in meters. The charge terminal $T_1$ can include any shape such as a sphere, a disk, a cylinder, a cone, a torus, a hood, one or more rings, or any other randomized shape or combination of shapes. An equivalent spherical diameter can be determined and used for positioning of the charge terminal This may be further understood with reference to the example of FIG. 3, where the charge terminal $T_1$ is elevated at a physical height of $h_p = H_1$ above the lossy conducting medium 303. To reduce the effects of the "bound" charge, the charge terminal $T_1$ can be positioned at a physical height that is at least four times the spherical diameter (or equivalent spherical diameter) of the charge terminal $T_1$ to reduce the bounded charge effects.

Figure 5A:
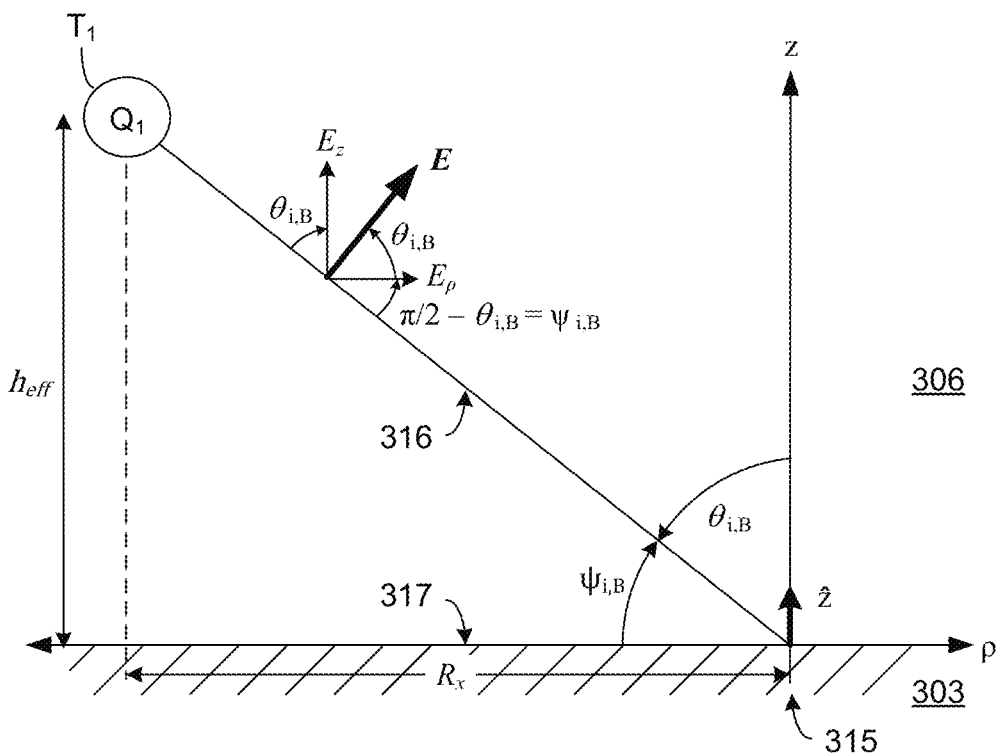
FIGS. 5A and 5B are drawings that illustrate a complex angle of incidence of an electric field synthesized by a guided surface waveguide probe according to the various embodiments of the present disclosure.

Referring next to FIG. 5A, shown is a ray optics interpretation of the electric field produced by the elevated charge $Q_1$ on charge terminal $T_1$ of FIG. 3. As in optics, minimizing the reflection of the incident electric field can improve and/or maximize the energy coupled into the guided surface waveguide mode of the lossy conducting medium 303. For an electric field ($E_\parallel$) that is polarized parallel to the plane of incidence (not the boundary interface), the amount of reflection of the incident electric field may be determined using the Fresnel reflection coefficient, which can be expressed as $$\Gamma_\parallel(\theta_i) = \frac{E_{\parallel,R}}{E_{\parallel,i}} = \frac{\sqrt{(\varepsilon_r - jx) - \sin^2 \theta_i} - (\varepsilon_r - jx)\cos \theta_i}{\sqrt{(\varepsilon_r - jx) - \sin^2 \theta_i} + (\varepsilon_r - jx)\cos \theta_i}, \quad (25)$$

where $\theta_i$ is the conventional angle of incidence measured with respect to the surface normal.

In the example of FIG. 5A, the ray optic interpretation shows the incident field polarized parallel to the plane of incidence having an angle of incidence of $\theta_i$, which is measured with respect to the surface normal ($\hat{z}$). There will be no reflection of the incident electric field when $\Gamma_\parallel(\theta_i)=0$ and thus the incident electric field will be completely coupled into a guided surface waveguide mode along the surface of the lossy conducting medium 303. It can be seen that the numerator of Equation (25) goes to zero when the angle of incidence is $$\theta_i = \arctan(\sqrt{\varepsilon_r - jx}) = \theta_{i,B}, \quad (26)$$

where $x = \sigma/\omega\varepsilon_0$. This complex angle of incidence ($\theta_{i,B}$) is referred to as the Brewster angle. Referring back to Equation (22), it can be seen that the same complex Brewster angle ($\theta_{i,B}$) relationship is present in both Equations (22) and (26).

As illustrated in FIG. 5A, the electric field vector E can be depicted as an incoming non-uniform plane wave, polarized parallel to the plane of incidence. The electric field vector E can be created from independent horizontal and vertical components as $$\vec{E}(\theta_i) = E_\rho \hat{\rho} + E_z \hat{z}. \quad (27)$$

Geometrically, the illustration in FIG. 5A suggests that the electric field vector E can be given by $$E_\rho(\rho, z) = E(\rho, z)\cos\theta_i, \text{ and} \quad (28a)$$

$$E_z(\rho, z) = E(\rho, z)\cos\left(\frac{\pi}{2} - \theta_i\right) = E(\rho, z)\sin\theta_i, \quad (28b)$$

which means that the field ratio is $$\frac{E_\rho}{E_z} = \frac{1}{\tan \theta_i} = \tan \psi_i. \quad (29)$$

Figure 5B:
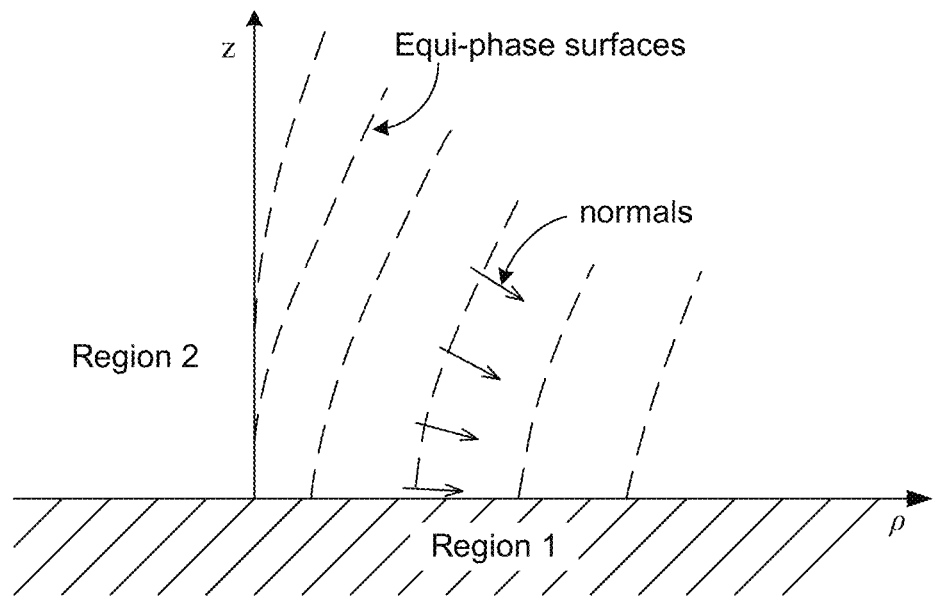

A generalized parameter W, called "wave tilt," is noted herein as the ratio of the horizontal electric field component to the vertical electric field component given by $$W = \frac{E_\rho}{E_z} = |W|e^{j\Psi}, \text{ or} \quad (30a)$$

$$\frac{1}{W} = \frac{E_z}{E_\rho} = \tan \theta_i = \frac{1}{|W|}e^{-j\Psi}, \quad (30b)$$

which is complex and has both magnitude and phase. For an electromagnetic wave in Region 2, the wave tilt angle ($\Psi$) is equal to the angle between the normal of the wave-front at the boundary interface with Region 1 and the tangent to the boundary interface. This may be easier to see in FIG. 5B, which illustrates equi-phase surfaces of an electromagnetic wave and their normals for a radial cylindrical guided surface wave. At the boundary interface (z=0) with a perfect conductor, the wave-front normal is parallel to the tangent of the boundary interface, resulting in W=0. However, in the case of a lossy dielectric, a wave tilt W exists because the wave-front normal is not parallel with the tangent of the boundary interface at z=0.

Applying Equation (30b) to a guided surface wave gives $$\tan \theta_{i,B} = \frac{E_z}{E_\rho} = \frac{u_2}{\gamma} = \sqrt{\varepsilon_r - jx} = n = \frac{1}{W} = \frac{1}{|W|}e^{-j\Psi}. \tag{31}$$

With the angle of incidence equal to the complex Brewster angle ($\theta_{i,B}$), the Fresnel reflection coefficient of Equation (25) vanishes, as shown by $$\Gamma_{\|}(\theta_{i,B}) = \left.\frac{\sqrt{(\varepsilon_r - jx) - \sin^2 \theta_i} - (\varepsilon_r - jx) \cos \theta_i}{\sqrt{(\varepsilon_r - jx) - \sin^2 \theta_i} + (\varepsilon_r + jx) \cos \theta_i}\right|_{\theta_i = \theta_{i,B}} = 0. \tag{32}$$

By adjusting the complex field ratio of Equation (22), an incident field can be synthesized to be incident at a complex angle at which the reflection is reduced or eliminated. Establishing this ratio as $n = \sqrt{\varepsilon_r - jx}$ results in the synthesized electric field being incident at the complex Brewster angle, making the reflections vanish.

The concept of an electrical effective height can provide further insight into synthesizing an electric field with a complex angle of incidence with a guided surface waveguide probe 300. The electrical effective height ($h_{eff}$) has been defined as $$h_{eff} = \frac{1}{I_0}\int_0^{h_p} I(z)dz \tag{33}$$

for a monopole with a physical height (or length) of $h_p$. Since the expression depends upon the magnitude and phase of the source distribution along the structure, the effective height (or length) is complex in general. The integration of the distributed current I(z) of the structure is performed over the physical height of the structure ($h_p$), and normalized to the ground current ($I_0$) flowing upward through the base (or input) of the structure. The distributed current along the structure can be expressed by $$I(z) = I_C \cos(\beta_0 z), \tag{34}$$

where $\beta_0$ is the propagation factor for current propagating on the structure. In the example of FIG. 3, $I_C$ is the current that is distributed along the vertical structure of the guided surface waveguide probe 300a.

For example, consider a feed network 309 that includes a low loss coil (e.g., a helical coil) at the bottom of the structure and a vertical feed line conductor connected between the coil and the charge terminal $T_1$. The phase delay due to the coil (or helical delay line) is $\theta_c = \beta_p l_C$, with a physical length of $l_C$ and a propagation factor of $$\beta_p = \frac{2\pi}{\lambda_p} = \frac{2\pi}{V_f \lambda_0}, \tag{35}$$

where $V_f$ is the velocity factor on the structure, $\lambda_0$ is the wavelength at the supplied frequency, and $\lambda_p$ is the propagation wavelength resulting from the velocity factor $V_f$. The phase delay is measured relative to the ground (stake or system) current $I_0$.

In addition, the spatial phase delay along the length $l_w$ of the vertical feed line conductor can be given by $\theta_y = \beta_w l_w$ where $\beta_w$ is the propagation phase constant for the vertical feed line conductor. In some implementations, the spatial phase delay may be approximated by $\theta_y = \beta_w h_p$, since the difference between the physical height $h_p$ of the guided surface waveguide probe 300a and the vertical feed line conductor length $l_w$ is much less than a wavelength at the supplied frequency ($\lambda_0$). As a result, the total phase delay through the coil and vertical feed line conductor is $\Phi = \theta_c + \theta_y$, and the current fed to the top of the coil from the bottom of the physical structure is $$I_C(\theta_c + \theta_y) = I_0 e^{j\Phi}, \tag{36}$$

with the total phase delay $\Phi$ measured relative to the ground (stake or system) current $I_0$. Consequently, the electrical effective height of a guided surface waveguide probe 300 can be approximated by $$h_{eff} = \frac{1}{I_0}\int_0^{h_p} I_0 e^{j\Phi} \cos(\beta_0 z)dz \cong h_p e^{j\Phi}, \tag{37}$$

for the case where the physical height $h_p \ll \lambda_0$. The complex effective height of a monopole, $h_{eff} = h_p$ at an angle (or phase delay) of $\Phi$, may be adjusted to cause the source fields to match a guided surface waveguide mode and cause a guided surface wave to be launched on the lossy conducting medium 303.

In the example of FIG. 5A, ray optics are used to illustrate the complex angle trigonometry of the incident electric field (E) having a complex Brewster angle of incidence ($\theta_{i,B}$) at the Hankel crossover distance ($R_x$) 315. Recall from Equation (26) that, for a lossy conducting medium, the Brewster angle is complex and specified by $$\tan \theta_{i,B} = \sqrt{\varepsilon_r - j\frac{\sigma}{\omega\varepsilon_o}} = n. \tag{38}$$

Electrically, the geometric parameters are related by the electrical effective height ($h_{eff}$) of the charge terminal $T_1$ by $$R_x \tan \psi_{i,B} = R_x \times W = h_{eff} = h_p e^{j\Phi}, \tag{39}$$

where $\psi_{i,B} = (\pi/2) - \theta_{i,B}$ is the Brewster angle measured from the surface of the lossy conducting medium. To couple into the guided surface waveguide mode, the wave tilt of the electric field at the Hankel crossover distance can be expressed as the ratio of the electrical effective height and the Hankel crossover distance $$\frac{h_{eff}}{R_x} = \tan \psi_{i,B} = W_{Rx}. \tag{40}$$

Since both the physical height ($h_p$) and the Hankel crossover distance ($R_x$) are real quantities, the angle ($\Psi$) of the desired guided surface wave tilt at the Hankel crossover distance ($R_x$) is equal to the phase ($\Phi$) of the complex effective height ($h_{eff}$). This implies that by varying the phase at the supply point of the coil, and thus the phase delay in Equation (37), the phase, $\Phi$, of the complex effective height can be manipulated to match the angle of the wave tilt, $\Psi$, of the guided surface waveguide mode at the Hankel crossover point 315: $\Phi=\Psi$.

In FIG. 5A, a right triangle is depicted having an adjacent side of length $R_x$ along the lossy conducting medium surface and a complex Brewster angle $\psi_{i,B}$ measured between a ray 316 extending between the Hankel crossover point 315 at $R_x$ and the center of the charge terminal $T_1$, and the lossy conducting medium surface 317 between the Hankel crossover point 315 and the charge terminal $T_1$. With the charge terminal $T_1$ positioned at physical height $h_p$ and excited with a charge having the appropriate phase delay $\Phi$, the resulting electric field is incident with the lossy conducting medium boundary interface at the Hankel crossover distance $R_x$, and at the Brewster angle. Under these conditions, the guided surface waveguide mode can be excited without reflection or substantially negligible reflection.

Figure 6:
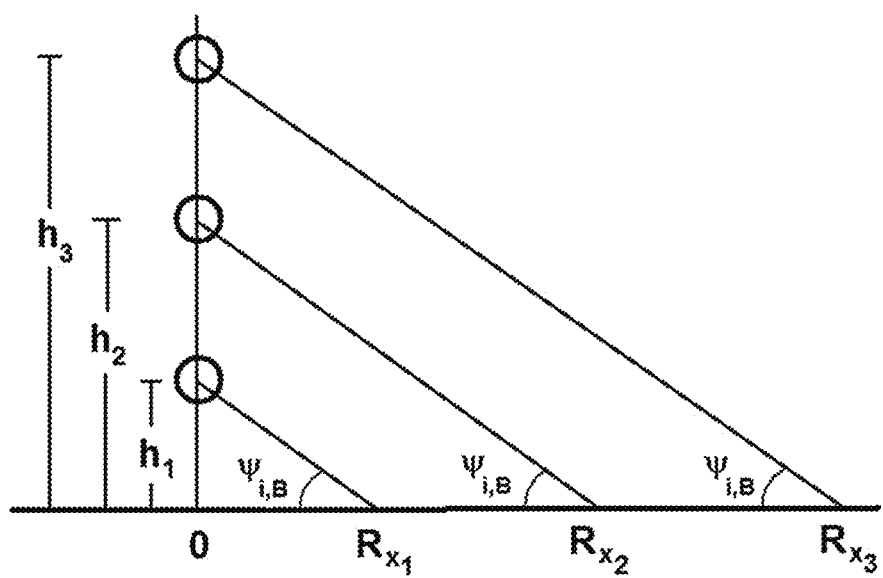
FIG. 6 is a graphical representation illustrating the effect of elevation of a charge terminal on the location where the electric field of FIG. 5A intersects with the lossy conducting medium at a Brewster angle according to various embodiments of the present disclosure.

If the physical height of the charge terminal $T_1$ is decreased without changing the phase delay $\Phi$ of the effective height ($h_{eff}$), the resulting electric field intersects the lossy conducting medium 303 at the Brewster angle at a reduced distance from the guided surface waveguide probe 300. FIG. 6 graphically illustrates the effect of decreasing the physical height of the charge terminal $T_1$ on the distance where the electric field is incident at the Brewster angle. As the height is decreased from h3 through $h_2$ to $h_1$, the point where the electric field intersects with the lossy conducting medium (e.g., the earth) at the Brewster angle moves closer to the charge terminal position. However, as Equation (39) indicates, the height $H_1$ (FIG. 3) of the charge terminal $T_1$ should be at or higher than the physical height ($h_p$) in order to excite the far-out component of the Hankel function. With the charge terminal $T_1$ positioned at or above the effective height ($h_{eff}$), the lossy conducting medium 303 can be illuminated at the Brewster angle of incidence ($\psi_{i,B}=(\pi/2)-\theta_{i,B}$) at or beyond the Hankel crossover distance ($R_x$) 315 as illustrated in FIG. 5A. To reduce or minimize the bound charge on the charge terminal $T_1$, the height should be at least four times the spherical diameter (or equivalent spherical diameter) of the charge terminal $T_1$ as mentioned above.

Figure 7A:
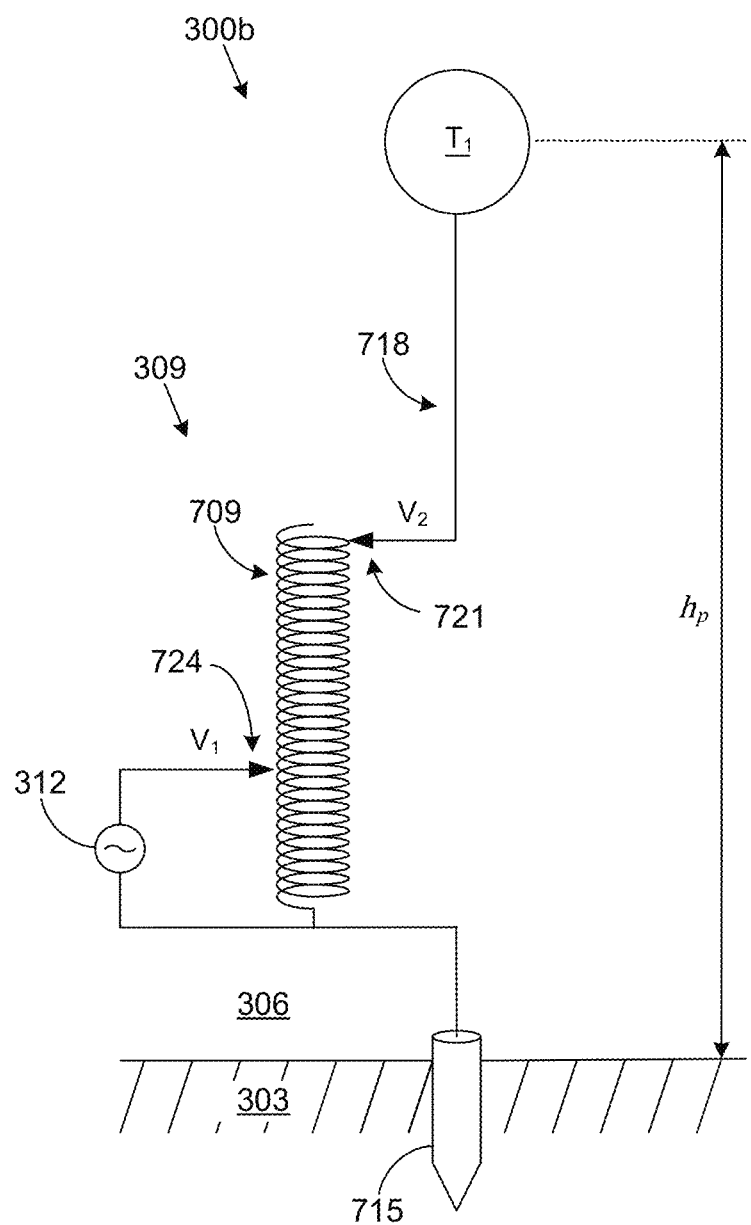
FIGS. 7A through 7D are graphical representations of examples of a guided surface waveguide probe according to various embodiments of the present disclosure.

A guided surface waveguide probe 300 can be configured to establish an electric field having a wave tilt that corresponds to a wave illuminating the surface of the lossy conducting medium 303 at a complex Brewster angle, thereby exciting radial surface currents by substantially mode-matching to a guided surface wave mode at (or beyond) the Hankel crossover point 315 at $R_x$. Referring to FIG. 7A, shown is a graphical representation of an example of a guided surface waveguide probe 300b that includes a charge terminal $T_1$. An excitation source 312 such as AC source acts as the excitation source for the charge terminal $T_1$, which is coupled to the guided surface waveguide probe 300b through a feed network 309 (FIG. 3) comprising a coil 709 such as, e.g., a helical coil. In other implementations, the excitation source 312 can be inductively coupled to the coil 709 through a primary coil. In some embodiments, an impedance matching network may be included to improve and/or maximize coupling of the excitation source 312 to the coil 709.

As shown in FIG. 7A, the guided surface waveguide probe 300b can include the upper charge terminal $T_1$ (e.g., a sphere at height $h_p$) that is positioned along a vertical axis z that is substantially normal to the plane presented by the lossy conducting medium 303. A second medium 306 is located above the lossy conducting medium 303. The charge terminal $T_1$ has a self-capacitance CT. During operation, charge $Q_1$ is imposed on the terminal $T_1$ depending on the voltage applied to the terminal $T_1$ at any given instant.

In the example of FIG. 7A, the coil 709 is coupled to a ground stake (or grounding system) 715 at a first end and to the charge terminal $T_1$ via a vertical feed line conductor 718. In some implementations, the coil connection to the charge terminal $T_1$ can be adjusted using a tap 721 of the coil 709 as shown in FIG. 7A. The coil 709 can be energized at an operating frequency by the excitation source 312 through a tap 724 at a lower portion of the coil 709. In other implementations, the excitation source 312 can be inductively coupled to the coil 709 through a primary coil. The charge terminal $T_1$ can be configured to adjust its load impedance seen by the vertical feed line conductor 718, which can be used to adjust the probe impedance.

Figure 7B:
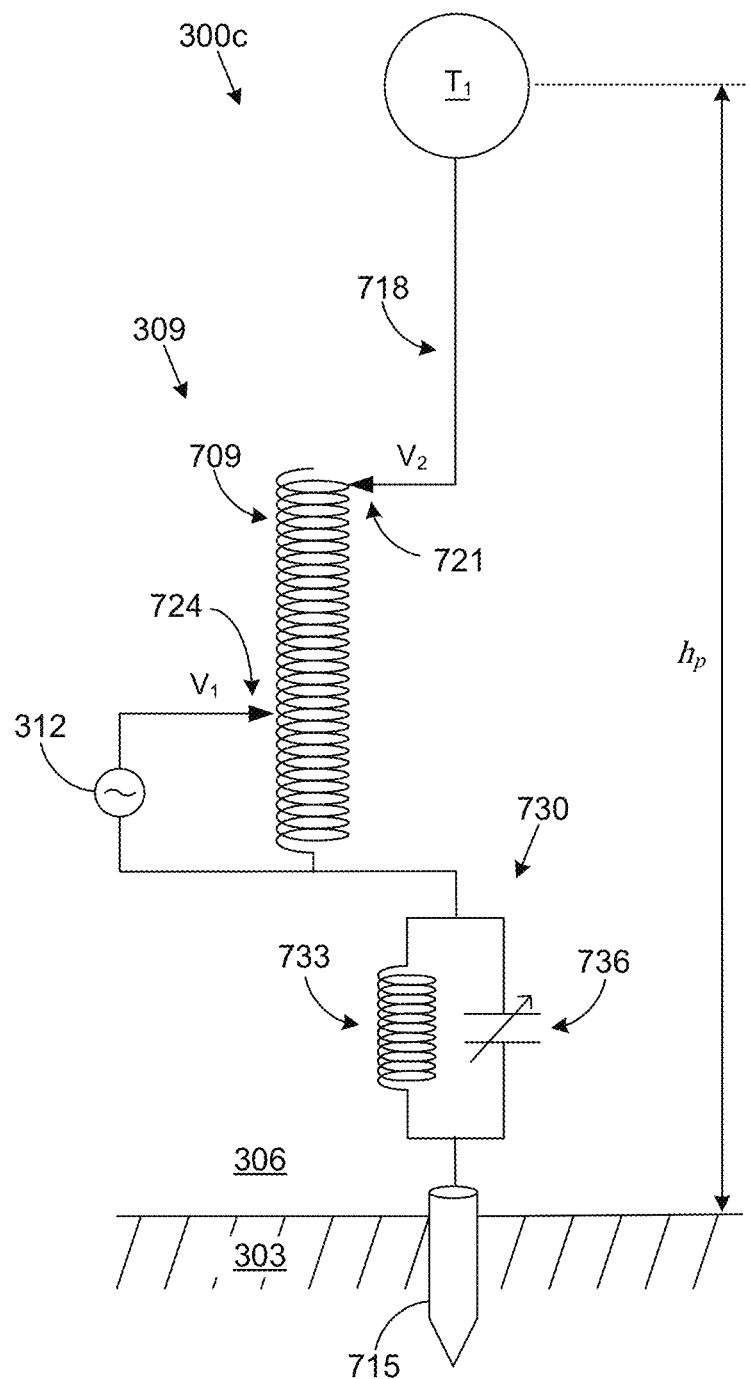
Figure 7C:
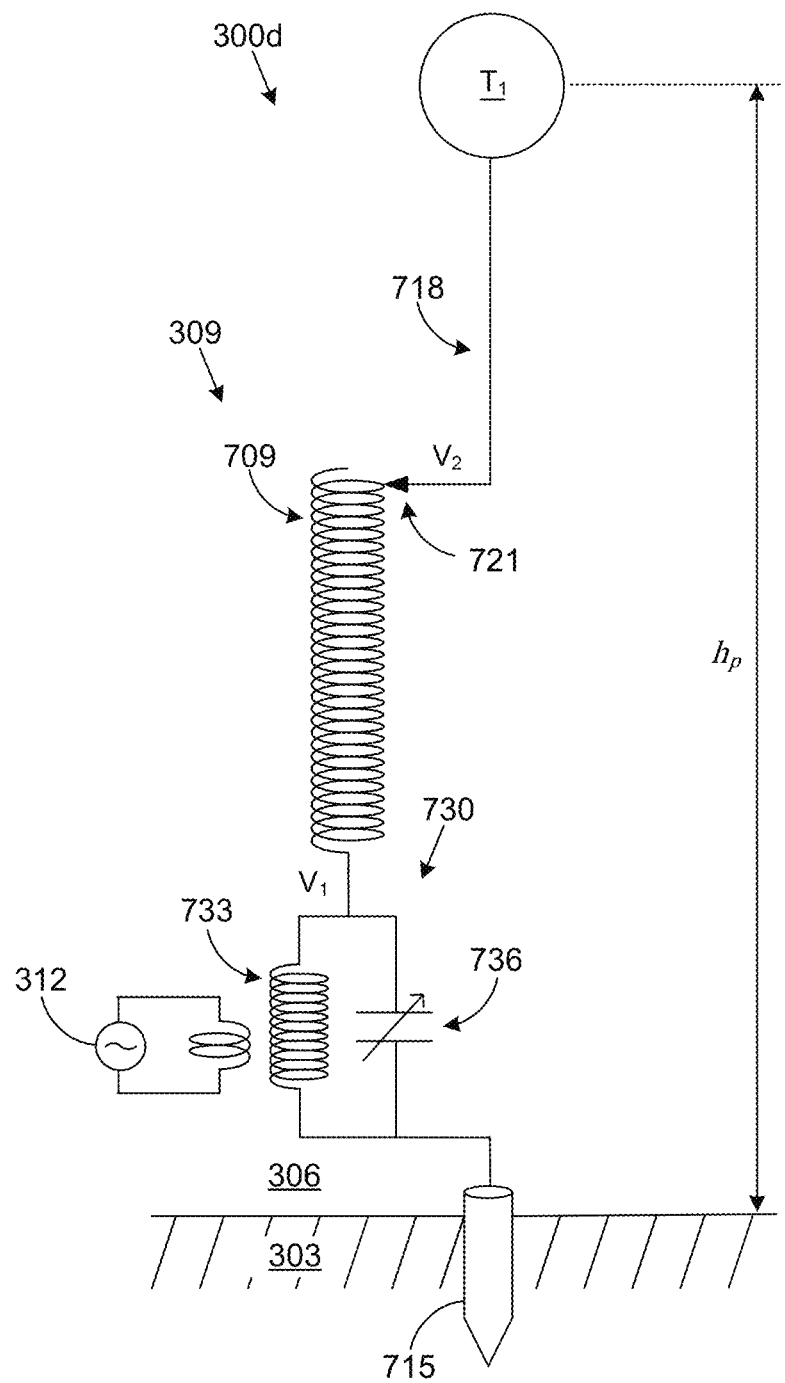

FIGS. 7B and 7C show graphical representations of other examples of guided surface waveguide probes 300c/300d that include a charge terminal $T_1$. As in FIG. 7A, the guided surface waveguide probe 300c/300d can include the upper charge terminal $T_1$ positioned over the lossy conducting medium 303 (e.g., at height $h_p$). In the examples of FIGS. 7B and 7C, the coil 709 is coupled at a first end to a ground stake (or grounding system) 715 via a lumped element tank circuit 730 and to the charge terminal $T_1$ at a second end via a vertical feed line conductor 718. The coil 709 can be energized at an operating frequency by the excitation source 312 through, e.g., a tap 724 at a lower portion of the coil 709, as shown in FIG. 7B. In other implementations, the excitation source 312 can be inductively coupled to the coil 709 or an inductive coil 733 of the tank circuit 730 through a primary coil. In the example of FIG. 7C, the coil 709 can be energized by the excitation source 312 through inductive coupling with the coil 733 of the lumped element tank circuit 730. The lumped element tank circuit 730 comprises the inductive coil 733 and a capacitor 736. The inductive coil 733 and/or the capacitor 736 can be fixed or variable to allow for adjustment of the tank circuit resonance, and thus the probe impedance.

Figure 7D:
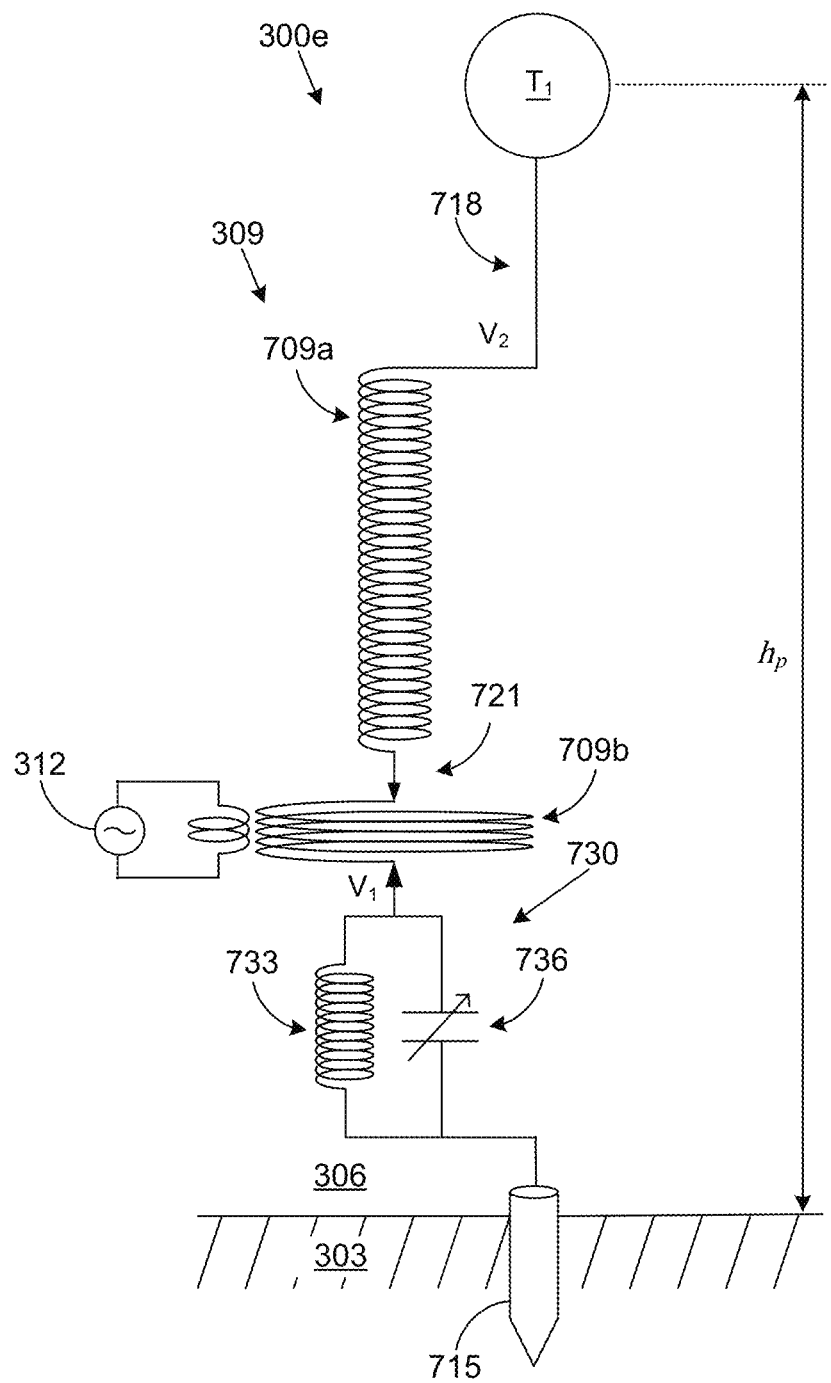

FIG. 7D shows a graphical representation of another example of a guided surface waveguide probe 300e that includes a charge terminal $T_1$. As in FIG. 7A, the guided surface waveguide probe 300e can include the upper charge terminal $T_1$ positioned over the lossy conducting medium 303 (e.g., at height $h_p$). The feed network 309 can comprise a plurality of coils (e.g., helical coils) instead of a single coil 709 as illustrated in FIGS. 7A-7C. The coils can include a combination of helical coils to provide the appropriate phase delay (e.g., $\theta_c=\theta_{ca}+\theta_{cb}$, where $\theta_{ca}$ and $\theta_{cb}$ correspond to the phase delays of coils 709a and 709b, respectively) to launch a guided surface wave. In the example of FIG. 7D, the feed network includes two coils 709a and 709b connected in series with the lower coil 709b coupled to a ground stake (or grounding system) 715 via a lumped element tank circuit 730 and the upper coil 709a coupled to the charge terminal $T_1$ via a vertical feed line conductor 718. The coils 709a and 709b can be energized at an operating frequency by the excitation source 312 through, e.g., inductive coupling with, e.g., the lower coil 709b or an inductive coil 733 of the tank circuit 730. In the example of FIG. 7C, the coil 709 can be energized by the excitation source 312 through inductive coupling with the coil 733 of the lumped element tank circuit 730. The inductive coil 733 and/or the capacitor 736 of the lumped element tank circuit 730 can be fixed or variable to allow for adjustment of the tank circuit resonance, and thus the probe impedance.

At this point, it should be pointed out that there is a distinction between phase delays for traveling waves and phase shifts for standing waves. Phase delays for traveling waves, $\theta=\beta l$, are due to propagation time delays on distributed element wave guiding structures such as, e.g., the coil(s) 709 and vertical feed line conductor 718. A phase delay is not experienced as the traveling wave passes through the lumped element tank circuit 730. As a result, the total traveling wave phase delay through, e.g., the guided surface waveguide probes 300c and 300d is still $\Phi=\theta_c+\theta_y$. However, the position dependent phase shifts of standing waves, which comprise forward and backward propagating waves, and load dependent phase shifts depend on both the line-length propagation delay and at transitions between line sections of different characteristic impedances. It should be noted that phase shifts do occur in lumped element circuits. Phase shifts also occur at impedance discontinuities between transmission line segments, and between line segments and loads. This comes from the complex reflection coefficient, $\Gamma=|\delta|e^{j\Phi}$, arising from the impedance discontinuities, and results in standing waves (wave interference patterns of forward and backward propagating waves) on the distributed element structures. As a result, the total standing wave phase shift of the guided surface waveguide probes 300c, 300d and 300e includes the phase shift produced by the lumped element tank circuit 730.

Accordingly, it should be noted that coils that produce both a phase delay for a traveling wave and a phase shift for standing waves can be referred to herein as "phasing coils." The coils 709 are examples of phasing coils. It should be further noted that coils in a tank circuit, such as the lumped element tank circuit 730 as described above, act as a lumped element and an inductor, where the tank circuit produces a phase shift for standing waves without a corresponding phase delay for traveling waves. Such coils acting as lumped elements or inductors can be referred to herein as "inductor coils" or "lumped element" coils. Inductive coil 733 is an example of such an inductor coil or lumped element coil. Such inductor coils or lumped element coils are assumed to have a uniform current distribution throughout the coil and are electrically small relative to the wavelength of operation of the guided surface waveguide probe 300 such that they produce a negligible delay of a traveling wave.

The construction and adjustment of the guided surface waveguide probe 300 is based upon various operating conditions, such as the transmission frequency, conditions of the lossy conducting medium (e.g., soil conductivity $\sigma$ and relative permittivity $\varepsilon_r$), and size of the charge terminal $T_1$. The index of refraction can be calculated from Equations (10) and (11) as $$n=\sqrt{\varepsilon_r-jx}, \quad (41)$$

where $x=\sigma/\omega\varepsilon_0$ with $\omega=2\pi f$. The conductivity $\sigma$ and relative permittivity $\varepsilon_r$ can be determined through test measurements of the lossy conducting medium 303. The complex Brewster angle ($\theta_{i,B}$) measured from the surface normal can also be determined from Equation (26) as $$\theta_{i,B}=\arctan(\sqrt{\varepsilon_r-jx}), \quad (42)$$

or measured from the surface as shown in FIG. 5A as $$\psi_{i,B} = \frac{\pi}{2} - \theta_{i,B}. \quad (43)$$

The wave tilt at the Hankel crossover distance ($W_{Rx}$) can also be found using Equation (40).

The Hankel crossover distance can also be found by equating the magnitudes of Equations (20b) and (21) for $-j\gamma\rho$, and solving for $R_x$ as illustrated by FIG. 4. The electrical effective height can then be determined from Equation (39) using the Hankel crossover distance and the complex Brewster angle as $$h_{eff}=h_p e^{j\Phi}=R_x \tan \psi_{i,B}. \quad (44)$$

As can be seen from Equation (44), the complex effective height ($h_{eff}$) includes a magnitude that is associated with the physical height ($h_p$) of the charge terminal $T_1$ and a phase delay ($\Phi$) that is to be associated with the angle ($\Psi$) of the wave tilt at the Hankel crossover distance ($R_x$). With these variables and the selected charge terminal $T_1$ configuration, it is possible to determine the configuration of a guided surface waveguide probe 300.

With the charge terminal $T_1$ positioned at or above the physical height ($h_p$), the feed network 309 (FIG. 3) and/or the vertical feed line connecting the feed network to the charge terminal $T_1$ can be adjusted to match the phase delay ($\Phi$) of the charge $Q_1$ on the charge terminal $T_1$ to the angle ($\Psi$) of the wave tilt (W). The size of the charge terminal $T_1$ can be chosen to provide a sufficiently large surface for the charge $Q_1$ imposed on the terminals. In general, it is desirable to make the charge terminal $T_1$ as large as practical. The size of the charge terminal $T_1$ should be large enough to avoid ionization of the surrounding air, which can result in electrical discharge or sparking around the charge terminal.

The phase delay $\theta_c$ of a helically-wound coil can be determined from Maxwell's equations as has been discussed by Corum, K. L. and J. F. Corum, "RF Coils, Helical Resonators and Voltage Magnification by Coherent Spatial Modes," *Microwave Review*, Vol. 7, No. 2, September 2001, pp. 36-45., which is incorporated herein by reference in its entirety. For a helical coil with H/D>1, the ratio of the velocity of propagation (v) of a wave along the coil's longitudinal axis to the speed of light (c), or the "velocity factor," is given by $$V_f = \frac{v}{c} = \frac{1}{\sqrt{1+20\left(\frac{D}{s}\right)^{2.5}\left(\frac{D}{\lambda_o}\right)^{0.5}}}, \quad (45)$$

where H is the axial length of the solenoidal helix, D is the coil diameter, N is the number of turns of the coil, s=H/N is the turn-to-turn spacing (or helix pitch) of the coil, and $\lambda_0$ is the free-space wavelength. Based upon this relationship, the electrical length, or phase delay, of the helical coil is given by $$\theta_c = \beta_p H = \frac{2\pi}{\lambda_p}H = \frac{2\pi}{V_f\lambda_0}H. \quad (46)$$

The principle is the same if the helix is wound spirally or is short and fat, but $V_f$ and $\theta_c$ are easier to obtain by experimental measurement. The expression for the characteristic (wave) impedance of a helical transmission line has also been derived as $$Z_c = \frac{60}{V_f}\left[\ln\left(\frac{V_f \lambda_0}{D}\right) - 1.027\right]. \qquad (47)$$

The spatial phase delay $\theta_y$ of the structure can be determined using the traveling wave phase delay of the vertical feed line conductor 718 (FIGS. 7A-7D). The capacitance of a cylindrical vertical conductor above a prefect ground plane can be expressed as $$C_A = \frac{2\pi \varepsilon_0 h_w}{\ln\left(\frac{h}{a}\right) - 1} \text{ Farads,} \qquad (48)$$

where $h_w$ is the vertical length (or height) of the conductor and a is the radius (in mks units). As with the helical coil, the traveling wave phase delay of the vertical feed line conductor can be given by $$\theta_y = \beta_w h_w = \frac{2\pi}{\lambda_w} h_w = \frac{2\pi}{V_w \lambda_0} h_w, \qquad (49)$$

where $\beta_w$ is the propagation phase constant for the vertical feed line conductor, $h_w$ is the vertical length (or height) of the vertical feed line conductor, $V_w$ is the velocity factor on the wire, $\lambda_0$ is the wavelength at the supplied frequency, and $\lambda_w$ is the propagation wavelength resulting from the velocity factor $V_w$. For a uniform cylindrical conductor, the velocity factor is a constant with $V_w \approx 0.94$, or in a range from about 0.93 to about 0.98. If the mast is considered to be a uniform transmission line, its average characteristic impedance can be approximated by $$Z_w = \frac{60}{V_w}\left[\ln\left(\frac{h_w}{a}\right) - 1\right], \qquad (50)$$

where $V_w \approx 0.94$ for a uniform cylindrical conductor and a is the radius of the conductor. An alternative expression that has been employed in amateur radio literature for the characteristic impedance of a single-wire feed line can be given by $$Z_w = 138 \log\left(\frac{1.123 \, V_w \lambda_0}{2\pi a}\right). \qquad (51)$$

Equation (51) implies that $Z_0$ for a single-wire feeder varies with frequency. The phase delay can be determined based upon the capacitance and characteristic impedance.

With a charge terminal $T_1$ positioned over the lossy conducting medium 303 as shown in FIG. 3, the feed network 309 can be adjusted to excite the charge terminal $T_1$ with the phase delay)) of the complex effective height ($h_{eff}$) equal to the angle ($\Psi$) of the wave tilt at the Hankel crossover distance, or $\varphi = \Psi$. When this condition is met, the electric field produced by the charge oscillating $Q_1$ on the charge terminal $T_1$ is coupled into a guided surface waveguide mode traveling along the surface of a lossy conducting medium 303. For example, if the Brewster angle ($\theta_{i,B}$), the phase delay ($\theta_y$) associated with the vertical feed line conductor 718 (FIGS. 7A-7D), and the configuration of the coil(s) 709 (FIGS. 7A-7D) are known, then the position of the tap 721 (FIGS. 7A and 7B) can be determined and adjusted to impose an oscillating charge $Q_1$ on the charge terminal $T_1$ with phase $\varphi = \Psi$. The position of the tap 721 may be adjusted to maximize coupling the traveling surface waves into the guided surface waveguide mode. Excess coil length beyond the position of the tap 721 can be removed to reduce the capacitive effects. The vertical wire height and/or the geometrical parameters of the helical coil may also be varied.

The coupling to the guided surface waveguide mode on the surface of the lossy conducting medium 303 can be improved and/or optimized by tuning the guided surface waveguide probe 300 for standing wave resonance with respect to a complex image plane associated with the charge $Q_1$ on the charge terminal $T_1$. By doing this, the performance of the guided surface waveguide probe 300 can be adjusted for increased and/or maximum voltage (and thus charge $Q_1$) on the charge terminal $T_1$. Referring back to FIG. 3, the effect of the lossy conducting medium 303 in Region 1 can be examined using image theory analysis.

Physically, an elevated charge $Q_1$ placed over a perfectly conducting plane attracts the free charge on the perfectly conducting plane, which then "piles up" in the region under the elevated charge $Q_1$. The resulting distribution of "bound" electricity on the perfectly conducting plane is similar to a bell-shaped curve. The superposition of the potential of the elevated charge $Q_1$, plus the potential of the induced "piled up" charge beneath it, forces a zero equipotential surface for the perfectly conducting plane. The boundary value problem solution that describes the fields in the region above the perfectly conducting plane may be obtained using the classical notion of image charges, where the field from the elevated charge is superimposed with the field from a corresponding "image" charge below the perfectly conducting plane.

This analysis may also be used with respect to a lossy conducting medium 303 by assuming the presence of an effective image charge $Q_{1'}$ beneath the guided surface waveguide probe 300. The effective image charge $Q_{1'}$ coincides with the charge $Q_1$ on the charge terminal $T_1$ about a conducting image ground plane 318, as illustrated in FIG. 3. However, the image charge $Q_{1'}$ is not merely located at some real depth and 180° out of phase with the primary source charge $Q_1$ on the charge terminal $T_1$, as they would be in the case of a perfect conductor. Rather, the lossy conducting medium 303 (e.g., a terrestrial medium) presents a phase shifted image. That is to say, the image charge $Q_{1'}$ is at a complex depth below the surface (or physical boundary) of the lossy conducting medium 303. For a discussion of complex image depth, reference is made to Wait, J. R., "Complex Image Theory—Revisited," *IEEE Antennas and Propagation Magazine*, Vol. 33, No. 4, August 1991, pp. 27-29, which is incorporated herein by reference in its entirety.

Instead of the image charge $Q_{1'}$ being at a depth that is equal to the physical height ($H_1$) of the charge $Q_1$, the conducting image ground plane 318 (representing a perfect conductor) is located at a complex depth of $z=-d/2$ and the image charge $Q_{1'}$ appears at a complex depth (i.e., the "depth" has both magnitude and phase), given by $-D_1 = -(d/2 + d/2 + H_1) \neq H_1$. For vertically polarized sources over the earth, $$d = \frac{2\sqrt{\gamma_e^2 + k_0^2}}{\gamma_e^2} \approx \frac{2}{\gamma_e} = d_r + jd_i = |d| \angle \zeta, \quad (52)$$

where $$\gamma_e^2 = j\omega\mu_1\sigma_1 - \omega^2\mu_1\varepsilon_1, \text{ and} \quad (53)$$

$$k_o = \omega\sqrt{\mu_o\varepsilon_o}. \quad (54)$$

as indicated in Equation (12). The complex spacing of the image charge, in turn, implies that the external field will experience extra phase shifts not encountered when the interface is either a dielectric or a perfect conductor. In the lossy conducting medium, the wave front normal is parallel to the tangent of the conducting image ground plane 318 at z=−d/2, and not at the boundary interface between Regions 1 and 2.

Figure 8C:
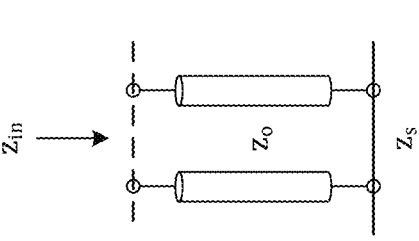
FIGS. 8A through 8C are graphical representations illustrating examples of equivalent image plane models of the guided surface waveguide probe of FIGS. 3 and 7A-7D according to various embodiments of the present disclosure.
Figure 8B:
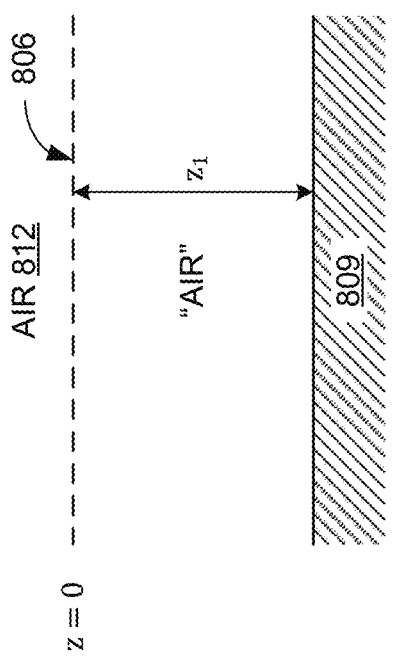
Figure 8A:
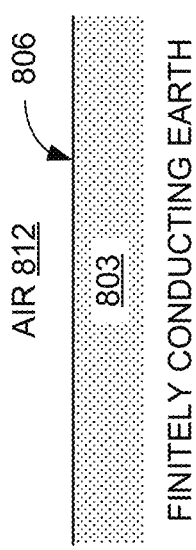

Consider the case illustrated in FIG. 8A where the lossy conducting medium 303 is a finitely conducting earth 803 with a physical boundary 806. The finitely conducting earth 803 may be replaced by a perfectly conducting image ground plane 809 as shown in FIG. 8B, which is located at a complex depth $z_1$ below the physical boundary 806. This equivalent representation exhibits the same impedance when looking down into the interface at the physical boundary 806. The equivalent representation of FIG. 8B can be modeled as an equivalent transmission line, as shown in FIG. 8C. The cross-section of the equivalent structure is represented as a (z-directed) end-loaded transmission line, with the impedance of the perfectly conducting image plane being a short circuit ($z_S$=0). The depth $z_1$ can be determined by equating the TEM wave impedance looking down at the earth to an image ground plane impedance $z_{in}$ seen looking into the transmission line of FIG. 8C.

In the case of FIG. 8A, the propagation constant and wave intrinsic impedance in the upper region (air) 812 are $$\gamma_o = j\omega\sqrt{\mu_o\varepsilon_o} = 0 + j\beta_o, \text{ and} \quad (55)$$

$$z_o = \frac{j\omega\mu_o}{\gamma_o} = \sqrt{\frac{\mu_o}{\varepsilon_o}}. \quad (56)$$

In the lossy earth 803, the propagation constant and wave intrinsic impedance are $$\gamma_e = \sqrt{j\omega\mu_1(\sigma_1 + j\omega\varepsilon_1)}, \text{ and} \quad (57)$$

$$Z_e = \frac{j\omega\mu_1}{\gamma_e}. \quad (58)$$

For normal incidence, the equivalent representation of FIG. 8B is equivalent to a TEM transmission line whose characteristic impedance is that of air ($z_0$), with propagation constant of $\gamma_0$, and whose length is $z_1$. As such, the image ground plane impedance $Z_{in}$ seen at the interface for the shorted transmission line of FIG. 8C is given by $$Z_{in} = Z_0 \tan h(\gamma_0 z_1). \quad (59)$$

Equating the image ground plane impedance $Z_{in}$ associated with the equivalent model of FIG. 8C to the normal incidence wave impedance of FIG. 8A and solving for $z_1$ gives the distance to a short circuit (the perfectly conducting image ground plane 809) as $$z_1 = \frac{1}{\gamma_o}\tanh^{-1}\left(\frac{Z_e}{Z_o}\right) = \frac{1}{\gamma_o}\tanh^{-1}\left(\frac{\gamma_o}{\gamma_e}\right) \approx \frac{1}{\gamma_e}, \quad (60)$$

where only the first term of the series expansion for the inverse hyperbolic tangent is considered for this approximation. Note that in the air region 812, the propagation constant is $\gamma_0=j\beta_0$, so $Z_{in}=jZ_o \tan \beta_0 z_1$ (which is a purely imaginary quantity for a real $z_1$), but $z_e$ is a complex value if $\sigma\neq0$. Therefore, $Z_{in}=Z_e$ only when $z_1$ is a complex distance.

Since the equivalent representation of FIG. 8B includes a perfectly conducting image ground plane 809, the image depth for a charge or current lying at the surface of the earth (physical boundary 806) is equal to distance $z_1$ on the other side of the image ground plane 809, or $d=2\times z_1$ beneath the earth's surface (which is located at z=0). Thus, the distance to the perfectly conducting image ground plane 809 can be approximated by $$d = 2z_1 \approx \frac{2}{\gamma_e}. \quad (61)$$

Additionally, the "image charge" will be "equal and opposite" to the real charge, so the potential of the perfectly conducting image ground plane 809 at depth $z_1$=−d/2 will be zero.

Figure 9A:
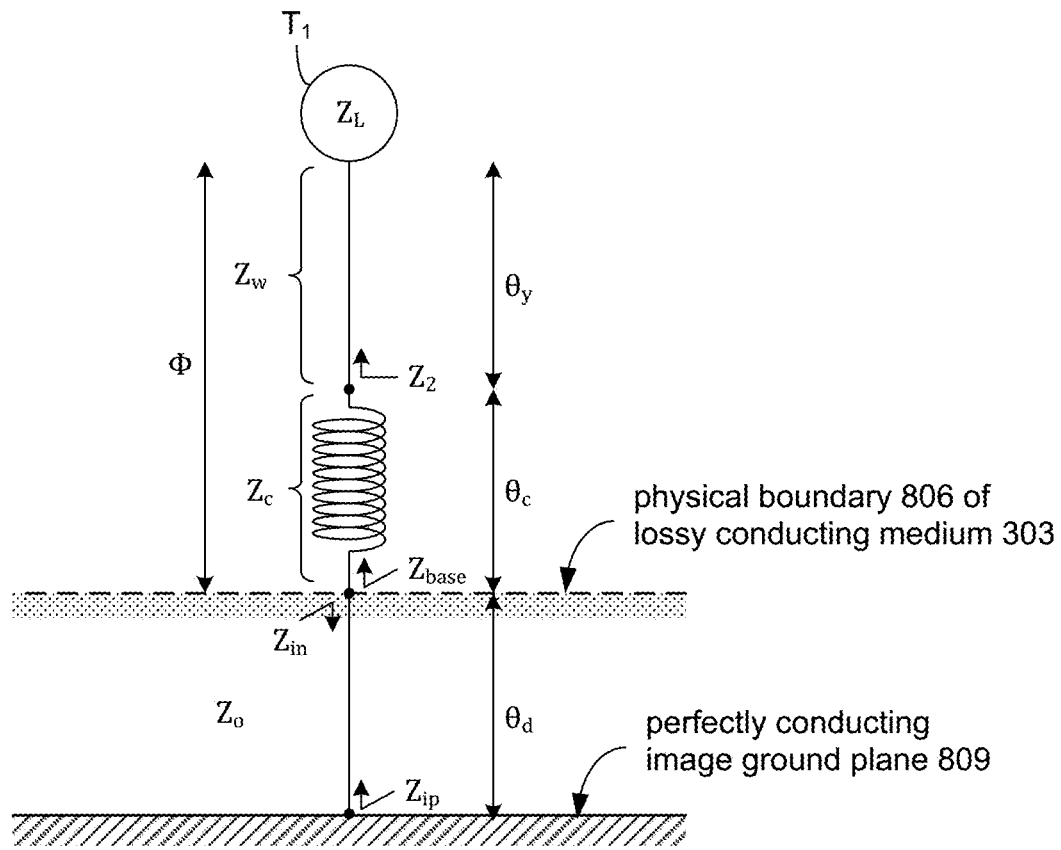
FIGS. 9A through 9C are graphical representations illustrating examples of single-wire transmission line and classic transmission line models of the equivalent image plane models of FIGS. 8B and 8C according to various embodiments of the present disclosure.
Figure 9B:
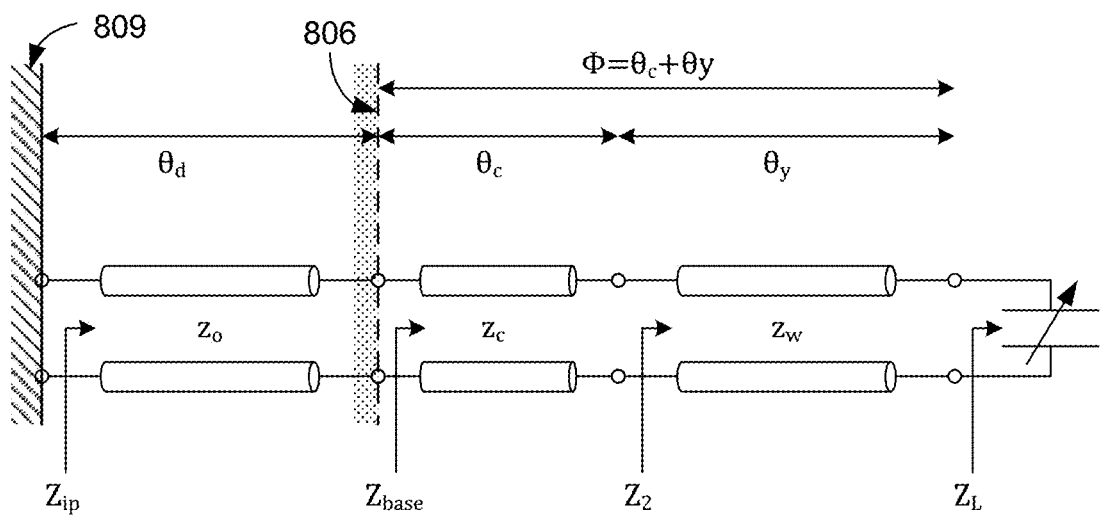
Figure 9C:
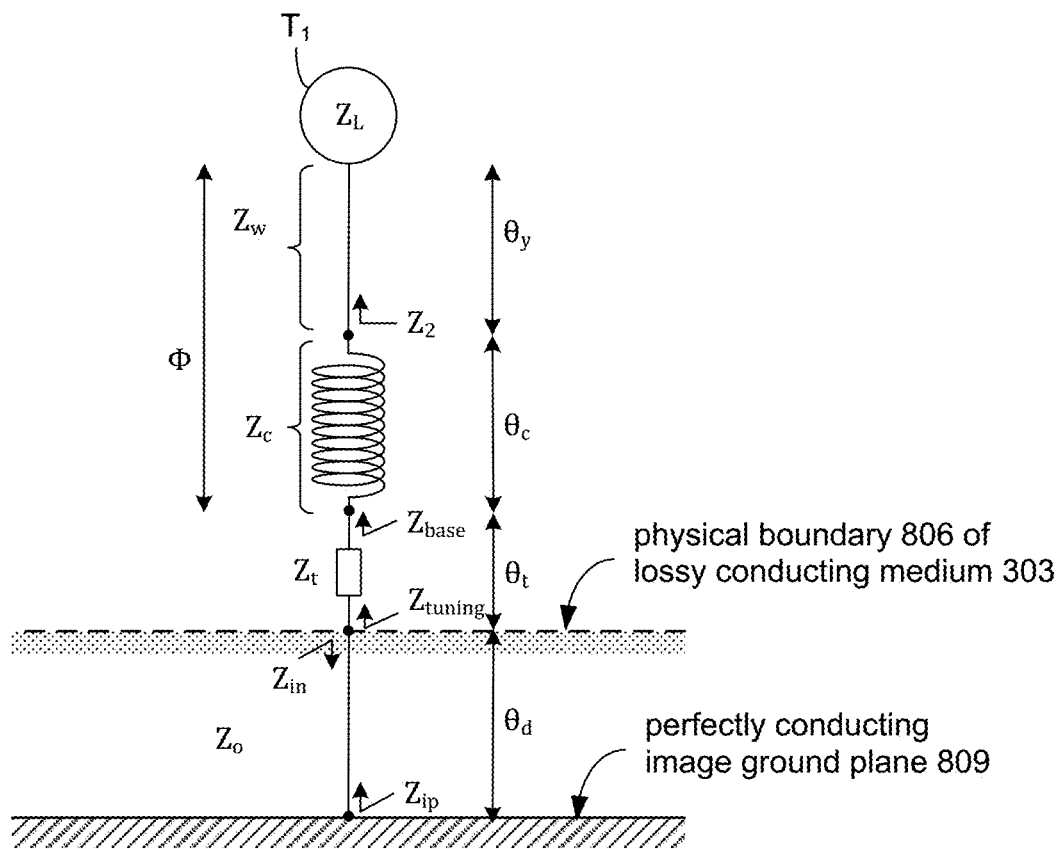

If a charge $Q_1$ is elevated a distance $H_1$ above the surface of the earth as illustrated in FIG. 3, then the image charge $Q_{1'}$ resides at a complex distance of $D_1$=d+$H_1$ below the surface, or a complex distance of d/2+$H_1$ below the image ground plane 318. The guided surface waveguide probe 300 of FIGS. 7A-7D can be modeled as an equivalent single-wire transmission line image plane model that can be based upon the perfectly conducting image ground plane 809 of FIG. 8B. FIG. 9A shows an example of the equivalent single-wire transmission line image plane model and FIG. 9B illustrates an example of the equivalent classic transmission line model, including the shorted transmission line of FIG. 8C. FIG. 9C illustrates an example of the equivalent classic transmission line model including the lumped element tank circuit 730.

In the equivalent image plane models of FIGS. 9A-C, $\Phi=\theta_y+\theta_c$ is the traveling wave phase delay of the guided surface waveguide probe 300 referenced to earth (or the lossy conducting medium 303), $\theta_c=\beta_p H$ is the electrical length of the coil or coils 709 (FIGS. 7A-7D), of physical length H, expressed in degrees, $\theta_y=\beta_w h_w$ is the electrical length of the vertical feed line conductor 718 (FIGS. 7A-7D), of physical length $h_w$, expressed in degrees, and $\theta_d=\beta_o d/2$ is the phase shift between the image ground plane 809 and the physical boundary 806 of the earth (or lossy conducting medium 303). In the example of FIGS. 9A-9C, $Z_w$ is the characteristic impedance of the elevated vertical feed line conductor 718 in ohms, $Z_c$ is the characteristic impedance of the coil(s) 709 in ohms, and $Z_0$ is the characteristic impedance of free space. In the example of FIG. 9C, $Z_t$ is the characteristic impedance of the lumped element tank circuit 730 in ohms and $\theta_t$ is the corresponding phase shift at the operating frequency.

At the base of the guided surface waveguide probe 300, the impedance seen "looking up" into the structure is $Z_\uparrow=Z_{base}$. With a load impedance of:

$$Z_L = \frac{1}{j\omega C_T}, \qquad (62)$$

where $C_T$ is the self-capacitance of the charge terminal $T_1$, the impedance seen "looking up" into the vertical feed line conductor 718 (FIGS. 7A-7D) is given by:

$$Z_2 = Z_w \frac{Z_L + Z_w \tanh(j\beta_w h_w)}{Z_w + Z_L \tanh(j\beta_e h_w)} = Z_w \frac{Z_L + Z_w \tanh(j\theta_y)}{Z_w + Z_L \tanh(j\theta_y)}, \qquad (63)$$

and the impedance seen "looking up" into the coil 709 (FIGS. 7A-7C) is given by:

$$Z_{base} = Z_c \frac{Z_2 + Z_c \tanh(j\beta_p H)}{Z_c + Z_2 \tanh(j\beta_p H)} = Z_c \frac{Z_2 + Z_c \tanh(j\theta_c)}{Z_c + Z_2 \tanh(j\theta_c)}. \qquad (64)$$

Where the feed network 309 includes a plurality of coils 709 (e.g., FIG. 7D), the impedance seen at the base of each coil 709 can be sequentially determined using Equation (64). For example, the impedance seen "looking up" into the upper coil 709a of FIG. 7D is given by:

$$Z_{coil} = Z_{ca} \frac{Z_2 + Z_{ca} \tanh(j\beta_p H)}{Z_{ca} + Z_2 \tanh(j\beta_p H)} = Z_{ca} \frac{Z_2 + Z_{ca} \tanh(j\theta_{ca})}{Z_{ca} + Z_2 \tanh(j\theta_{ca})}, \qquad (64.1)$$

and the impedance seen "looking up" into the lower coil 709b of FIG. 7D can be given by:

$$Z_{base} = Z_{cb} \frac{Z_{coil} + Z_{cb} \tanh(j\beta_p H)}{Z_{cb} + Z_{coil} \tanh(j\beta_p H)} = Z_{cb} \frac{Z_{coil} + Z_{cb} \tanh(j\theta_{cb})}{Z_{cb} + Z_{coil} \tanh(j\theta_c b)}. \qquad (64.2)$$

where $Z_{ca}$ and $Z_{cb}$ are the characteristic impedances of the upper and lower coils. This can be extended to account for additional coils 709 as needed. At the base of the guided surface waveguide probe 300, the impedance seen "looking down" into the lossy conducting medium 303 is $Z_1 = Z_{in}$, which is given by:

$$Z_{in} = Z_o \frac{Z_s + Z_o \tanh(j\beta_o(d/2))}{Z_o + Z_s \tanh(j\beta_o(d/2))} = Z_o \tanh(j\theta_d), \qquad (65)$$

where $Z_s = 0$.

Neglecting losses, the equivalent image plane model can be tuned to resonance when $Z_1 + Z_1 = 0$ at the physical boundary 806. Or, in the low loss case, $X_1 + X_1 = 0$ at the physical boundary 806, where X is the corresponding reactive component. Thus, the impedance at the physical boundary 806 "looking up" into the guided surface waveguide probe 300 is the conjugate of the impedance at the physical boundary 806 "looking down" into the lossy conducting medium 303. By adjusting the probe impedance via the load impedance $Z_L$ of the charge terminal $T_1$ while maintaining the traveling wave phase delay Φ equal to the angle of the media's wave tilt Ψ, so that Φ=Ψ, which improves and/or maximizes coupling of the probe's electric field to a guided surface waveguide mode along the surface of the lossy conducting medium 303 (e.g., earth), the equivalent image plane models of FIGS. 9A and 9B can be tuned to resonance with respect to the image ground plane 809. In this way, the impedance of the equivalent complex image plane model is purely resistive, which maintains a superposed standing wave on the probe structure that maximizes the voltage and elevated charge on terminal $T_1$, and by equations (1)-(3) and (16) maximizes the propagating surface wave.

While the load impedance $Z_L$ of the charge terminal $T_1$ can be adjusted to tune the probe 300 for standing wave resonance with respect to the image ground plane 809, in some embodiments a lumped element tank circuit 730 located between the coil(s) 709 (FIGS. 7B-7D) and the ground stake (or grounding system) 715 can be adjusted to tune the probe 300 for standing wave resonance with respect to the image ground plane 809 as illustrated in FIG. 9C. A phase delay is not experienced as the traveling wave passes through the lumped element tank circuit 730. As a result, the total traveling wave phase delay through, e.g., the guided surface waveguide probes 300c, 300d and 300e is still Φ=θ_c+θ_y. However, it should be noted that phase shifts do occur in lumped element circuits. Phase shifts also occur at impedance discontinuities between transmission line segments, and between line segments and loads. Thus, the tank circuit 730 may also be referred to as a "phase shift circuit."

Figure 9D:
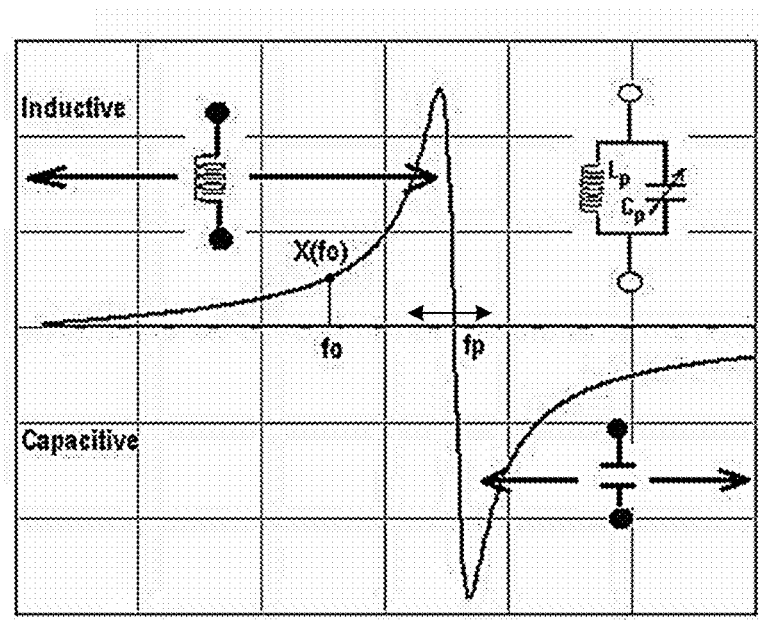
FIG. 9D is a plot illustrating an example of the reactance variation of a lumped element tank circuit with respect to operating frequency according to various embodiments of the present disclosure.

With the lumped element tank circuit 730 coupled to the base of the guided surface waveguide probe 300, the impedance seen "looking up" into the tank circuit 730 is $Z_1 = Z_{tuning}$, which can be given by:

$$Z_{tuning} = Z_{base} - Z_t, \qquad (66)$$

where $Z_t$ is the characteristic impedance of the tank circuit 730 and $Z_{base}$ is the impedance seen "looking up" into the coil(s) as given in, e.g., Equations (64) or (64.2). FIG. 9D illustrates the variation of the impedance of the lumped element tank circuit 730 with respect to operating frequency ($f_o$) based upon the resonant frequency ($f_p$) of the tank circuit 730. As shown in FIG. 9D, the impedance of the lumped element tank 730 can be inductive or capacitive depending on the tuned self-resonant frequency of the tank circuit. When operating the tank circuit 730 at a frequency below its self-resonant frequency ($f_p$), its terminal point impedance is inductive, and for operation above $f_p$ the terminal point impedance is capacitive. Adjusting either the inductance 733 or the capacitance 736 of the tank circuit 730 changes $f_p$ and shifts the impedance curve in FIG. 9D, which affects the terminal point impedance seen at a given operating frequency $f_o$.

Neglecting losses, the equivalent image plane model with the tank circuit 730 can be tuned to resonance when $Z_1 + Z_1 = 0$ at the physical boundary 806. Or, in the low loss case, $X_1 + X_1 = 0$ at the physical boundary 806, where X is the corresponding reactive component. Thus, the impedance at the physical boundary 806 "looking up" into the lumped element tank circuit 730 is the conjugate of the impedance at the physical boundary 806 "looking down" into the lossy conducting medium 303. By adjusting the lumped element tank circuit 730 while maintaining the traveling wave phase delay Φ equal to the angle of the media's wave tilt Ψ, so that Φ=Ψ, the equivalent image plane models can be tuned to resonance with respect to the image ground plane 809. In this way, the impedance of the equivalent complex image plane model is purely resistive, which maintains a superposed standing wave on the probe structure that maximizes the voltage and elevated charge on terminal $T_1$, and improves and/or maximizes coupling of the probe's electric field to a guided surface waveguide mode along the surface of the lossy conducting medium 303 (e.g., earth).

It follows from the Hankel solutions, that the guided surface wave excited by the guided surface waveguide probe 300 is an outward propagating traveling wave. The source distribution along the feed network 309 between the charge terminal $T_1$ and the ground stake (or grounding system) 715 of the guided surface waveguide probe 300 (FIGS. 3 and 7A-7D) is actually composed of a superposition of a traveling wave plus a standing wave on the structure. With the charge terminal $T_1$ positioned at or above the physical height $h_p$, the phase delay of the traveling wave moving through the feed network 309 is matched to the angle of the wave tilt associated with the lossy conducting medium 303. This mode-matching allows the traveling wave to be launched along the lossy conducting medium 303. Once the phase delay has been established for the traveling wave, the load impedance $Z_L$ of the charge terminal $T_1$ and/or the lumped element tank circuit 730 can be adjusted to bring the probe structure into standing wave resonance with respect to the image ground plane (318 of FIG. 3 or 809 of FIG. 8), which is at a complex depth of $-d/2$. In that case, the impedance seen from the image ground plane has zero reactance and the charge on the charge terminal $T_1$ is maximized.

The distinction between the traveling wave phenomenon and standing wave phenomena is that (1) the phase delay of traveling waves ($\theta=\beta d$) on a section of transmission line of length d (sometimes called a "delay line") is due to propagation time delays; whereas (2) the position-dependent phase of standing waves (which are composed of forward and backward propagating waves) depends on both the line length propagation time delay and impedance transitions at interfaces between line sections of different characteristic impedances. In addition to the phase delay that arises due to the physical length of a section of transmission line operating in sinusoidal steady-state, there is an extra reflection coefficient phase at impedance discontinuities that is due to the ratio of $Z_{oa}/Z_{ob}$, where $Z_{oa}$ and $Z_{ob}$ are the characteristic impedances of two sections of a transmission line such as, e.g., a helical coil section of characteristic impedance $Z_{oa}=Z_c$ (FIG. 9B) and a straight section of vertical feed line conductor of characteristic impedance $Z_{ob}=Z_w$ (FIG. 9B). The effect of such discontinuous phase jumps can be seen in the Smith chart plots in FIG. 12A.

As a result of this phenomenon, two relatively short transmission line sections of widely differing characteristic impedance may be used to provide a very large phase shift. For example, a probe structure composed of two sections of transmission line, one of low impedance and one of high impedance, together totaling a physical length of, say, $0.05\lambda$, may be fabricated to provide a phase shift of 90° which is equivalent to a $0.25\lambda$ resonance. This is due to the large jump in characteristic impedances. In this way, a physically short probe structure can be electrically longer than the two physical lengths combined. This is illustrated in FIGS. 9A and 9B, but is especially clear in FIG. 12A where the discontinuities in the impedance ratios provide large jumps in phase between the different plotted sections on the Smith chart. The impedance discontinuity provides a substantial phase shift where the sections are joined together.

Figure 10:
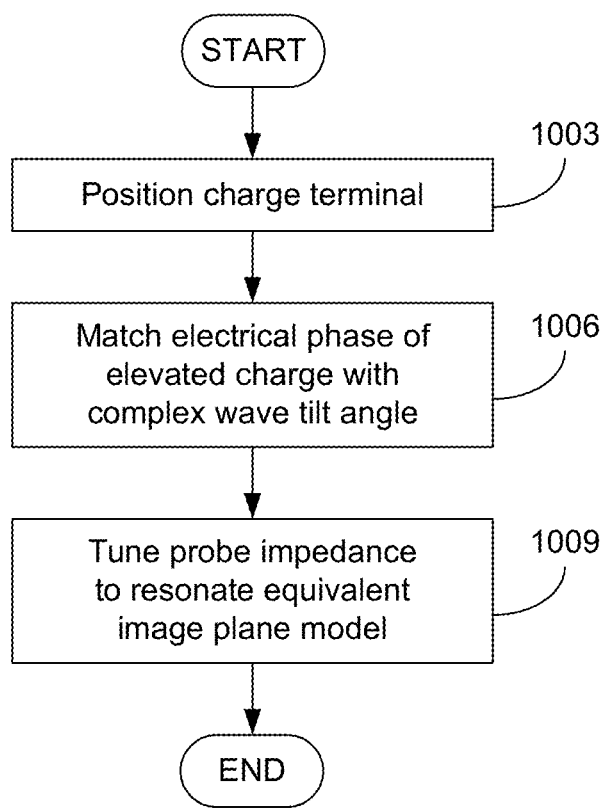
FIG. 10 is a flow chart illustrating an example of adjusting a guided surface waveguide probe of FIGS. 3 and 7A-7D to launch a guided surface wave along the surface of a lossy conducting medium according to various embodiments of the present disclosure.

Referring to FIG. 10, shown is a flow chart illustrating an example of adjusting a guided surface waveguide probe 300 (FIGS. 3 and 7A-7D) to substantially mode-match to a guided surface waveguide mode on the surface of the lossy conducting medium, which launches a guided surface traveling wave along the surface of a lossy conducting medium 303 (FIGS. 3 and 7A-7D). Beginning with 1003, the charge terminal $T_1$ of the guided surface waveguide probe 300 is positioned at a defined height above a lossy conducting medium 303. Utilizing the characteristics of the lossy conducting medium 303 and the operating frequency of the guided surface waveguide probe 300, the Hankel crossover distance can also be found by equating the magnitudes of Equations (20b) and (21) for $-j\gamma\rho$, and solving for $R_x$ as illustrated by FIG. 4. The complex index of refraction (n) can be determined using Equation (41) and the complex Brewster angle ($\theta_{i,B}$) can then be determined from Equation (42). The physical height ($h_p$) of the charge terminal $T_1$ can then be determined from Equation (44). The charge terminal $T_1$ should be at or higher than the physical height ($h_p$) in order to excite the far-out component of the Hankel function. This height relationship is initially considered when launching surface waves. To reduce or minimize the bound charge on the charge terminal $T_1$, the height should be at least four times the spherical diameter (or equivalent spherical diameter) of the charge terminal At 1006, the electrical phase delay $\Phi$ of the elevated charge $Q_1$ on the charge terminal $T_1$ is matched to the complex wave tilt angle $\Psi$. The phase delay ($\theta_c$) of the helical coil(s) and/or the phase delay ($\theta_y$) of the vertical feed line conductor can be adjusted to make $\Phi$ equal to the angle ($\Psi$) of the wave tilt (W). Based on Equation (31), the angle ($\Psi$) of the wave tilt can be determined from:

$$W = \frac{E_\rho}{E_z} = \frac{1}{\tan\theta_{i,B}} = \frac{1}{n} = |W|e^{j\Psi}. \tag{67}$$

The electrical phase delay $\Phi$ can then be matched to the angle of the wave tilt. This angular (or phase) relationship is next considered when launching surface waves. For example, the electrical phase delay $\Phi=\theta_c+\theta_y$ can be adjusted by varying the geometrical parameters of the coil(s) 709 (FIGS. 7A-7D) and/or the length (or height) of the vertical feed line conductor 718 (FIGS. 7A-7D). By matching $\Phi=\Psi$, an electric field can be established at or beyond the Hankel crossover distance ($R_x$) with a complex Brewster angle at the boundary interface to excite the surface waveguide mode and launch a traveling wave along the lossy conducting medium 303.

Next at 1009, the impedance of the guided surface waveguide probe 300 can betuned to resonate the equivalent image plane model of the guided surface waveguide probe 300. The depth (d/2) of the conducting image ground plane 809 (or 318 of FIG. 3) can be determined using Equations (52), (53) and (54) and the values of the lossy conducting medium 303 (e.g., the earth), which can be measured. Using that depth, the phase shift ($\theta_d$) between the image ground plane 809 and the physical boundary 806 of the lossy conducting medium 303 can be determined using $\theta_d=\beta_o d/2$. The impedance ($Z_{in}$) as seen "looking down" into the lossy conducting medium 303 can then be determined using Equation (65). This resonance relationship can be considered to maximize the launched surface waves.

Based upon the adjusted parameters of the coil(s) 709 and the length of the vertical feed line conductor 718, the velocity factor, phase delay, and impedance of the coil(s) 709 and vertical feed line conductor 718 can be determined using Equations (45) through (51). In addition, the self-capacitance ($C_T$) of the charge terminal $T_1$ can be determined using, e.g., Equation (24). The propagation factor ($\beta_p$) of the coil(s) 709 can be determined using Equation (35) and the propagation phase constant ($\beta_w$) for the vertical feed line conductor 718 can be determined using Equation (49). Using the self-capacitance and the determined values of the coil(s) 709 and vertical feed line conductor 718, the impedance ($Z_{base}$) of the guided surface waveguide probe 300 as seen "looking up" into the coil(s) 709 can be determined using Equations (62), (63), (64), (64.1) and/or (64.2).

The equivalent image plane model of the guided surface waveguide probe 300 can be tuned to resonance by, e.g., adjusting the load impedance $Z_L$ such that the reactance component $X_{base}$ of $Z_{base}$ cancels out the reactance component $X_{in}$ of $Z_{in}$, or $X_{base}+X_{in}=0$. Thus, the impedance at the physical boundary 806 "looking up" into the guided surface waveguide probe 300 is the conjugate of the impedance at the physical boundary 806 "looking down" into the lossy conducting medium 303. The load impedance $Z_L$ can be adjusted by varying the capacitance ($C_T$) of the charge terminal $T_1$ without changing the electrical phase delay $\Phi=\theta_c+\theta_y$ of the charge terminal $T_1$. An iterative approach may be taken to tune the load impedance $Z_L$ for resonance of the equivalent image plane model with respect to the conducting image ground plane 809 (or 318). In this way, the coupling of the electric field to a guided surface waveguide mode along the surface of the lossy conducting medium 303 (e.g., earth) can be improved and/or maximized.

The equivalent image plane model of the guided surface waveguide probe 300 can also be tuned to resonance by, e.g., adjusting the lumped element tank circuit 730 such that the reactance component $X_{tuning}$ of $Z_{tuning}$, cancels out the reactance component $X_{in}$ of $Z_{in}$, or $X_{tuning}+X_{in}=0$. Consider the parallel resonance curve in FIG. 9D, whose terminal point impedance at some operating frequency ($f_o$) is given by $$jX_T(f) = \frac{(j2\pi fL_p)(j2\pi fC_p)^{-1}}{(j2\pi fL_p)+(j2\pi fC_p)^{-1}} = j\frac{2\pi fL_p}{1-(2\pi fL_p)^2 L_p C_p} \quad (68)$$

As $C_p$ (or $L_p$) is varied, the self-resonant frequency ($f_p$) of the parallel tank circuit 730 changes and the terminal point reactance $X_T(f_o)$ at the frequency of operation varies from inductive (+) to capacitive (−) depending on whether $f_o<f_p$ or $f_p<f_o$. By adjusting $f_p$, a wide range of reactance at $f_o$ (e.g., a large inductance $L_{eq}(f_o)=X_T(f_o)/\omega$ or a small capacitance $C_{eq}(f_o)=-1/\omega X_T(f_o)$) can be seen at the terminals of the tank circuit 730.

To obtain the electrical phase delay ($\Phi$) for coupling into the guided surface waveguide mode, the coil(s) 709 and vertical feed line conductor 718 are usually less than a quarter wavelength. For this, an inductive reactance can be added by the lumped element tank circuit 730 so that the impedance at the physical boundary 806 "looking up" into the lumped element tank circuit 730 is the conjugate of the impedance at the physical boundary 806 "looking down" into the lossy conducting medium 303. As seen in FIG. 9D, adjusting $f_p$ of the tank circuit 730 above the operating frequency ($f_o$) can provide the needed impedance, without changing the electrical phase delay $\Phi=\theta_c+\theta_y$ of the charge terminal $T_1$, to tune for resonance of the equivalent image plane model with respect to the conducting image ground plane 809 (or 318). In some cases, a capacitive reactance may be needed and can be provided by adjusting $f_p$ of the tank circuit 730 below the operating frequency. In this way, the coupling of the electric field to a guided surface waveguide mode along the surface of the lossy conducting medium 303 (e.g., earth) can be improved and/or maximized.

This may be better understood by illustrating the situations with numerical examples. Consider a guided surface waveguide probe 300b (FIG. 7A) comprising a top-loaded vertical stub of physical height $h_p$ with a charge terminal $T_1$ at the top, where the charge terminal $T_1$ is excited through a helical coil and vertical feed line conductor at an operational frequency ($f_o$) of 1.85 MHz. With a height ($H_1$) of 16 feet and the lossy conducting medium 303 (i.e., earth) having a relative permittivity of $\varepsilon_r=15$ and a conductivity of $\sigma_1=0.010$ mhos/m, several surface wave propagation parameters can be calculated for $f_o=1.850$ MHz. Under these conditions, the Hankel crossover distance can be found to be $R_x=54.5$ feet with a physical height of $h_p=5.5$ feet, which is well below the actual height of the charge terminal $T_1$. While a charge terminal height of $H_1=5.5$ feet could have been used, the taller probe structure reduced the bound capacitance, permitting a greater percentage of free charge on the charge terminal $T_1$ providing greater field strength and excitation of the traveling wave.

The wave length can be determined as $\lambda_o=c/f_o=162.162$ meters, where c is the speed of light. The complex index of refraction is $n=\sqrt{\varepsilon_r-jx}=7.529-j6.546$, from Equation (41), where $x=\sigma_1/\omega\varepsilon_o$ with $\omega=2\pi f_o$, and the complex Brewster angle is:

$$\theta_{i,B}=\arctan(\sqrt{\varepsilon_r-jx})=85.6-j3.744°. \quad (69)$$

from Equation (42). Using Equation (67), the wave tilt values can be determined to be:

$$W = \frac{1}{\tan\theta_{i,B}} = \frac{1}{n} = |W|e^{j\Psi} = 0.101 e^{j\,40.614°}. \quad (70)$$

Thus, the helical coil can be adjusted to match $\varphi=\Psi=40.614°$

The velocity factor of the vertical feed line conductor (approximated as a uniform cylindrical conductor with a diameter of 0.27 inches) can be given as $V_w \approx 0.93$.

Since $h_p \ll \lambda_o$, the propagation phase constant for the vertical feed line conductor can be approximated as:

$$\beta_w = \frac{2\pi}{\lambda_w} = \frac{2\pi}{V_w \lambda_0} = 0.042\ \mathrm{m}^{-1}. \quad (71)$$

From Equation (49) the phase delay of the vertical feed line conductor is:

$$\theta_y=\beta_w h_w \approx \beta_w h_p = 11.640°. \quad (72)$$

Figure 11:
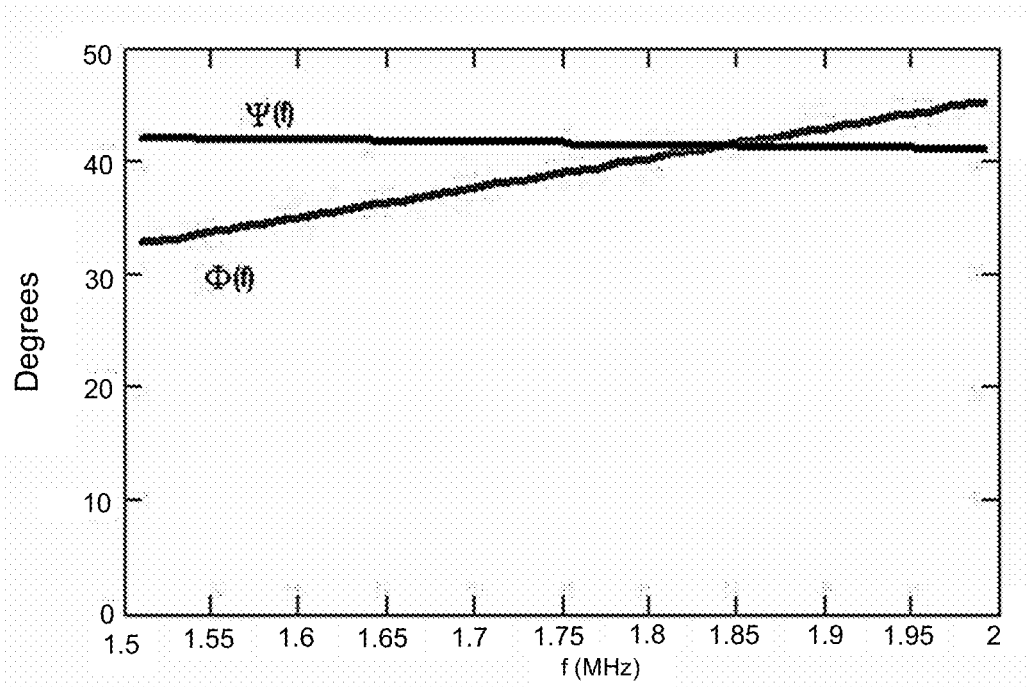
FIG. 11 is a plot illustrating an example of the relationship between a wave tilt angle and the phase delay of a guided surface waveguide probe of FIGS. 3 and 7A-7D according to various embodiments of the present disclosure.

By adjusting the phase delay of the helical coil so that $\theta_c=28.974°=40.614°-11.640°$, $\Phi$ will equal $\Psi$ to match the guided surface waveguide mode. To illustrate the relationship between $\Phi$ and $\Psi$, FIG. 11 shows a plot of both over a range of frequencies. As both $\Phi$ and $\Psi$ are frequency dependent, it can be seen that their respective curves cross over each other at approximately 1.85 MHz.

For a helical coil having a conductor diameter of 0.0881 inches, a coil diameter (D) of 30 inches and a turn-to-turn spacing (s) of 4 inches, the velocity factor for the coil can be determined using Equation (45) as:

$$V_f = \frac{1}{\sqrt{1+20\left(\frac{D}{s}\right)^{2.5}\left(\frac{D}{\lambda_o}\right)^{0.5}}} = 0.069, \quad (73)$$

and the propagation factor from Equation (35) is:

$$\beta_p = \frac{2\pi}{V_f \lambda_0} = 0.564 \text{ m}^{-1}. \tag{74}$$

With $\theta_c$=28.974°, the axial length of the solenoidal helix (H) can be determined using Equation (46) such that:

$$H = \frac{\theta_c}{\beta_p} = 35.2732 \text{ inches.} \tag{75}$$

This height determines the location on the helical coil where the vertical feed line conductor is connected, resulting in a coil with 8.818 turns (N=H/s).

With the traveling wave phase delay of the coil and vertical feed line conductor adjusted to match the wave tilt angle ($\Phi = \theta_c + \theta_y = \Psi$), the load impedance ($Z_L$) of the charge terminal $T_1$ can be adjusted for standing wave resonance of the equivalent image plane model of the guided surface wave probe 300. From the measured permittivity, conductivity and permeability of the earth, the radial propagation constant can be determined using Equation (57)

$$\gamma_e = \sqrt{j\omega\mu_1(\sigma_1 + j\omega\varepsilon_1)} = 0.25 + j0.292 \text{ m}^{-1}, \tag{76}$$

And the complex depth of the conducting image ground plane can be approximated from Equation (52) as:

$$d \approx \frac{2}{\gamma_e} = 3.364 + j\,3.963 \text{ meters,} \tag{77}$$

with a corresponding phase shift between the conducting image ground plane and the physical boundary of the earth given by:

$$\theta_d = \beta_o(d/2) = 4.015 - j4.73°. \tag{78}$$

Using Equation (65), the impedance seen "looking down" into the lossy conducting medium 303 (i.e., earth) can be determined as:

$$Z_{in} = Z_o \tan h(j\theta_d) = R_{in} + jX_{in} = 31.191 + j26.27 \text{ ohms.} \tag{79}$$

By matching the reactive component ($X_{in}$) seen "looking down" into the lossy conducting medium 303 with the reactive component ($X_{base}$) seen "looking up" into the guided surface wave probe 300, the coupling into the guided surface waveguide mode may be maximized. This can be accomplished by adjusting the capacitance of the charge terminal $T_1$ without changing the traveling wave phase delays of the coil and vertical feed line conductor. For example, by adjusting the charge terminal capacitance ($C_T$) to 61.8126 pF, the load impedance from Equation (62) is:

$$Z_L = \frac{1}{j\omega C_T} = -j\,1392 \text{ ohms,} \tag{80}$$

and the reactive components at the boundary are matched.

Using Equation (51), the impedance of the vertical feed line conductor (having a diameter (2a) of 0.27 inches) is given as $$Z_w = 128 \log\left(\frac{1.123 V_w \lambda_0}{2\pi a}\right) = 537.534 \text{ ohms,} \tag{81}$$

and the impedance seen "looking up" into the vertical feed line conductor is given by Equation (63) as:

$$Z_2 = Z_w \frac{Z_L + Z_w \tanh(j\theta_y)}{Z_w + Z_L \tanh(j\theta_y)} = -j\,835.438 \text{ ohms.} \tag{82}$$

Using Equation (47), the characteristic impedance of the helical coil is given as $$Z_c = \frac{60}{V_f}\left[\ell n\left(\frac{V_f \lambda_0}{D}\right) - 1.027\right] = 1446 \text{ ohms,} \tag{83}$$

and the impedance seen "looking up" into the coil at the base is given by Equation (64) as:

$$Z_{base} = Z_c \frac{Z_2 + Z_c \tanh(j\theta_c)}{Z_c + Z_2 \tanh(j\theta_c)} = -j26.271 \text{ ohms.} \tag{84}$$

When compared to the solution of Equation (79), it can be seen that the reactive components are opposite and approximately equal, and thus are conjugates of each other. Thus, the impedance ($Z_{ip}$) seen "looking up" into the equivalent image plane model of FIGS. 9A and 9B from the perfectly conducting image ground plane is only resistive or $Z_{ip}$=R+ j0.

Figure 12A:
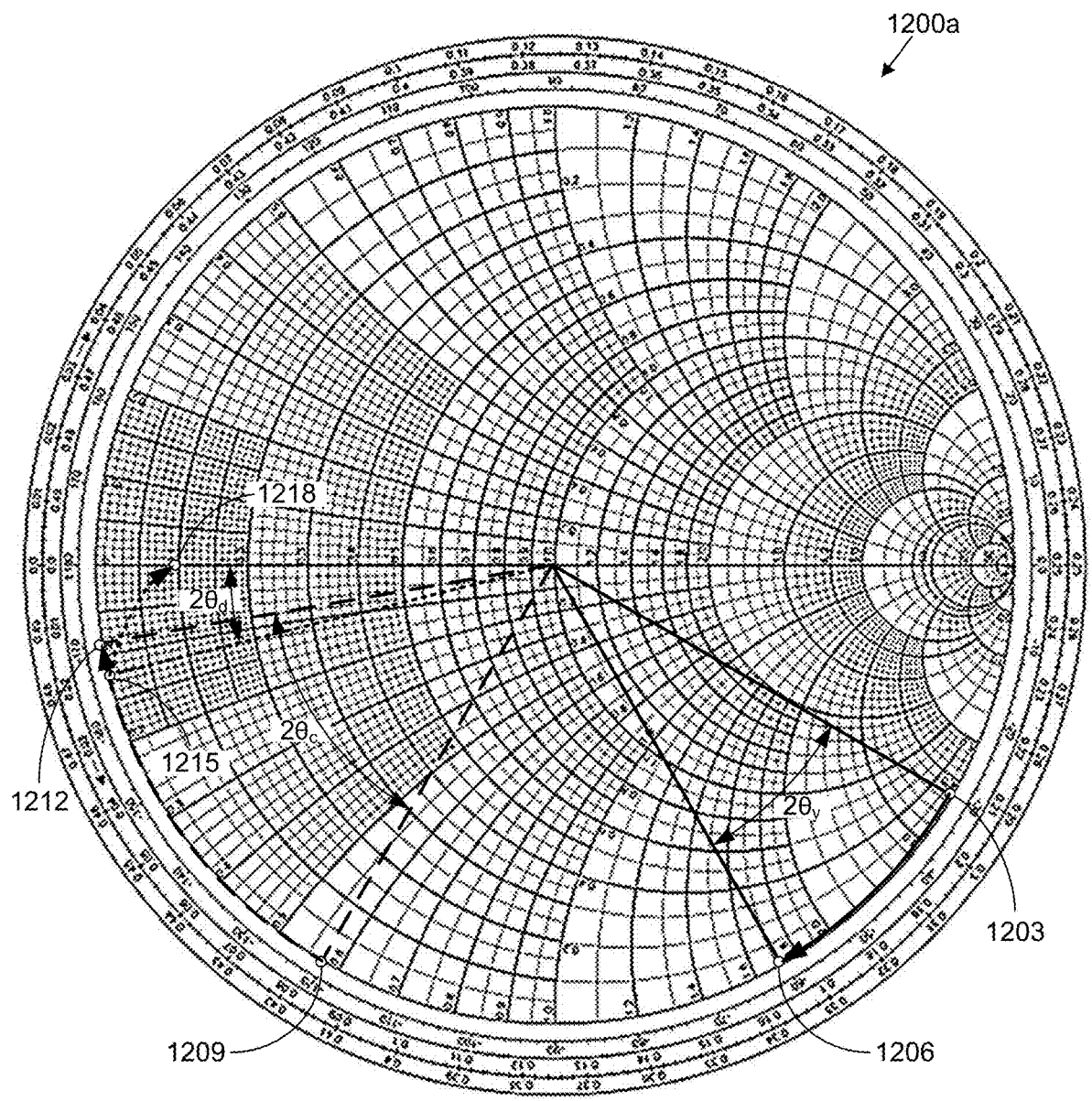
FIG. 12A is a Smith chart illustrating an example of adjusting the probe impedance via the load impedance of the guided surface waveguide probe of FIGS. 3 and 7A according to various embodiments of the present disclosure.

Referring to FIG. 12A, shown is a Smith chart 1200a that graphically illustrates an example of the effect of the discontinuous phase jumps on the impedance ($Z_{ip}$) seen "looking up" into the equivalent image plane model of FIG. 9B. First, because of the transition between the charge terminal and the vertical feed line conductor, the actual load impedance $Z_L$ is normalized with respect to the characteristic impedance ($Z_w$) of the vertical feed line conductor and is entered on Smith chart 1200a at point 1203 ($Z_L/Z_W$). The normalized impedance is then transferred along the vertical feed line section by an electrical distance of $\theta_y = \beta_w h_w \approx \beta_w h_p$ (which is clockwise through an angle of $2\theta_y$ on the Smith chart 1200a) to point 1206 ($Z_2/Z_w$). The impedance at point 1206 is now converted to the actual impedance ($Z_2$) seen "looking up" into the vertical feed line conductor using $Z_w$.

Second, because of the transition between the vertical feed line conductor and the helical coil, the impedance $Z_2$ is then normalized with respect to the characteristic impedance ($Z_c$) of the helical coil. This normalized impedance can now be entered on the Smith chart 1200a at point 1209 ($Z_2/Z_c$) and transferred along the helical coil transmission line section by an electrical distance $\theta_c = \beta_p H$, (which is clockwise through an angle equal to $2\theta_c$ on the Smith chart 1200a) to point 1212 ($Z_{base}/Z_c$). The jump between point 1206 and point 1209 is a result of the discontinuity in the impedance ratios. The impedance looking into the base of the coil at point 1212 is then converted to the actual impedance ($Z_{base}$) seen "looking up" into the base of the coil (or the guided surface wave probe 300) using $Z_c$.

Third, because of the transition between the helical coil and the lossy conducting medium, the impedance at $Z_{base}$ is then normalized with respect to the characteristic impedance ($Z_O$) of the modeled image space below the physical boundary of the lossy conducting medium (e.g., the ground surface). This normalized impedance can now be entered on the Smith chart 1200a at point 1215 ($Z_{base}/Z_o$), and transferred along the subsurface image transmission line section by an electrical distance $\theta_d=\beta_o d/2$ (which is clockwise through an angle equal to $2\theta_d$ on the Smith chart 1200a) to point 1218 ($Z_{ip}/Z_O$). The jump between point 1212 and point 1215 is a result of the discontinuity in the impedance ratios. The impedance looking into the subsurface image transmission line at point 1218 is now converted to an actual impedance ($Z_{ip}$) using $Z_O$. When this system is resonated, the impedance at point 1218 is $Z_{ip}=R_{ip}+j\,0$. On the Smith chart 1200a, $Z_{base}/Z_o$ is a larger reactance than $Z_{base}/Z_c$. This is because the characteristic impedance ($Z_r$) of a helical coil is considerably larger than the characteristic impedance $Z_o$ of free space.

When properly adjusted and tuned, the oscillations on a structure of sufficient physical height are actually composed of a traveling wave, which is phase delayed to match the angle of the wave tilt associated with the lossy conducting medium ($\Phi=\Psi$), plus a standing wave which is electrically brought into resonance ($Z_{ip}=R+j0$) by a combination of the phase delays of the transmission line sections of the guided surface waveguide probe 300 plus the phase discontinuities due to jumps in the ratios of the characteristic impedances, as illustrated on the Smith chart 1200a of FIG. 12A. The above example illustrates how the three considerations discussed above can be satisfied for launching guided surface traveling waves on the lossy conducting medium.

In another example, consider the guided surface waveguide probes 300c and 300d shown in FIGS. 7B and 7C comprising a top-loaded vertical stub of physical height $h_p$ with a charge terminal $T_1$ at the top and a lumped element tank circuit 730 connected at the base, where the charge terminal $T_1$ is excited through a helical coil and vertical feed line conductor at an operational frequency ($f_o$) of 1330 kHz ($\lambda_0$=225.6 meters). The excitation source 312 can be coupled to the guided surface waveguide probe 300 in a variety of ways (e.g., tapped coil, link coupled, etc.). As shown in FIG. 7C, the excitation source 312 can be coupled through the inductor 733 of the tuned circuit 730, with the capacitor 736 fabricated in many forms.

With the lossy conducting medium 303 (i.e., earth) having a relative permittivity of $\varepsilon_r$=15 and a conductivity of $\sigma_1$=0.008 mhos/m, the complex index of refraction from Equation (41) and the complex Brewster angle from Equation (42) can be found. Using Equation (67), the wave tilt value can be determined to be:

$$W = \frac{1}{\tan\theta_{i,B}} = \frac{1}{n} = |W|e^{j\Psi} = 0.096 e^{j41.053°}, \tag{86}$$

and the Hankel crossover distance can be found to be $R_x$=70 feet with a physical height of $h_p$=6.7 feet. By choosing a charge terminal height of $H_1$=20 feet, the bound capacitance is reduced, permitting a greater percentage of free charge on the charge terminal $T_1$ providing greater field strength and excitation of the traveling wave.

For a vertical feed line conductor 718 with a diameter of 0.25 inches and a length of about 20 feet, the velocity factor can be given as $V_W$=0.93. From Equation (49), the phase delay of the vertical feed line conductor is:

$$\theta_y=\beta_w h_w \approx \beta_w h_p = 10.461°. \tag{87}$$

By adjusting the phase delay of the coil 709 so that $\theta_c$=30.592°=41.053°−10.461°, $\Phi$ will equal W to match the guided surface waveguide mode. Using a helical coil having a conductor diameter of 0.250 inches, a coil diameter (D) of 10 inches and a turn-to-turn spacing (s) of 0.083 inches, the velocity factor for the coil can be determined using Equation (45) as $V_f$=0.00460. With $\theta_c$=30.592°, the axial length of the solenoidal helix (H) can be determined using Equation (46). For an axial length (or coil height) of H=41 inches, which corresponds to a coil with 49.4 turns (N=H/s), the coil delay is $\theta_c$32 30.61°.

With the traveling wave phase delay of the coil and vertical feed line conductor adjusted to match the wave tilt angle ($\Phi=\theta_c+\theta_y=\Psi$), the impedance ($Z_t$) of the tank circuit 730 can be adjusted for standing wave resonance of the equivalent image plane model of the guided surface wave probe 300. From the measured permittivity, conductivity and permeability of the earth, the radial propagation constant can be determined using Equation (57) as $\gamma_e$=0.1913+j 0.2196 m$^{-1}$. And the complex depth of the conducting image ground plane can be approximated from Equation (52) as d≈2/$\gamma_e$=4.484−j 5.196 meters, with a corresponding phase shift between the conducting image ground plane and the physical boundary of the earth given by $\theta_d=\beta_o(d/2)$=3.579−j 4.1466°. Using Equation (65), the impedance seen "looking down" into the lossy conducting medium 303 (i.e., earth) can be determined as:

$$Z_{in}=Z_o \tan h(j\theta_d)=R_{in}+jX_{in}=27.328+j23.44 \text{ ohms.} \tag{88}$$

By matching the reactive component ($X_{in}$) seen "looking down" into the lossy conducting medium 303 with the reactive component ($X_{tuning}$) seen "looking up" into the lumped element tank circuit 730 of the guided surface wave probe 300, the coupling into the guided surface waveguide mode may be maximized. This can be accomplished by adjusting the capacitance 736 (or the inductance 733) of the tank circuit 730 without changing the traveling wave phase delays of the coil and vertical feed line conductor. For example, consider a charge terminal capacitance ($C_T$) to 45 pF, then the load impedance from Equation (62) is $Z_L$=−j2659.2Ω. Using Equation (51), the impedance of the vertical feed line conductor (e.g., a copper pipe having a diameter (2a) of 0.25 inches) is given as $Z_w$=j588.712Ω, and the impedance seen "looking up" into the vertical feed line conductor is given by Equation (63) as:

$$Z_2 = Z_W \frac{Z_L + Z_w \tanh(j\theta_y)}{Z_w + Z_L \tanh(j\theta_y)} = j1390.7 \text{ ohms.} \tag{89}$$

Using Equation (47), the characteristic impedance of the helical coil 709 is given as $Z_c$=j3147.8Ω, and the impedance seen "looking up" into the base of the coil 709 is given by Equation (64) as:

$$Z_{base} = Z_c \frac{Z_2 + Z_c \tanh(j\theta_c)}{Z_c + Z_2 \tanh(j\theta_c)} = -j373.969 \text{ ohms.} \tag{90}$$

The self-resonant frequency of the lumped element tank circuit can now be adjusted so that the reactive components "looking up" into the tank circuit 730 of the guided surface wave 300 and "looking down" into the into the lossy conducting medium 303 are opposite and approximately equal, and thus are conjugates of each other. As seen from Equation (88), the reactive component of $Z_{in}$ is $X_{in}$=j 23.44Ω. Thus, by adjusting the impedance of the tank circuit 730 so that the impedance seen "looking up" is $X_{tuning}=-j$ 23.44Ω, the impedance ($Z_{ip}$) seen "looking up" into the equivalent image plane model of FIG. 9C from the perfectly conducting image ground plane is only resistive or $Z_{ip}=R+j0$.

The values of the lumped element tank circuit 730 can be identified using Equations (66) and (68). From Equation (66), a terminal point impedance of $Z_t=Z_{base}-Z_{tuning}$ gives $-j$ 373.969$-j$ 23.44$=-j$397.409Ω. Consider an inductor 733 having an inductance of $L_p=1000$ and adjusting the capacitor 736 to a capacitance of $C_p=444.2$ pF, then the lumped element tank circuit 730 would have a self-resonant frequency of 755.15 kHz. Using Equation (68), the terminal point impedance at an operating frequency of 1330 kHz would be $Z_t=-j397.557Ω$. This equivalent impedance appears as a net capacitance of about 301 pF in series between the bottom of the coil 709 and the ground stake (or grounding system) 715. Since the reactive components of $Z_{tuning}$ and $Z_{in}$ are essentially conjugates (at this frequency they differ by less than 0.68%), a standing wave resonance relative to the perfectly conducting complex image plane 809 (FIG. 9C) has been satisfied for the guided surface waveguide probe 300c and 300d. Small differences can be adjusted for by, e.g., raising or lowering the charge terminal $T_1$ or by adjusting the capacitor 736 of the lumped element tank circuit 730.

Figure 12B:
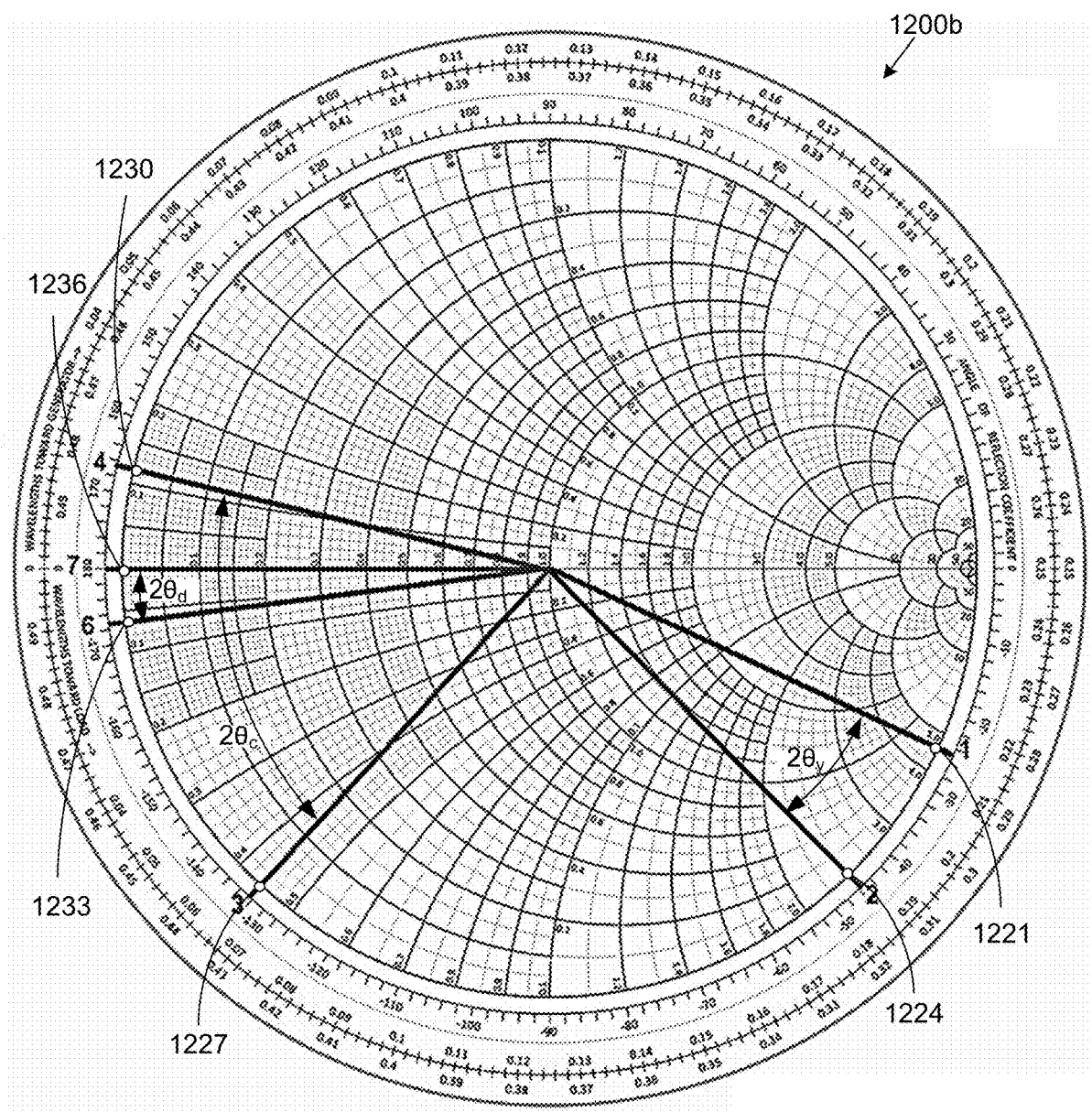
FIG. 12B is a Smith chart illustrating an example of adjusting the probe impedance via a lumped element tank circuit of the guided surface waveguide probe of FIGS. 7B and 7C according to various embodiments of the present disclosure.

Referring to FIG. 12B, shown is a Smith chart 1200b that graphically illustrates an example of the effect of the discontinuous phase jumps on the impedance ($Z_{ip}$) seen "looking up" into the equivalent image plane model of FIG. 9C as described above. The phase shift due to the load impedance $Z_L$ at the charge terminal $T_1$ is initially shown at point 1221. Because of the transition between the charge terminal and the vertical feed line conductor, the actual load impedance $Z_L$ is normalized with respect to the characteristic impedance ($Z_w$) of the vertical feed line conductor, and then transferred along the vertical feed line section by an electrical distance of $\theta_y=\beta_w h_w \approx \beta_w h_p$ (which is clockwise through an angle of $2\theta_y$ on the Smith chart 1200b) to point 1224 ($Z_2/Z_w$). The impedance at point 1224 is now converted to the actual impedance ($Z_2$) seen "looking up" into the vertical feed line conductor using Z.

Next, because of the transition between the vertical feed line conductor and the helical coil, the impedance $Z_2$ is then normalized with respect to the characteristic impedance ($Z_r$) of the helical coil. This normalized impedance can now be entered on the Smith chart 1200b at point 1227 ($Z_2/Z_c$) and transferred along the helical coil transmission line section by an electrical distance $\theta_c=\beta_p H$, (which is clockwise through an angle equal to $2\theta_c$ on the Smith chart 1200b) to point 1230 ($Z_{base}/Z_c$). The jump between point 1224 and point 1227 is a result of the discontinuity in the impedance ratios. The impedance looking into the base of the coil at point 1230 is then converted to the actual impedance ($Z_{base}$) seen "looking up" into the base of the coil (or the guided surface wave probe 300) using $Z_c$. As can been seen in the Smith chart 1200b, a negative reactance is needed to bring the guided surface waveguide probe back into resonance with respect to the complex image plane.

The impedance is provided by the lumped element tank circuit which is added to the coil impedance, and the impedance $Z_{tuning}$ seen at the base of the tank circuit is then normalized with respect to the characteristic impedance ($Z_0$). This impedance can now be entered on the Smith chart 1200b at point 1233 ($Z_{tuning}/Z_o$) and transferred along the subsurface image transmission line section by an electrical distance $\theta_d=\beta_o d/2$ (which is clockwise through an angle equal to $2\theta_d$ on the Smith chart 1200b) to point 1236 ($Z_{ip}/Z_o$). The impedance looking into the subsurface image transmission line at point 1236 is now converted to an actual impedance ($Z_{ip}$) using $Z_o$. When this system is resonated, the impedance at point 1236 is $Z_{ip}=R_{ip}+j0$. The lumped element tank circuit 730 supplements that reactance at the base of the coil 709 brings the guided surface waveguide probe 300 into standing wave resonance relative to the complex image plane 809. Being a lumped element circuit, the tank circuit 730 introduces a phase shift between the voltage and current, but does not introduce a spatial phase delay for traveling wave propagation. This has the effect of elevating the Vmax position to the top of the guided surface waveguide probe 300, thus producing a maximum charge at the charging terminal $T_1$, which maximized the electric field and thus coupling into the guided surface waveguide mode.

In the next example, consider the guided surface waveguide probe 300e shown in FIG. 7D comprising a top-loaded vertical stub of physical height $h_p$ with a charge terminal $T_1$ at the top and a lumped element tank circuit 730 connected at the base, where the charge terminal $T_1$ is excited through a pair of helical coils 709a and 709b and a vertical feed line conductor 718 at an operational frequency ($f_o$) of 10 kHz. The excitation source 312 can be coupled to the guided surface waveguide probe 300 in a variety of ways (e.g., tapped coil, link coupled, etc.). As shown in FIG. 7D, the excitation source 312 can be coupled through the lower coil 709b.

With the lossy conducting medium 303 (i.e., earth) having a relative permittivity of $\varepsilon_r=15$ and a conductivity of $\sigma_1=0.0005$ mhos/m, the complex index of refraction from Equation (41) and the complex Brewster angle from Equation (42) can be found. As in the previous examples, angle of the wave tilt value (W) can be determined to be $\Psi=44.522°$ using Equation (67). In this case, a charge terminal height of $H_1=138.75$ feet can be chosen to reduce the bound capacitance and permit a greater percentage of free charge on the charge terminal $T_1$, thereby providing greater field strength and excitation of the traveling wave.

For a vertical feed line conductor 718 with a diameter of 1 inch and a length of about 50 feet, the velocity factor can be given as $V_w \approx 0.93$. Using Equation (49), the phase delay of the 50 foot conductor is given as $\theta_y=0.197°$. The vertical feed line conductor 718 plus a long thin coil 709a with very large characteristic impedance is used to provide a large voltage step-up, and a shorter fat coil 709b is used to obtain a good match to the impedance looking downward at the base by providing a larger phase delay.

The upper helical coil 709a has a conductor diameter of 0.162 inches (#6 copper wire), a coil diameter (D) of 36 inches and a turn-to-turn spacing (s) of 0.3 inches, the velocity factor for the coil can be determined using Equation (45) as $V_{fa}=7.577 \times 10^{-3}$. With an axial length of the solenoidal helix (H) of 903 inches (75.25 feet), which corresponds to a coil with 3010 turns (N=H/s), Equation (46) gives $\theta_{ca}=36.325°$.

The lower helical coil 709b has a conductor diameter of 0.162 inches (#6 copper wire), a coil diameter (D) of 162 inches (13.5 feet) and a turn-to-turn spacing (s) of one inch, the velocity factor for the coil can be determined to be $V_{fb}=3.575 \times 10^{-3}$. With an axial length of the solenoidal helix (H) of 108 inches (9 feet), which corresponds to a coil with 108 turns (N=H/s), Equation (46) gives $\theta_{cb}=9.208°$.

In this case, the phase delay for this combination of elements is $\Phi=\theta_{ca}+\theta_{cb}+\theta_y=0.197°+36.325°+9.208°=45.73°$. While this phase delay may be sufficiently close to couple into the guided surface wave mode, the lower helical coil 709b can be adjusted (e.g., turns and coil length) to match the wave tilt angle. With the traveling wave phase delay of the coil and vertical feed line conductor adjusted to match the wave tilt angle ($\Phi=\theta_c a+\theta_{cb}+\theta_y=\Psi$), the impedance ($Z_t$) of the tank circuit 730 can be adjusted for standing wave resonance of the equivalent image plane model of the guided surface wave probe 300e. From the measured permittivity, conductivity and permeability of the earth, the radial propagation constant can be determined using Equation (57) as $\gamma_e=0.004406+j\,0.0044801\,m^{-1}$. And the complex depth of the conducting image ground plane can be approximated from Equation (52) as $d\approx 2/\gamma_e=223.050-j\,227.055$ meters, with a corresponding phase shift between the conducting image ground plane and the physical boundary of the earth given by $\theta_d=\beta_o(d/2)=8.963-j\,1.362°$. Using Equation (65), the impedance seen "looking down" into the lossy conducting medium 303 (i.e., earth) can be determined as:

$$Z_{in}=Z_o\tan h(j\theta_d)=R_{in}+jX_{in}=8.963+j8.798\text{ ohms.} \quad (91)$$

By matching the reactive component ($X_{in}$) seen "looking down" into the lossy conducting medium 303 with the reactive component ($X_{tuning}$) seen "looking up" into the lumped element tank circuit 730 of the guided surface wave probe 300e, the coupling into the guided surface waveguide mode may be maximized. This can be accomplished by adjusting the capacitance 736 (or the inductance 733) of the tank circuit 730 without changing the traveling wave phase delays of the coil and vertical feed line conductor. With a charge terminal capacitance ($C_T$) to 450 pF, the load impedance from Equation (62) is $Z_L=-j35,367.675\Omega$. Using Equation (51), the impedance of the vertical feed line conductor (e.g., a copper pipe having a diameter (2a) of 1 inch) is given as $Z_w=j771.972\Omega$, and the impedance seen "looking up" into the vertical feed line conductor is given by Equation (63) as:

$$Z_2=Z_W\frac{Z_L+Z_w\tanh(j\theta_y)}{Z_w+Z_L\tanh(j\theta_y)}=j30.56\text{ k}\Omega. \quad (92)$$

Using Equation (47), the characteristic impedance of the upper helical coil 709a is given as $Z_{Ca}=j35.55\text{ k}\Omega$, and of the lower helical coil 709b is given as $Z_{Cb}=j16.54\text{ k}\Omega$, and the impedances seen "looking up" into the upper coil 709a and the base of the lower coil 709b are given by Equations (64.1) and (64.2) as:

$$Z_{coil}=Z_{ca}\frac{Z_2+Z_{ca}\tanh(j\theta_{ca})}{Z_{ca}+Z_2\tanh(j\theta_{ca})}=-j2711\text{ ohms,} \quad (93.1)$$

$$Z_{base}=Z_{cb}\frac{Z_{coil}+Z_{cb}\tanh(j\theta_{cb})}{Z_{cb}+Z_{coil}\tanh(j\theta_cb)}=-j29.072\text{ ohms.} \quad (93.2)$$

The self-resonant frequency of the lumped element tank circuit can now be adjusted so that the reactive components "looking up" into the tank circuit 730 of the guided surface wave 300 and "looking down" into the lossy conducting medium 303 are opposite and approximately equal, and thus are conjugates of each other. As seen from Equation (91), the reactive component of $Z_{in}$ is $X_{in}=j\,8.798$ f Thus, by adjusting the impedance of the tank circuit 730 so that the impedance seen "looking up" is $X_{tuning}=-j\,8.798\Omega$, the impedance ($Z_{ip}$) seen "looking up" into the equivalent image plane model of FIG. 9C from the perfectly conducting image ground plane is only resistive or $Z_{ip}=R+j0$.

The values of the lumped element tank circuit 730 can be identified using Equations (66) and (68). Consider an inductor 733 having an inductance of $L_p=322\,\mu H$ and a capacitor 736 with a capacitance of $C_p=1600$ pF, then the lumped element tank circuit 730 would have a self-resonant frequency of 221.7 kHz. Using Equation (68), the terminal point impedance at an operating frequency of 1330 kHz would be $Z_t=j20.273$ f From Equation (66), the impedance seen "looking up" into the lumped element tank circuit 730 is $Z_{tuning}=Z_{base}-Z_t=-j\,29.072+j\,20.273=-j8.799\Omega$. Since the reactive components of $Z_{tuning}$ and $Z_{in}$ are essentially conjugates, a standing wave resonance relative to the perfectly conducting complex image plane 809 has been satisfied for the guided surface waveguide probe 300e. Small differences can be adjusted for by, e.g., raising or lowering the charge terminal $T_1$ or by adjusting the capacitor 736 of the lumped element tank circuit 730.

Figure 12C:
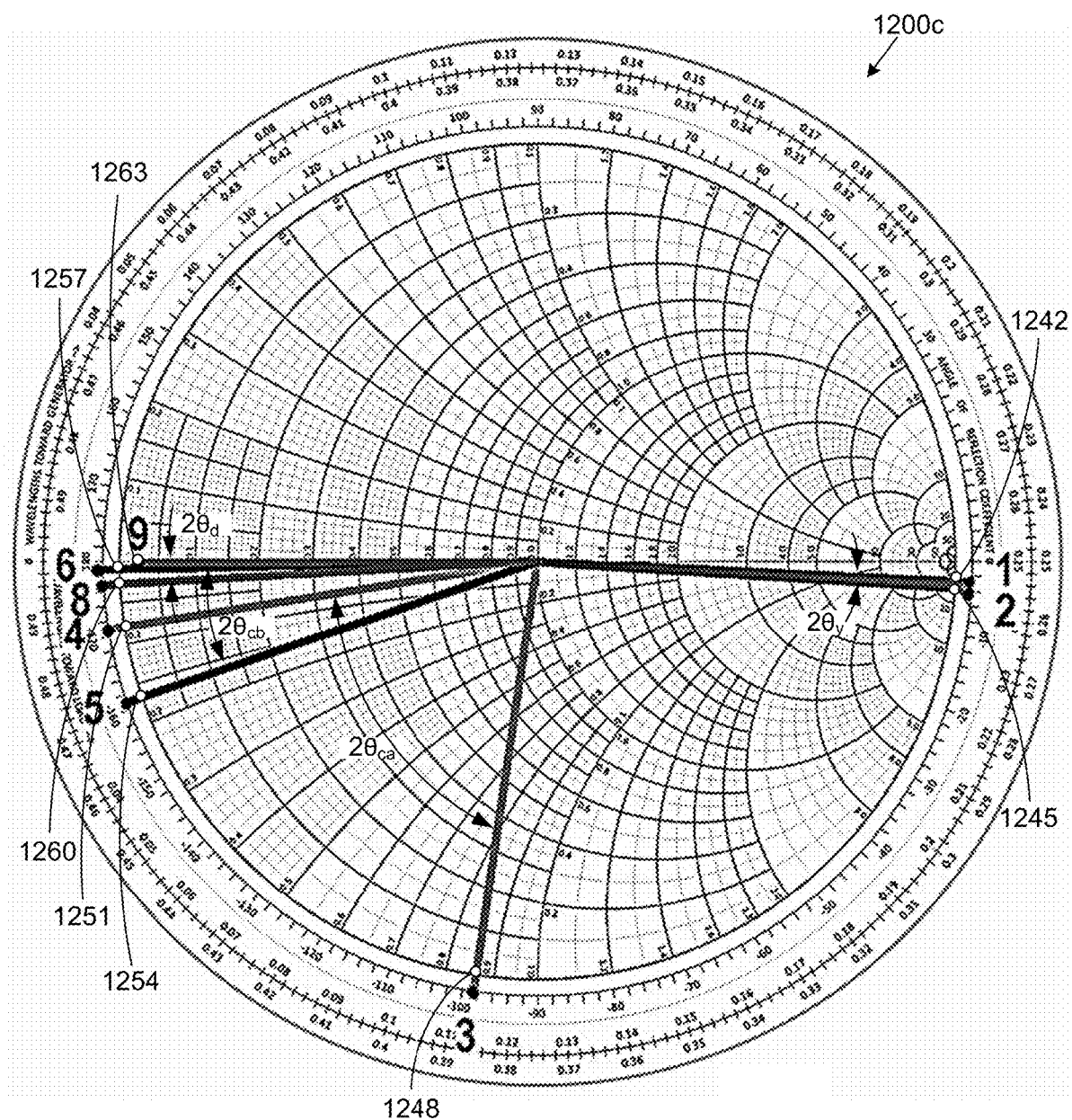
FIG. 12C is a Smith chart illustrating an example of adjusting the probe impedance via a lumped element tank circuit of the guided surface waveguide probe of FIG. 7D according to various embodiments of the present disclosure.

Referring to FIG. 12C, shown is a Smith chart 1200c that graphically illustrates an example of the effect of the discontinuous phase jumps on the impedance ($Z_{ip}$) seen "looking up" into the equivalent image plane model of the guided surface waveguide probe 300e (FIG. 7D) as described above. The phase shift due to the load impedance $Z_L$ at the charge terminal $T_1$ is initially shown at point 1242. Because of the transition between the charge terminal and the vertical feed line conductor, the actual load impedance $Z_L$ is normalized with respect to the characteristic impedance ($Z_w$) of the vertical feed line conductor, and then transferred along the vertical feed line section by an electrical distance of $\theta_y=\beta_w h_w$ (which is clockwise through an angle of $2\theta_y$ on the Smith chart 1200c) to point 1245 ($Z_2/Z_w$). The impedance at point 1245 is now converted to the actual impedance ($Z_2$) seen "looking up" into the vertical feed line conductor using $Z_w$.

Next, because of the transition between the vertical feed line conductor and the helical coil, the impedance $Z_2$ is then normalized with respect to the characteristic impedance ($Z_{ca}$) of the upper helical coil 709a (FIG. 7D). This normalized impedance can now be entered on the Smith chart 1200c at point 1248 ($Z_2/Z_{ca}$) and transferred along the helical coil transmission line section by an electrical distance $\theta_{ca}=\beta_p H_a$, (which is clockwise through an angle equal to $2\theta_{ca}$ on the Smith chart 1200c) to point 1251 ($Z_{coil}/Z_{ca}$). The impedance $Z_{coil}$ is then normalized with respect to the characteristic impedance ($Z_{cb}$) of the lower helical coil 709b (FIG. 7D) and entered on the Smith chart 1200c at point 1254 ($Z_{coil}/Z_{cb}$) and transferred along the helical coil transmission line section by an electrical distance $\theta_{cb}=\beta_p H_b$, (which is clockwise through an angle equal to $2\theta_b$ on the Smith chart 1200c) to point 1257 ($Z_{base}/Z_{cb}$). The jumps between points 1245 and 1248 and points 1251 and 1254 is a result of the discontinuities in the impedance ratios. The impedance looking into the base of the coil at point 1230 is then converted to the actual impedance ($Z_{base}$) seen "looking up" into the base of the coil (or the guided surface wave probe 300) using $Z_{cb}$. As can been seen in the Smith chart 1200c, a positive reactance is needed to bring the guided surface waveguide probe back into resonance with respect to the complex image plane.

The impedance is provided by the lumped element tank circuit which is added to the coil impedance, and the impedance $Z_{tuning}$ seen at the base of the tank circuit is then normalized with respect to the characteristic impedance ($Z_0$). This impedance can now be entered on the Smith chart 1200c at point 1260 ($Z_{tuning}/Z_o$), and transferred along the subsurface image transmission line section by an electrical distance $\theta_d=\beta_o d/2$ (which is clockwise through an angle equal to $2\theta_d$ on the Smith chart 1200c) to point 1263 ($Z_{ip}/Z_o$). The impedance looking into the subsurface image transmission line at point 1263 is now converted to an actual impedance ($Z_{ip}$) using $Z_o$. The lumped element tank circuit 730 supplements that reactance at the base of the coils 709 and brings the guided surface waveguide probe 300 into standing wave resonance relative to the complex image plane 809. The impedance at point 1236 is $Z_{ip}=R_{ip}+j\,0=8.598+j\,0.0048$, which substantially maximizes the electric field and thus coupling into the guided surface waveguide mode.

Field strength measurements were carried out to verify the ability of the guided surface waveguide probe 300b (FIG. 7A) to couple into a guided surface wave or a transmission line mode. A 70 pF circular plate capacitor was elevated to a height of 16 feet (4.88 meters) and charged to 30 volts (peak-to-peak) at a frequency of $f_o=1.85$ MHz ($\lambda_0=162.162$ meters) over soil with constitutive parameters, measured at $f_o$, with a relative permittivity of $\varepsilon_r=15$ and a conductivity of $\sigma_1=0.010$ mhos/m. The measured data (documented with a NIST-traceable field strength meter) is tabulated below in TABLE 1.

TABLE 1

| Range (miles) | Measured FS w/FIM-41 (μV/m) | Predicted FS (μV/m) | Percent Difference |
|---|---|---|---|
| 0.6 | 3400 | 3415 | −0.44% |
| 2 | 1300 | 1296 | +0.31% |
| 3 | 840 | 814 | +3.19% |
| 4 | 560 | 542 | +3.32% |
| 5 | 380 | 373 | +1.88% |
| 6 | 270 | 262 | +3.05% |
| 7 | 190 | 187 | +1.60% |
| 8 | 140 | 134 | +4.48% |
| 9 | 100 | 97 | +3.09% |
| 10 | 70 | 71 | −1.41% |

Figure 13:
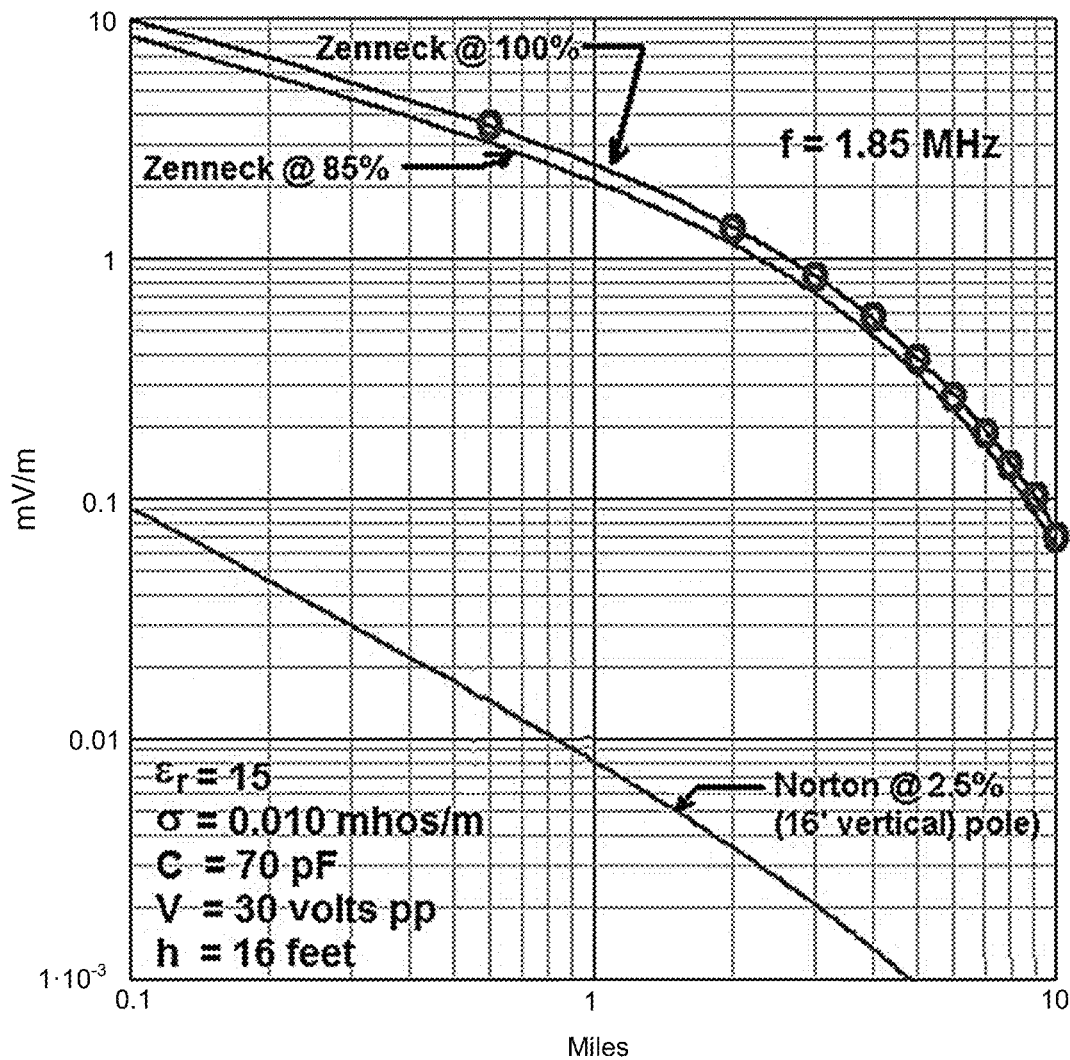
FIG. 13 is a plot comparing measured and theoretical field strength of the guided surface waveguide probe of FIGS. 3 and 7A according to an embodiment of the present disclosure.

Referring to FIG. 13, shown is the measured field strength in mV/m (circles) vs. range (in miles) with respect to the theoretical Zenneck surface wave field strengths for 100% and 85% electric charge, as well as the conventional Norton radiated groundwave predicted for a 16 foot top-loaded vertical mast (monopole at 2.5% radiation efficiency). The quantity h corresponds to the height of the vertical conducting mast for Norton ground wave radiation with a 55 ohm ground stake (or grounding system). The predicted Zenneck fields were calculated from Equation (3), and the standard Norton ground wave was calculated by conventional means. A statistical analysis gave a minimized RMS deviation between the measured and theoretical fields for an electrical efficiency of 97.4%.

When the electric fields produced by a guided surface waveguide probe 300 (FIG. 3) are established by matching the traveling wave phase delay of the feed network to the wave tilt angle and the probe structure is resonated with respect to the perfectly conducting image ground plane at complex depth $z=-d/2$, the fields are substantially mode-matched to a guided surface waveguide mode on the surface of the lossy conducting medium, a guided surface traveling wave is launched along the surface of the lossy conducting medium. As illustrated in FIG. 1, the guided field strength curve 103 of the guided electromagnetic field has a characteristic exponential decay of $e^{-\alpha d}/\sqrt{d}$ and exhibits a distinctive knee 109 on the log-log scale.

In summary, both analytically and experimentally, the traveling wave component on the structure of the guided surface waveguide probe 300 has a phase delay ($\Phi$) at its upper terminal that matches the angle ($\Psi$) of the wave tilt of the surface traveling wave ($\Phi=\Psi$). Under this condition, the surface waveguide may be considered to be "mode-matched". Furthermore, the resonant standing wave component on the structure of the guided surface waveguide probe 300 has a $V_{MAX}$ at the charge terminal $T_1$ and a $V_{MIN}$ down at the image plane 809 (FIG. 8) where $Z_{ip}=R_{ip}+j\,0$ at a complex depth of $z=-d/2$, not at the connection at the physical boundary 806 of the lossy conducting medium 303 (FIG. 8). Lastly, the charge terminal $T_1$ is of sufficient height $H_1$ of FIG. 3 ($h \geq R_x \tan \psi_{i,B}$) so that electromagnetic waves incident onto the lossy conducting medium 303 at the complex Brewster angle do so out at a distance ($\geq R_x$) where the $1/\sqrt{r}$ term is predominant. Receive circuits can be utilized with one or more guided surface waveguide probes to facilitate wireless transmission and/or power delivery systems.

Figure 14A:
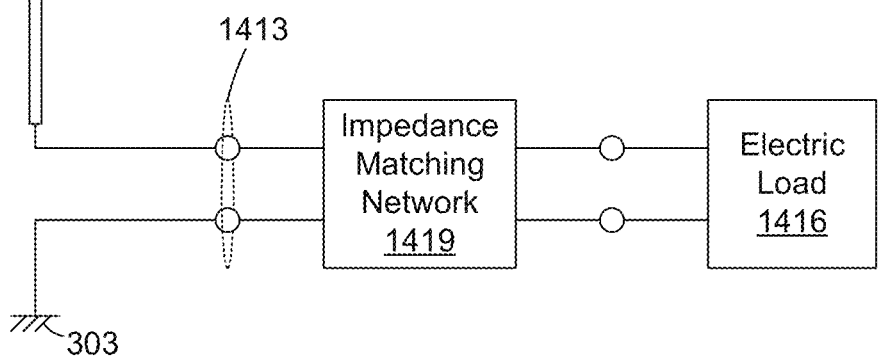
FIGS. 14A through 14C depict examples of receiving structures that can be employed to receive energy transmitted in the form of a guided surface wave launched by a guided surface waveguide probe according to the various embodiments of the present disclosure.
Figure 14B:
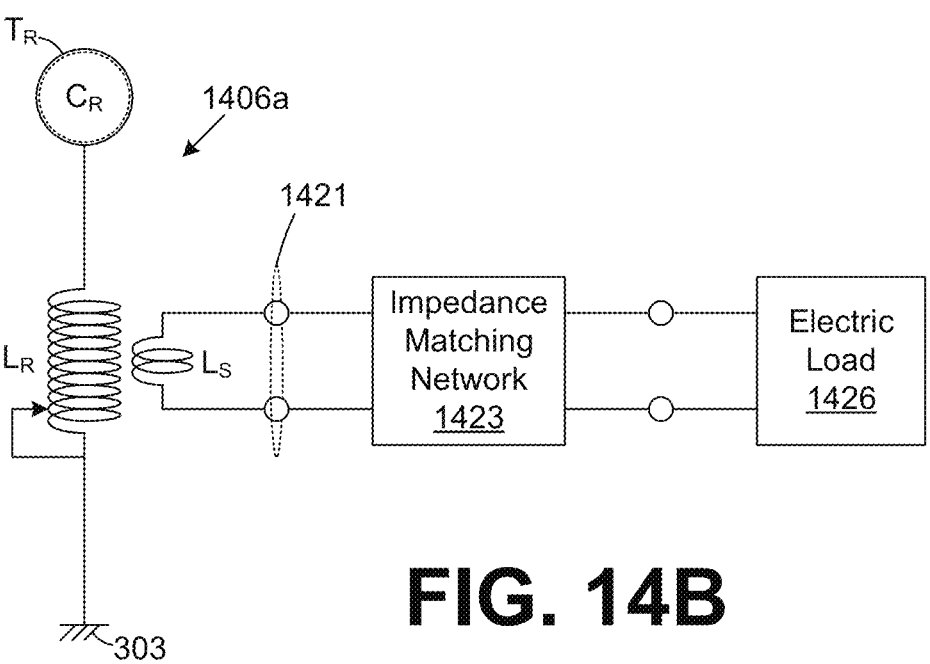
Figure 14C:
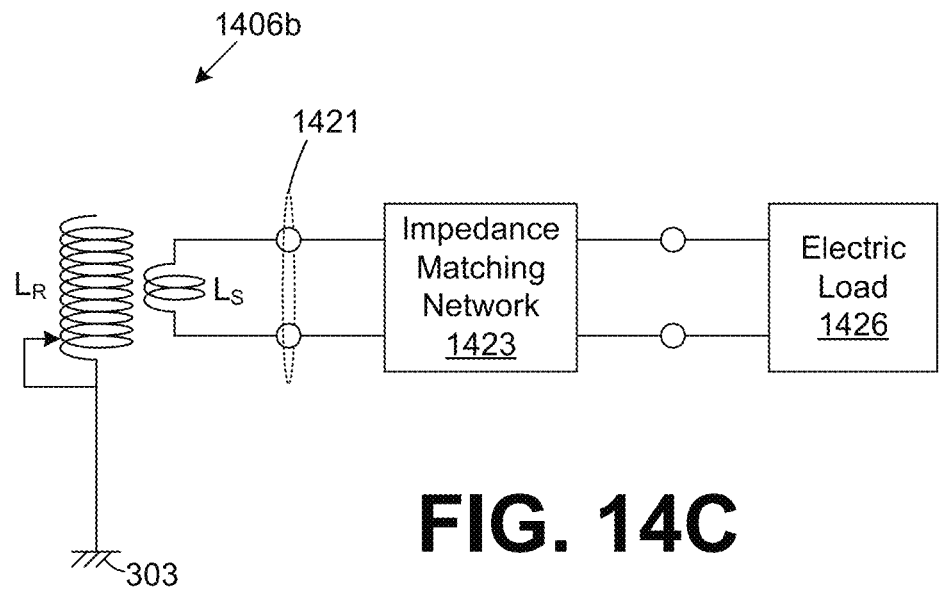
Figure 15:
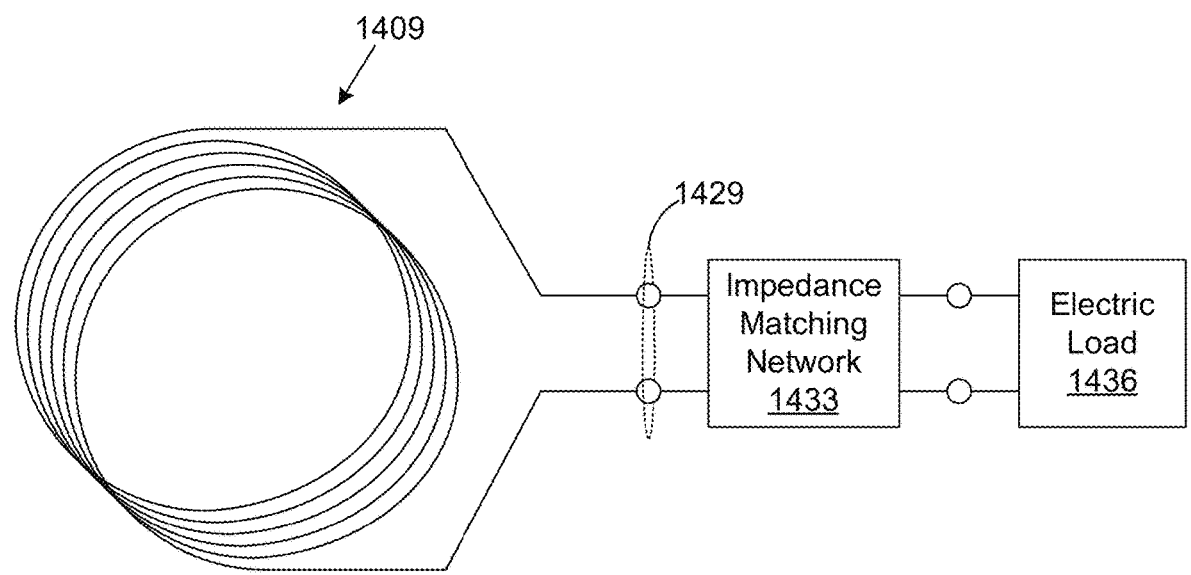
FIG. 15 depicts an example of an additional receiving structure that can be employed to receive energy transmitted in the form of a guided surface wave launched by a guided surface waveguide probe according to the various embodiments of the present disclosure.

Referring next to FIGS. 14A, 14B, 14C and 15, shown are examples of generalized receive circuits for using the surface-guided waves in wireless power delivery systems. FIGS. 14A and 14B-14C include a linear probe 1403 and a tuned resonator 1406, respectively. FIG. 15 is a magnetic coil 1409 according to various embodiments of the present disclosure. According to various embodiments, each one of the linear probe 1403, the tuned resonator 1406, and the magnetic coil 1409 may be employed to receive power transmitted in the form of a guided surface wave on the surface of a lossy conducting medium 303 (FIG. 3) according to various embodiments. As mentioned above, in one embodiment the lossy conducting medium 303 comprises a terrestrial medium (or earth).

With specific reference to FIG. 14A, the open-circuit terminal voltage at the output terminals 1413 of the linear probe 1403 depends upon the effective height of the linear probe 1403. To this end, the terminal point voltage may be calculated as $$V_T = \int_0^{h_e} E_{inc} \cdot dl, \tag{94}$$

where $E_{inc}$ is the strength of the incident electric field induced on the linear probe 1403 in Volts per meter, dl is an element of integration along the direction of the linear probe 1403, and $h_e$ is the effective height of the linear probe 1403. An electrical load 1416 is coupled to the output terminals 1413 through an impedance matching network 1419.

When the linear probe 1403 is subjected to a guided surface wave as described above, a voltage is developed across the output terminals 1413 that may be applied to the electrical load 1416 through a conjugate impedance matching network 1419 as the case may be. In order to facilitate the flow of power to the electrical load 1416, the electrical load 1416 should be substantially impedance matched to the linear probe 1403 as will be described below.

Referring to FIG. 14B, a ground current excited coil 1406a possessing a phase delay equal to the wave tilt of the guided surface wave includes a charge terminal $T_R$ that is elevated (or suspended) above the lossy conducting medium 303. The charge terminal $T_R$ has a self-capacitance $C_R$. In addition, there may also be a bound capacitance (not shown) between the charge terminal $T_R$ and the lossy conducting medium 303 depending on the height of the charge terminal $T_R$ above the lossy conducting medium 303. The bound capacitance should preferably be minimized as much as is practicable, although this may not be entirely necessary in every instance of a guided surface waveguide probe 300.

The tuned resonator 1406a also includes a receiver network comprising a coil $L_R$ having a phase delay $\Phi$. One end of the coil $L_R$ is coupled to the charge terminal $T_R$, and the other end of the coil $L_R$ is coupled to the lossy conducting medium 303. The receiver network can include a vertical supply line conductor that couples the coil $L_R$ to the charge terminal $T_R$. To this end, the coil 1406a (which may also be referred to as tuned resonator $L_R$-$C_R$) comprises a series-adjusted resonator as the charge terminal $C_R$ and the coil $L_R$ are situated in series. The phase delay of the coil 1406a can be adjusted by changing the size and/or height of the charge terminal $T_R$, and/or adjusting the size of the coil $L_R$ so that the phase delay $\Phi$ of the structure is made substantially equal to the angle of the wave tilt $\Psi$. The phase delay of the vertical supply line can also be adjusted by, e.g., changing length of the conductor.

For example, the reactance presented by the self-capacitance $C_R$ is calculated as $1/j\omega C_R$. Note that the total capacitance of the structure 1406a may also include capacitance between the charge terminal $T_R$ and the lossy conducting medium 303, where the total capacitance of the structure 1406a may be calculated from both the self-capacitance $C_R$ and any bound capacitance as can be appreciated. According to one embodiment, the charge terminal $T_R$ may be raised to a height so as to substantially reduce or eliminate any bound capacitance. The existence of a bound capacitance may be determined from capacitance measurements between the charge terminal $T_R$ and the lossy conducting medium 303 as previously discussed.

The inductive reactance presented by a discrete-element coil $L_R$ may be calculated as $j\omega L$, where L is the lumped-element inductance of the coil $L_R$. If the coil $L_R$ is a distributed element, its equivalent terminal-point inductive reactance may be determined by conventional approaches. To tune the structure 1406a, one would make adjustments so that the phase delay is equal to the wave tilt for the purpose of mode-matching to the surface waveguide at the frequency of operation. Under this condition, the receiving structure may be considered to be "mode-matched" with the surface waveguide. A transformer link around the structure and/or an impedance matching network 1423 may be inserted between the probe and the electrical load 1426 in order to couple power to the load. Inserting the impedance matching network 1423 between the probe terminals 1421 and the electrical load 1426 can effect a conjugate-match condition for maximum power transfer to the electrical load 1426.

When placed in the presence of surface currents at the operating frequencies power will be delivered from the surface guided wave to the electrical load 1426. To this end, an electrical load 1426 may be coupled to the structure 1406a by way of magnetic coupling, capacitive coupling, or conductive (direct tap) coupling. The elements of the coupling network may be lumped components or distributed elements as can be appreciated.

In the embodiment shown in FIG. 14B, magnetic coupling is employed where a coil $L_s$ is positioned as a secondary relative to the coil $L_R$ that acts as a transformer primary. The coil $L_s$ may be link-coupled to the coil $L_R$ by geometrically winding it around the same core structure and adjusting the coupled magnetic flux as can be appreciated. In addition, while the receiving structure 1406a comprises a series-tuned resonator, a parallel-tuned resonator or even a distributed-element resonator of the appropriate phase delay may also be used.

While a receiving structure immersed in an electromagnetic field may couple energy from the field, it can be appreciated that polarization-matched structures work best by maximizing the coupling, and conventional rules for probe-coupling to waveguide modes should be observed. For example, a $TE_{20}$ (transverse electric mode) waveguide probe may be optimal for extracting energy from a conventional waveguide excited in the $TE_{20}$ mode. Similarly, in these cases, a mode-matched and phase-matched receiving structure can be optimized for coupling power from a surface-guided wave. The guided surface wave excited by a guided surface waveguide probe 300 on the surface of the lossy conducting medium 303 can be considered a waveguide mode of an open waveguide. Excluding waveguide losses, the source energy can be completely recovered. Useful receiving structures may be E-field coupled, H-field coupled, or surface-current excited.

The receiving structure can be adjusted to increase or maximize coupling with the guided surface wave based upon the local characteristics of the lossy conducting medium 303 in the vicinity of the receiving structure. To accomplish this, the phase delay ($\Phi$) of the receiving structure can be adjusted to match the angle ($\Psi$) of the wave tilt of the surface traveling wave at the receiving structure. If configured appropriately, the receiving structure may then be tuned for resonance with respect to the perfectly conducting image ground plane at complex depth $z=-d/2$.

For example, consider a receiving structure comprising the tuned resonator 1406a of FIG. 14B, including a coil $L_R$ and a vertical supply line connected between the coil $L_R$ and a charge terminal $T_R$. With the charge terminal $T_R$ positioned at a defined height above the lossy conducting medium 303, the total phase delay $\Phi$ of the coil $L_R$ and vertical supply line can be matched with the angle ($\Psi$) of the wave tilt at the location of the tuned resonator 1406a. From Equation (22), it can be seen that the wave tilt asymptotically passes to $$W = |W|e^{j\Psi} = \frac{E_\rho}{E_z} \xrightarrow[\rho \to \infty]{} \frac{1}{\sqrt{\varepsilon_r - j\frac{\sigma_1}{\omega\varepsilon_o}}}, \tag{95}$$

where $\varepsilon_r$ comprises the relative permittivity and $\sigma_1$ is the conductivity of the lossy conducting medium 303 at the location of the receiving structure, $\varepsilon_0$ is the permittivity of free space, and $\omega=2\pi f$, where f is the frequency of excitation. Thus, the wave tilt angle ($\Psi$) can be determined from Equation (95).

The total phase delay ($\Phi=\theta_c+\theta_y$) of the tuned resonator 1406a includes both the phase delay ($\theta_c$) through the coil $L_R$ and the phase delay of the vertical supply line ($\theta_y$). The spatial phase delay along the conductor length $l_w$ of the vertical supply line can be given by $\theta_y=\beta_w l_w$, where $\beta_w$ is the propagation phase constant for the vertical supply line conductor. The phase delay due to the coil (or helical delay line) is $\theta_c=\beta_p l_c$, with a physical length of $l_c$ and a propagation factor of $$\beta_p = \frac{2\pi}{\lambda_p} = \frac{2\pi}{V_f \lambda_0}, \tag{96}$$

where $V_f$ is the velocity factor on the structure, $\lambda_0$ is the wavelength at the supplied frequency, and $\lambda_p$ is the propagation wavelength resulting from the velocity factor $V_f$. One or both of the phase delays ($\theta_c+\theta_y$) can be adjusted to match the phase delay $\Phi$ to the angle ($\Psi$) of the wave tilt. For example, a tap position may be adjusted on the coil $L_R$ of FIG. 14B to adjust the coil phase delay ($\theta_c$) to match the total phase delay to the wave tilt angle ($\Phi=\Psi$). For example, a portion of the coil can be bypassed by the tap connection as illustrated in FIG. 14B. The vertical supply line conductor can also be connected to the coil $L_R$ via a tap, whose position on the coil may be adjusted to match the total phase delay to the angle of the wave tilt.

Once the phase delay ($\Phi$) of the tuned resonator 1406a has been adjusted, the impedance of the charge terminal $T_R$ can then be adjusted to tune to resonance with respect to the perfectly conducting image ground plane at complex depth z=−d/2. This can be accomplished by adjusting the capacitance of the charge terminal $T_1$ without changing the traveling wave phase delays of the coil $L_R$ and vertical supply line. In some embodiments, a lumped element tuning circuit can be included between the lossy conducting medium 303 and the coil $L_R$ to allow for resonant tuning of the structure 1406a with respect to the complex image plane as discussed above with respect to the guided surface waveguide structure 300. The adjustments are similar to those described with respect to FIGS. 9A-9C and the Smith charts of FIGS. 12A-12C.

The impedance seen "looking down" into the lossy conducting medium 303 to the complex image plane is given by:

$$Z_{in} = R_{in} + jX_{in} = Z_o \tan h(j\beta_o(d/2)), \quad (97)$$

where $\beta_o = \sqrt{\mu_o \varepsilon_o}$. For vertically polarized sources over the earth, the depth of the complex image plane can be given by:

$$d/2 \approx 1/\sqrt{j\omega\mu_1\sigma_1 - \omega^2\mu_1\varepsilon_1}, \quad (98)$$

where $\mu_1$ is the permeability of the lossy conducting medium 303 and $\varepsilon_1 = \varepsilon_r \varepsilon_o$.

At the base of the tuned resonator 1406a, the impedance seen "looking up" into the receiving structure is $Z_\uparrow = Z_{base}$ as illustrated in FIG. 9A or $Z_\uparrow = Z_{tuning}$ as illustrated in FIG. 9C. With a terminal impedance of:

$$Z_R = \frac{1}{j\omega C_R}, \quad (99)$$

where $C_R$ is the self-capacitance of the charge terminal $T_R$, the impedance seen "looking up" into the vertical supply line conductor of the tuned resonator 1406a is given by:

$$Z_2 = Z_W \frac{Z_R + Z_W \tanh(j\beta_w h_w)}{Z_w + Z_R \tanh(j\beta_w h_w)} = Z_W \frac{Z_R + Z_W \tanh(j\theta_y)}{Z_w + Z_R \tanh(j\theta_y)}, \quad (100)$$

and the impedance seen "looking up" into the coil $L_R$ of the tuned resonator 1406a is given by:

$$Z_{base} = \quad (101)$$
$$R_{base} + jX_{base} = Z_R \frac{Z_2 + Z_R\tanh(j\beta_p H)}{Z_R + Z_2\tanh(j\beta_p H)} = Z_c \frac{Z_2 + Z_R\tanh(j\theta_c)}{Z_R + Z_2\tanh(j\theta_c)}.$$

By matching the reactive component ($X_{in}$) seen "looking down" into the lossy conducting medium 303 with the reactive component ($X_{base}$) seen "looking up" into the tuned resonator 1406a, the coupling into the guided surface waveguide mode may be maximized.

Where a lumped element tank circuit is included at the base of the tuned resonator 1406a, the self-resonant frequency of the tank circuit can be tuned to add positive or negative impedance to bring the structure 1406b into standing wave resonance by matching the reactive component ($X_{in}$) seen "looking down" into the lossy conducting medium 303 with the reactive component ($X_{tuning}$) seen "looking up" into the lumped element tank circuit.

Referring next to FIG. 14C, shown is an example of a tuned resonator 1406b that does not include a charge terminal $T_R$ at the top of the receiving structure. In this embodiment, the tuned resonator 1406b does not include a vertical supply line coupled between the coil $L_R$ and the charge terminal $T_R$. Thus, the total phase delay ($\Phi$) of the tuned resonator 1406b includes only the phase delay ($\theta_c$) through the coil $L_R$. As with the tuned resonator 1406a of FIG. 14B, the coil phase delay $\theta_c$ can be adjusted to match the angle ($\Psi$) of the wave tilt determined from Equation (95), which results in $\Phi=\Psi$. While power extraction is possible with the receiving structure coupled into the surface waveguide mode, it is difficult to adjust the receiving structure to maximize coupling with the guided surface wave without the variable reactive load provided by the charge terminal $T_R$. Including a lumped element tank circuit at the base of the tuned resonator 1406b provides a convenient way to bring the structure 1406b into standing wave resonance with respect to the complex image plane.

Figure 14D:
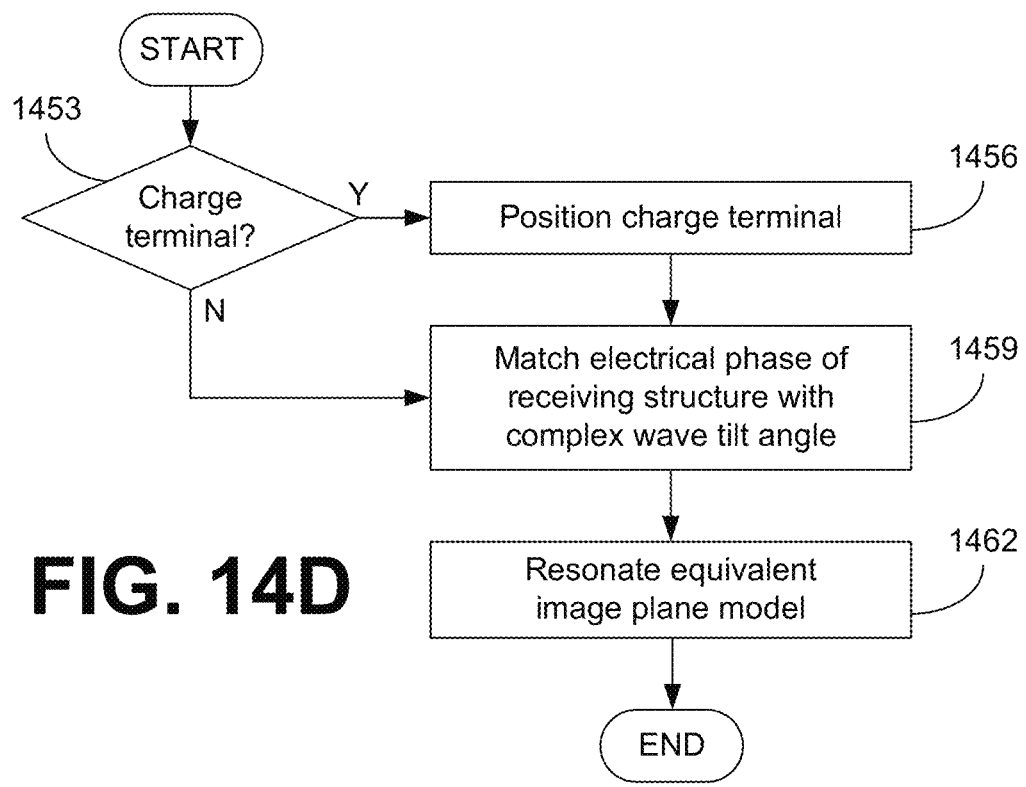
FIG. 14D is a flow chart illustrating an example of adjusting a receiving structure according to various embodiments of the present disclosure.

Referring to FIG. 14D, shown is a flow chart illustrating an example of adjusting a receiving structure to substantially mode-match to a guided surface waveguide mode on the surface of the lossy conducting medium 303. Beginning with 1453, if the receiving structure includes a charge terminal $T_R$ (e.g., of the tuned resonator 1406a of FIG. 14B), then the charge terminal $T_R$ is positioned at a defined height above a lossy conducting medium 303 at 1456. As the surface guided wave has been established by a guided surface waveguide probe 300, the physical height ($h_p$) of the charge terminal $T_R$ height may be below that of the effective height. The physical height may be selected to reduce or minimize the bound charge on the charge terminal $T_R$ (e.g., four times the spherical diameter of the charge terminal). If the receiving structure does not include a charge terminal $T_R$ (e.g., of the tuned resonator 1406b of FIG. 14C), then the flow proceeds to 1459.

At 1459, the electrical phase delay $\Phi$ of the receiving structure is matched to the complex wave tilt angle $\Psi$ defined by the local characteristics of the lossy conducting medium 303. The phase delay ($\theta_c$) of the helical coil and/or the phase delay ($\theta_y$) of the vertical supply line can be adjusted to make $\Phi$ equal to the angle ($\Psi$) of the wave tilt (W). The angle ($\Psi$) of the wave tilt can be determined from Equation (95). The electrical phase $\Phi$ can then be matched to the angle of the wave tilt. For example, the electrical phase delay $\Phi=\theta_c+\theta_y$ can be adjusted by varying the geometrical parameters of the coil $L_R$ and/or the length (or height) of the vertical supply line conductor.

Next at 1462, the resonator impedance can be tuned via the load impedance of the charge terminal $T_R$ and/or the impedance of a lumped element tank circuit to resonate the equivalent image plane model of the tuned resonator 1406. The depth (d/2) of the conducting image ground plane 809 (FIGS. 9A-9C) below the receiving structure can be determined using Equation (98) and the values of the lossy conducting medium 303 (e.g., the earth) at the receiving structure, which can be locally measured. Using that complex depth, the phase shift ($\theta_d$) between the image ground plane 809 and the physical boundary 806 (FIGS. 9A-9C) of the lossy conducting medium 303 can be determined using $\theta_d=\beta_o d/2$. The impedance ($Z_{in}$) as seen "looking down" into the lossy conducting medium 303 can then be determined using Equation (97). This resonance relationship can be considered to maximize coupling with the guided surface waves.

Based upon the adjusted parameters of the coil $L_R$ and the length of the vertical supply line conductor, the velocity factor, phase delay, and impedance of the coil $L_R$ and vertical supply line can be determined. In addition, the self-capacitance ($C_R$) of the charge terminal $T_R$ can be determined using, e.g., Equation (24). The propagation factor ($\beta_p$) of the coil $L_R$ can be determined using Equation (96) and the propagation phase constant ($\beta_w$) for the vertical supply line can be determined using Equation (49). Using the self-capacitance and the determined values of the coil $L_R$ and vertical supply line, the impedance ($Z_{base}$) of the tuned resonator 1406 as seen "looking up" into the coil $L_R$ can be determined using Equations (99), (100), and (101).

The equivalent image plane models of FIGS. 9A-9C also apply to the tuned resonator 1406a of FIG. 14B. The tuned resonator 1406a can be tuned to resonance with respect to the complex image plane by adjusting the load impedance $Z_R$ of the charge terminal $T_R$ such that the reactance component $X_{base}$ of $Z_{base}$ cancels out the reactance component of $X_{in}$ of $Z_{in}$, or $X_{base}+X_{in}=0$. Where the tuned resonator 1406 of FIGS. 14B and 14C includes a lumped element tank circuit, the self-resonant frequency of the parallel circuit can be adjusted such that the reactance component $X_{tuning}$ of $Z_{tuning}$ cancels out the reactance component of $X_{in}$ of $Z_{in}$, or $X_{tuning}+X_{in}=0$. Thus, the impedance at the physical boundary 806 (FIG. 9A) "looking up" into the coil of the tuned resonator 1406 is the conjugate of the impedance at the physical boundary 806 "looking down" into the lossy conducting medium 303. The load impedance $Z_R$ can be adjusted by varying the capacitance ($C_R$) of the charge terminal $T_R$ without changing the electrical phase delay $\Phi=\theta_c+\theta_y$ seen by the charge terminal $T_R$. The impedance of the lumped element tank circuit can be adjusted by varying the self-resonant frequency ($f_p$) as describes with respect to FIG. 9D. An iterative approach may be taken to tune the resonator impedance for resonance of the equivalent image plane model with respect to the conducting image ground plane 809. In this way, the coupling of the electric field to a guided surface waveguide mode along the surface of the lossy conducting medium 303 (e.g., earth) can be improved and/or maximized.

Referring to FIG. 15, the magnetic coil 1409 comprises a receive circuit that is coupled through an impedance matching network 1433 to an electrical load 1436. In order to facilitate reception and/or extraction of electrical power from a guided surface wave, the magnetic coil 1409 may be positioned so that the magnetic flux of the guided surface wave, $H_\varphi$, passes through the magnetic coil 1409, thereby inducing a current in the magnetic coil 1409 and producing a terminal point voltage at its output terminals 1429. The magnetic flux of the guided surface wave coupled to a single turn coil is expressed by $$\mathcal{F} = \iint_{A_{CS}} \mu_r \mu_o \vec{H} \cdot \hat{n} dA \quad (102)$$

where $\mathcal{F}$ is the coupled magnetic flux, $\mu_r$ is the effective relative permeability of the core of the magnetic coil 1409, $\mu_o$ is the permeability of free space, $\vec{H}$ is the incident magnetic field strength vector, $\hat{n}$ is a unit vector normal to the cross-sectional area of the turns, and $A_{CS}$ is the area enclosed by each loop. For an N-turn magnetic coil 1409 oriented for maximum coupling to an incident magnetic field that is uniform over the cross-sectional area of the magnetic coil 1409, the open-circuit induced voltage appearing at the output terminals 1429 of the magnetic coil 1409 is $$V = -N\frac{d\mathcal{F}}{dt} \approx -j\omega\mu_r\mu_0 NHA_{CS}, \quad (103)$$

where the variables are defined above. The magnetic coil 1409 may be tuned to the guided surface wave frequency either as a distributed resonator or with an external capacitor across its output terminals 1429, as the case may be, and then impedance-matched to an external electrical load 1436 through a conjugate impedance matching network 1433.

Assuming that the resulting circuit presented by the magnetic coil 1409 and the electrical load 1436 are properly adjusted and conjugate impedance matched, via impedance matching network 1433, then the current induced in the magnetic coil 1409 may be employed to optimally power the electrical load 1436. The receive circuit presented by the magnetic coil 1409 provides an advantage in that it does not have to be physically connected to the ground.

With reference to FIGS. 14A, 14B, 14C and 15, the receive circuits presented by the linear probe 1403, the mode-matched structure 1406, and the magnetic coil 1409 each facilitate receiving electrical power transmitted from any one of the embodiments of guided surface waveguide probes 300 described above. To this end, the energy received may be used to supply power to an electrical load 1416/1426/1436 via a conjugate matching network as can be appreciated. This contrasts with the signals that may be received in a receiver that were transmitted in the form of a radiated electromagnetic field. Such signals have very low available power and receivers of such signals do not load the transmitters.

It is also characteristic of the present guided surface waves generated using the guided surface waveguide probes 300 described above that the receive circuits presented by the linear probe 1403, the mode-matched structure 1406, and the magnetic coil 1409 will load the excitation source 312 (FIG. 3) that is applied to the guided surface waveguide probe 300, thereby generating the guided surface wave to which such receive circuits are subjected. This reflects the fact that the guided surface wave generated by a given guided surface waveguide probe 300 described above comprises a transmission line mode. By way of contrast, a power source that drives a radiating antenna that generates a radiated electromagnetic wave is not loaded by the receivers, regardless of the number of receivers employed.

Thus, together one or more guided surface waveguide probes 300 and one or more receive circuits in the form of the linear probe 1403, the tuned mode-matched structure 1406, and/or the magnetic coil 1409 can together make up a wireless distribution system. Given that the distance of transmission of a guided surface wave using a guided surface waveguide probe 300 as set forth above depends upon the frequency, it is possible that wireless power distribution can be achieved across wide areas and even globally.

The conventional wireless-power transmission/distribution systems extensively investigated today include "energy harvesting" from radiation fields and also sensor coupling to inductive or reactive near-fields. In contrast, the present wireless-power system does not waste power in the form of radiation which, if not intercepted, is lost forever. Nor is the presently disclosed wireless-power system limited to extremely short ranges as with conventional mutual-reactance coupled near-field systems. The wireless-power system disclosed herein probe-couples to the novel surface-guided transmission line mode, which is equivalent to delivering power to a load by a waveguide or a load directly wired to the distant power generator. Not counting the power required to maintain transmission field strength plus that dissipated in the surface waveguide, which at extremely low frequencies is insignificant relative to the transmission losses in conventional high-tension power lines at 60 Hz, all of the generator power goes only to the desired electrical load. When the electrical load demand is terminated, the source power generation is relatively idle.

Figure 16A:
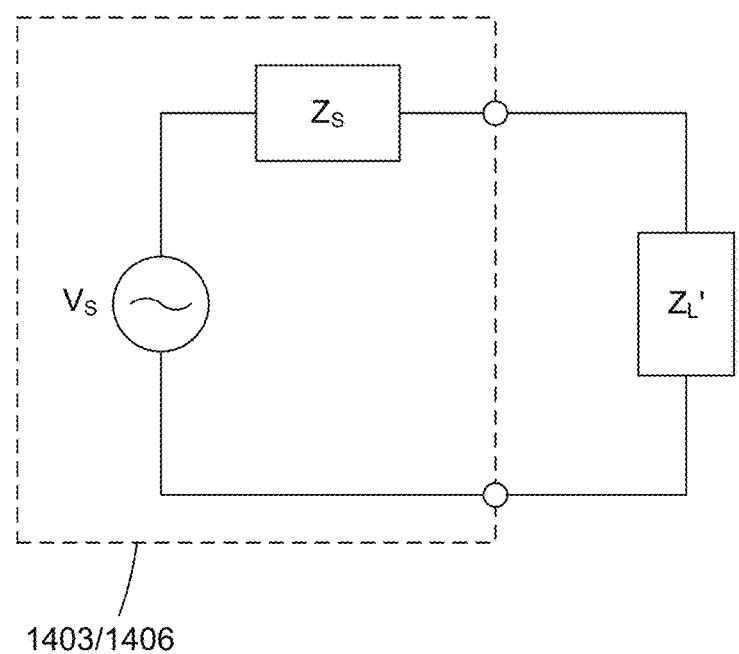
FIG. 16A depicts a schematic diagram representing the Thevenin-equivalent of the receivers depicted in FIGS. 14A and 14B according to an embodiment of the present disclosure.
Figure 16B:
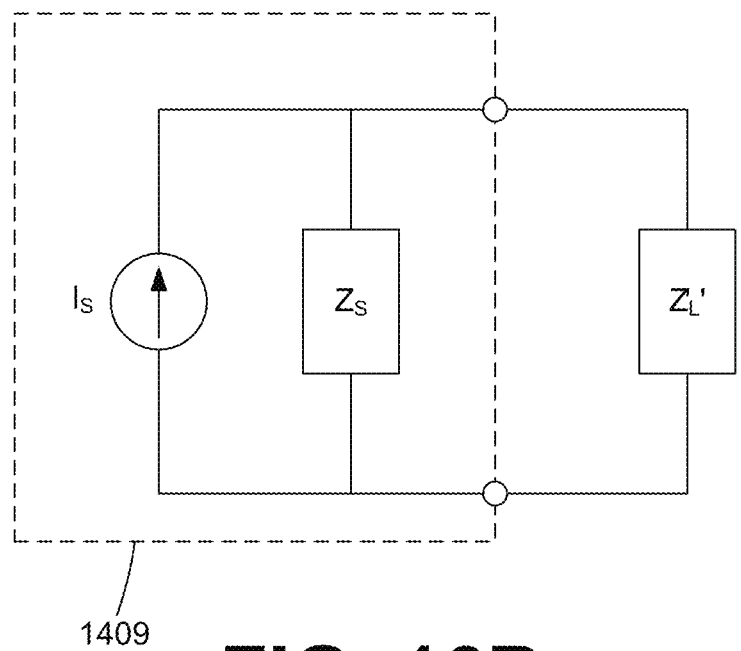
FIG. 16B depicts a schematic diagram representing the Norton-equivalent of the receiver depicted in FIG. 15 according to an embodiment of the present disclosure.

Referring next to FIG. 16A shown is a schematic that represents the linear probe 1403 and the mode-matched structure 1406. FIG. 16B shows a schematic that represents the magnetic coil 1409. The linear probe 1403 and the mode-matched structure 1406 may each be considered a Thevenin equivalent represented by an open-circuit terminal voltage source $V_S$ and a dead network terminal point impedance $Z_S$. The magnetic coil 1409 may be viewed as a Norton equivalent represented by a short-circuit terminal current source $I_S$ and a dead network terminal point impedance $Z_S$. Each electrical load 1416/1426/1436 (FIGS. 14A, 14B and 15) may be represented by a load impedance $Z_L$. The source impedance $Z_S$ comprises both real and imaginary components and takes the form $Z_S=R_S+jX_S$.

According to one embodiment, the electrical load 1416/1426/1436 is impedance matched to each receive circuit, respectively. Specifically, each electrical load 1416/1426/1436 presents through a respective impedance matching network 1419/1423/1433 a load on the probe network specified as $Z_L'$ expressed as $Z_L'=R_L'+j X_L'$, which will be equal to $Z_L'=Z_S^*=R_S-j X_S$, where the presented load impedance $Z_L'$ is the complex conjugate of the actual source impedance $Z_S$. The conjugate match theorem, which states that if, in a cascaded network, a conjugate match occurs at any terminal pair then it will occur at all terminal pairs, then asserts that the actual electrical load 1416/1426/1436 will also see a conjugate match to its impedance, $Z_L'$. See Everitt, W. L. and G. E. Anner, *Communication Engineering*, McGraw-Hill, 3$^{rd}$ edition, 1956, p. 407. This ensures that the respective electrical load 1416/1426/1436 is impedance matched to the respective receive circuit and that maximum power transfer is established to the respective electrical load 1416/1426/1436.

Operation of a guided surface waveguide probe 300 may be controlled to adjust for variations in operational conditions associated with the guided surface waveguide probe 300. For example, an adaptive probe control system 321 (FIG. 3) can be used to control the feed network 309, which can include a lumped element tank circuit 730 (FIGS. 7B-7D), and/or the charge terminal $T_1$ to control the operation of the guided surface waveguide probe 300. Operational conditions can include, but are not limited to, variations in the characteristics of the lossy conducting medium 303 (e.g., conductivity σ and relative permittivity $\varepsilon_r$), variations in field strength and/or variations in loading of the guided surface waveguide probe 300. As can be seen from Equations (31), (41) and (42), the index of refraction (n), the complex Brewster angle ($\theta_{i,B}$), and the wave tilt ($|W|e^{j\Psi}$) can be affected by changes in soil conductivity and permittivity resulting from, e.g., weather conditions.

Equipment such as, e.g., conductivity measurement probes, permittivity sensors, ground parameter meters, field meters, current monitors and/or load receivers can be used to monitor for changes in the operational conditions and provide information about current operational conditions to the adaptive probe control system 321. The probe control system 321 can then make one or more adjustments to the guided surface waveguide probe 300 to maintain specified operational conditions for the guided surface waveguide probe 300. For instance, as the moisture and temperature vary, the conductivity of the soil will also vary. Conductivity measurement probes and/or permittivity sensors may be located at multiple locations around the guided surface waveguide probe 300. Generally, it would be desirable to monitor the conductivity and/or permittivity at or about the Hankel crossover distance $R_x$ for the operational frequency. Conductivity measurement probes and/or permittivity sensors may be located at multiple locations (e.g., in each quadrant) around the guided surface waveguide probe 300.

Figure 17A:
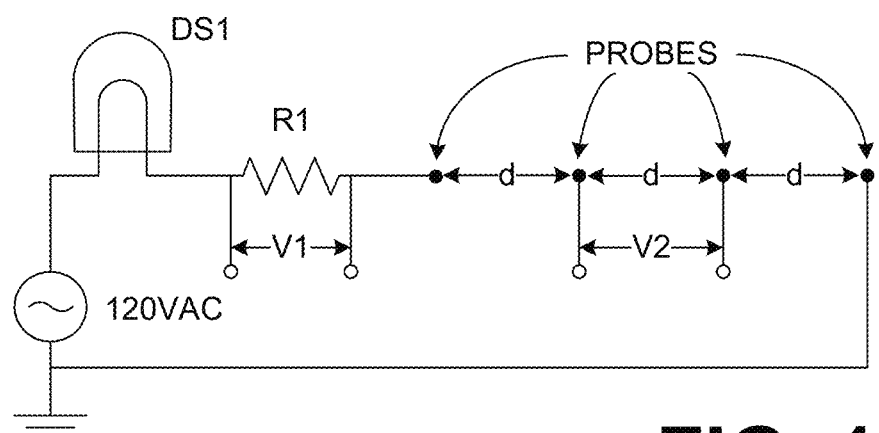
FIGS. 17A and 17B are schematic diagrams representing examples of a conductivity measurement probe and an open wire line probe, respectively, according to an embodiment of the present disclosure.

FIG. 17A shows an example of a conductivity measurement probe that can be installed for monitoring changes in soil conductivity. As shown in FIG. 17A, a series of measurement probes are inserted along a straight line in the soil. For example, the probes may be $^9/_{16}$-inch diameter rods with a penetration depth of 12 inches or more, and spaced apart by d=18 inches. DS1 is a 100 Watt light bulb and R1 is a 5 Watt, 14.6 Ohm resistance. By applying an AC voltage to the circuit and measuring V1 across the resistance and V2 across the center probes, the conductivity can be determined by the weighted ratio of σ=21(V1/V2). The measurements can be filtered to obtain measurements related only to the AC voltage supply frequency. Different configurations using other voltages, frequencies, probe sizes, depths and/or spacing may also be utilized.

Figure 17B:
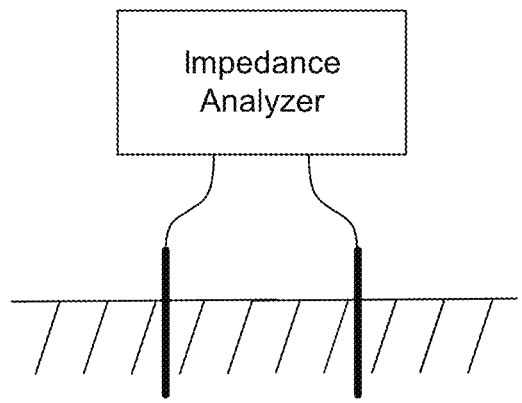

Open wire line probes can also be used to measure conductivity and permittivity of the soil. As illustrated in FIG. 17B, impedance is measured between the tops of two rods inserted into the soil (lossy medium) using, e.g., an impedance analyzer. If an impedance analyzer is utilized, measurements (R+jX) can be made over a range of frequencies and the conductivity and permittivity determined from the frequency dependent measurements using $$\sigma = \frac{8.84}{C_0}\left[\frac{R}{R^2+X^2}\right] \text{ and } \varepsilon_r = \frac{10^6}{2\pi f C_0}\left[\frac{R}{R^2+X^2}\right], \quad (104)$$

where $C_0$ is the capacitance in pF of the probe in air.

The conductivity measurement probes and/or permittivity sensors can be configured to evaluate the conductivity and/or permittivity on a periodic basis and communicate the information to the probe control system 321 (FIG. 3). The information may be communicated to the probe control system 321 through a network such as, but not limited to, a LAN, WLAN, cellular network, or other appropriate wired or wireless communication network. Based upon the monitored conductivity and/or permittivity, the probe control system 321 may evaluate the variation in the index of refraction (n), the complex Brewster angle ($\theta_o$), and/or the wave tilt ($|W|e^{j\Psi}$) and adjust the guided surface waveguide probe 300 to maintain the phase delay)) of the feed network 309 equal to the wave tilt angle (Ψ) and/or maintain resonance of the equivalent image plane model of the guided surface waveguide probe 300. This can be accomplished by adjusting, e.g., $\theta_y$, $\theta_c$ and/or $C_T$. For instance, the probe control system 321 can adjust the self-capacitance of the charge terminal $T_1$ or the phase delay ($\theta_y$, $\theta_c$) applied to the charge terminal $T_1$ to maintain the electrical launching efficiency of the guided surface wave at or near its maximum. The phase applied to the charge terminal $T_1$ can be adjusted by varying the tap position on the coil(s) 709, and/or by including a plurality of predefined taps along the coil(s) 709 and switching between the different predefined tap locations to maximize the launching efficiency.

Field or field strength (FS) meters (e.g., a FIM-41 FS meter, Potomac Instruments, Inc., Silver Spring, Md.) may also be distributed about the guided surface waveguide probe 300 to measure field strength of fields associated with the guided surface wave. The field or FS meters can be configured to detect the field strength and/or changes in the field strength (e.g., electric field strength) and communicate that information to the probe control system 321. The information may be communicated to the probe control system 321 through a network such as, but not limited to, a LAN, WLAN, cellular network, or other appropriate communication network. As the load and/or environmental conditions change or vary during operation, the guided surface waveguide probe 300 may be adjusted to maintain specified field strength(s) at the FS meter locations to ensure appropriate power transmission to the receivers and the loads they supply.

For example, the phase delay ($\Phi=\theta_y+\theta_c$) applied to the charge terminal $T_1$ can be adjusted to match the wave tilt angle ($\Psi$). By adjusting one or both phase delays, the guided surface waveguide probe 300 can be adjusted to ensure the wave tilt corresponds to the complex Brewster angle. This can be accomplished by adjusting, e.g., a tap position on the coil(s) 709 (FIGS. 7A-7D) to change the phase delay supplied to the charge terminal $T_1$. The voltage level supplied to the charge terminal $T_1$ can also be increased or decreased to adjust the electric field strength. This may be accomplished by adjusting the output voltage of the excitation source 312 (FIGS. 3 and 7A-7D) or by adjusting or reconfiguring the feed network 309 (FIG. 3). For instance, the position of the tap 724 (FIGS. 7A and 7B) for the excitation source 312 can be adjusted to increase the voltage seen by the charge terminal $T_1$. Maintaining field strength levels within predefined ranges can improve coupling by the receivers, reduce ground current losses, and avoid interference with transmissions from other guided surface waveguide probes 300.

Figure 18:
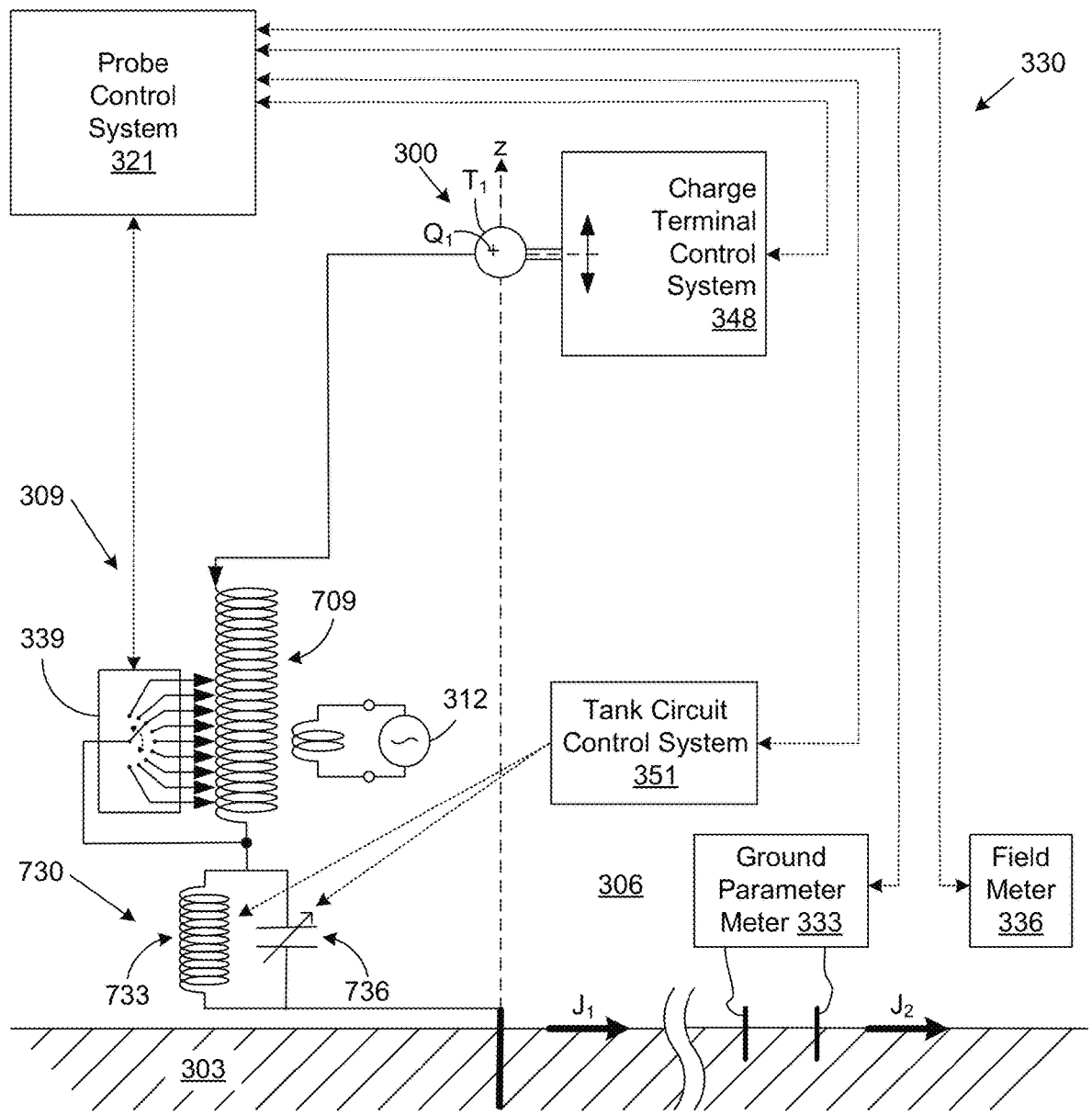
FIG. 18 is a schematic drawing of an example of an adaptive control system employed by the probe control system of FIG. 3 according to various embodiments of the present disclosure.

Referring to FIG. 18, shown is an example of an adaptive control system 330 including the probe control system 321 of FIG. 3, which is configured to adjust the operation of a guided surface waveguide probe 300, based upon monitored conditions. As in FIGS. 3 and 7A-7D, an excitation source 312 such as, e.g., an AC source provides the excitation for the charge terminal $T_1$. The excitation source 312 is coupled to the guided surface waveguide probe 300 through a feed network (309 of FIG. 3) comprising one or more coil(s) 709. The excitation source 312 can be connected across a lower portion of the coil(s) 709 through a tap 724, as shown in FIGS. 7A and 7B, or can be inductively coupled to the coil(s) 709 or an inductor of a lumped element tank circuit 730 by way of a primary coil, as shown in FIGS. 7C and 7D. The coil(s) 709 can be coupled to a ground stake (or grounding system) 715 (FIGS. 7A-7D) at a first end and the charge terminal $T_1$ at a second end. In some implementations, the connection to the charge terminal $T_1$, the connection to the tank circuit 730, and/or the connection between coils 709 can be adjusted using a tap or combination of taps 721 (FIGS. 7A-7D) on the coil(s) 709. An ammeter located between the coil 709 or the tank circuit 730 and ground stake (or grounding system) 715 can be used to provide an indication of the magnitude of the current flow ($I_a$) at the base of the guided surface waveguide probe 300. Alternatively, a current clamp may be used around the conductor coupled to the ground stake (or grounding system) 715 to obtain an indication of the magnitude of the current flow ($I_o$).

The probe control system 321 can be implemented with hardware, firmware, software executed by hardware, or a combination thereof. For example, the probe control system 321 can include processing circuitry including a processor and a memory, both of which can be coupled to a local interface such as, for example, a data bus with an accompanying control/address bus as can be appreciated by those with ordinary skill in the art. A probe control application may be executed by the processor to adjust the operation of the guided surface waveguide probe 300 based upon monitored conditions. The probe control system 321 can also include one or more network interfaces for communicating with the various monitoring devices. Communications can be through a network such as, but not limited to, a LAN, WLAN, cellular network, or other appropriate communication network. The probe control system 321 may comprise, for example, a computer system such as a server, desktop computer, laptop, or other system with like capability.

The adaptive control system 330 can include one or more ground parameter meter(s) 333 such as, but not limited to, a conductivity measurement probe of FIG. 17A and/or an open wire probe of FIG. 17B. The ground parameter meter(s) 333 can be distributed about the guided surface waveguide probe 300 at, e.g., about the Hankel crossover distance ($R_x$) associated with the probe operating frequency. For example, an open wire probe of FIG. 17B may be located in each quadrant around the guided surface waveguide probe 300 to monitor the conductivity and permittivity of the lossy conducting medium as previously described. The ground parameter meter(s) 333 can be configured to determine the conductivity and permittivity of the lossy conducting medium on a periodic basis and communicate the information to the probe control system 321 for potential adjustment of the guided surface waveguide probe 300. In some cases, the ground parameter meter(s) 333 may communicate the information to the probe control system 321 only when a change in the monitored conditions is detected.

The adaptive control system 330 can also include one or more field meter(s) 336 such as, but not limited to, an electric field strength (FS) meter. The field meter(s) 336 can be distributed about the guided surface waveguide probe 300 beyond the Hankel crossover distance ($R_x$) where the guided field strength curve 103 (FIG. 1) dominates the radiated field strength curve 106 (FIG. 1). For example, a plurality of field meters 336 may be located along one or more radials extending outward from the guided surface waveguide probe 300 to monitor the electric field strength as previously described. The field meter(s) 336 can be configured to determine the field strength on a periodic basis and communicate the information to the probe control system 321 for potential adjustment of the guided surface waveguide probe 300. In some cases, the field meter(s) 336 may communicate the information to the probe control system 321 only when a change in the monitored conditions is detected.

Other variables can also be monitored and used to adjust the operation of the guided surface waveguide probe 300. For instance, the ground current flowing through the ground stake 715 (FIGS. 7A-7D) can be used to monitor the operation of the guided surface waveguide probe 300. For example, the ground current can provide an indication of changes in the loading of the guided surface waveguide probe 300 and/or the coupling of the electric field into the guided surface wave mode on the surface of the lossy conducting medium 303. Real power delivery may be determined by monitoring the excitation source 312. In some implementations, the guided surface waveguide probe 300 may be adjusted to maximize coupling into the guided surface waveguide mode based at least in part upon the current indication. By adjusting the phase delay ($\Phi=\theta_y+\theta_c$) supplied to the charge terminal $T_1$, the match with the wave tilt angle ($\Psi$) can be maintained for illumination at the complex Brewster angle for guided surface wave transmissions in the lossy conducting medium 303 (e.g., the earth). This can be accomplished by adjusting the tap position on the coil(s) 709. However, the ground current can also be affected by receiver loading. If the ground current is above the expected current level, then this may indicate that unaccounted loading of the guided surface waveguide probe 300 is taking place.

The excitation source 312 can also be monitored to ensure that overloading does not occur. As real load on the guided surface waveguide probe 300 increases, the output voltage of the excitation source 312, or the voltage supplied to the charge terminal $T_1$ from the coil, can be increased to increase field strength levels, thereby avoiding additional load currents. In some cases, the receivers themselves can be used as sensors monitoring the condition of the guided surface waveguide mode. For example, the receivers can monitor field strength and/or load demand at the receiver. The receivers can be configured to communicate information about current operational conditions to the probe control system 321. The information may be communicated to the probe control system 321 through a network such as, but not limited to, a LAN, WLAN, cellular network, or other appropriate communication network. Based upon the information, the probe control system 321 can then adjust the guided surface waveguide probe 300 for continued operation. For example, the phase delay ($\Phi=\theta_y+\theta_c$) applied to the charge terminal $T_1$ can be adjusted to maintain the electrical launching efficiency of the guided surface waveguide probe 300, to supply the load demands of the receivers. In some cases, the probe control system 321 may adjust the guided surface waveguide probe 300 to reduce loading on the excitation source 312 and/or guided surface waveguide probe 300. For example, the voltage supplied to the charge terminal $T_1$ may be reduced to lower field strength and prevent coupling to a portion of the most distant load devices.

The guided surface waveguide probe 300 can be adjusted by the probe control system 321 using, e.g., one or more tap controllers 339. In FIG. 18, the connection from the coil(s) 709 to the upper charge terminal $T_1$ is controlled by a tap controller 339. In response to a change in the monitored conditions (e.g., a change in conductivity, permittivity, and/or electric field strength), the probe control system can communicate a control signal to the tap controller 339 to initiate a change in the tap position. The tap controller 339 can be configured to vary the tap position continuously along one or more coil(s) 709 or incrementally based upon predefined tap connections. The control signal can include a specified tap position or indicate a change by a defined number of tap connections. By adjusting the tap position, the phase delay)) of the charge terminal $T_1$ can be adjusted to maintain and/or improve coupling of the guided surface waveguide mode.

The guided surface waveguide probe 300 can also be adjusted by the probe control system 321 using, e.g., a charge terminal control system 348 and/or a tank circuit control system 351. By adjusting the impedance of the charge terminal $T_1$ and/or the impedance of a lumped element tank circuit 730, it is possible to adjust the coupling into the guided surface waveguide mode. The charge terminal control system 348 can be configured to change the capacitance of the charge terminal $T_1$. The inductance 733 and/or capacitance 736 of the tank circuit 730 can be adjusted to vary the self-resonant frequency of the parallel circuit, and thus the terminal point impedance seen at the operating frequency of the guided surface waveguide probe 300. By adjusting the load impedance $Z_L$ of the charge terminal $T_1$ and/or the impedance $Z_t$ of the lumped element tank circuit 730 while maintaining $\Phi=\Psi$, resonance with respect to the conductive image ground plane can be maintained. In this way, coupling of the electric field to a guided surface waveguide mode along the surface of the lossy conducting medium 303 (e.g., earth) can be improved and/or maximized.

As has been discussed, the probe control system 321 of the adaptive control system 330 can monitor the operating conditions of the guided surface waveguide probe 300 by communicating with one or more remotely located monitoring devices such as, but not limited to, a ground parameter meter 333 and/or a field meter 336. The probe control system 321 can also monitor other conditions by accessing information from, e.g., the excitation source 312. Based upon the monitored information, the probe control system 321 can determine if adjustment of the guided surface waveguide probe 300 is needed to improve and/or maximize the launching efficiency. In response to a change in one or more of the monitored conditions, the probe control system 321 can initiate an adjustment of one or more of the phase delay ($\theta_y$, $\theta_c$) applied to the charge terminal $T_1$ and/or the load impedance $Z_L$ of the charge terminal $T_1$. In some implantations, the probe control system 321 can evaluate the monitored conditions to identify the source of the change. If the monitored condition(s) was caused by a change in receiver load, then adjustment of the guided surface waveguide probe 300 may be avoided. If the monitored condition(s) affect the launching efficiency of the guided surface waveguide probe 300, then the probe control system 321 can initiate adjustments of the guided surface waveguide probe 300 to improve and/or maximize the launching efficiency.

In some embodiments, the size of the charge terminal $T_1$ can be adjusted to control the load impedance $Z_L$ of the guided surface waveguide probe 300. For example, the self-capacitance of the charge terminal $T_1$ can be varied by changing the size of the terminal. The charge distribution can also be improved by increasing the size of the charge terminal $T_1$, which can reduce the chance of an electrical discharge from the charge terminal $T_1$. In other embodiments, the charge terminal $T_1$ can include a variable inductance that can be adjusted to change the load impedance $Z_L$. Control of the charge terminal $T_1$ size can be provided by the probe control system 321 through the charge terminal control system 348 or through a separate control system.

Figure 19A:
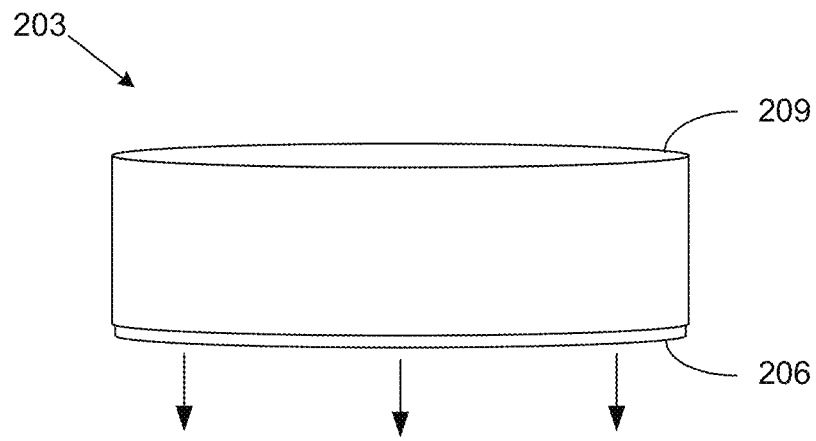
FIGS. 19A-19B and 20 are drawings of examples of variable terminals for use as a charging terminal according to various embodiments of the present disclosure.
Figure 19B:
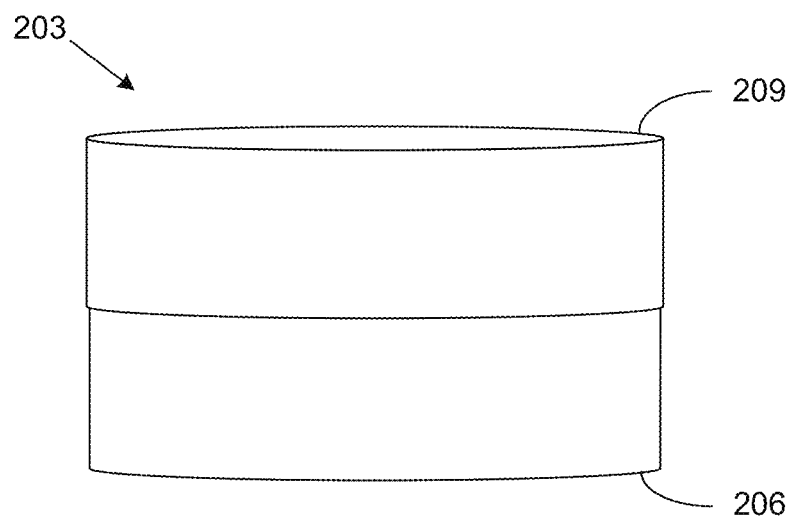

FIGS. 19A and 19B illustrate an example of a variable terminal 203 that can be used as a charge terminal $T_1$ of the guided surface waveguide probe 300 or a charge terminal $T_R$ of the tuned resonator 1406 (FIGS. 14B and 14C). For example, the variable terminal 203 can include an inner cylindrical section 206 nested inside of an outer cylindrical section 209. The inner and outer cylindrical sections 206 and 209 can include plates across the bottom and top, respectively. In FIG. 19A, the cylindrically shaped variable terminal 203 is shown in a contracted condition having a first size, which can be associated with a first effective spherical diameter. To change the size of the terminal, and thus the effective spherical diameter, one or both sections of the variable terminal 203 can be extended to increase the surface area as shown in FIG. 19B. This may be accomplished by using a driving mechanism such as an electric motor or hydraulic cylinder that is electrically isolated to prevent discharge of the charge on the terminal. In this way, the capacitance ($C_1$ or $C_R$) of the charge terminal $T_1$ or $T_R$, and thus the load impedance ($Z_L$ or $Z_R$) of the charge terminal $T_1$ or $T_R$, can be adjusted.

Figure 20:
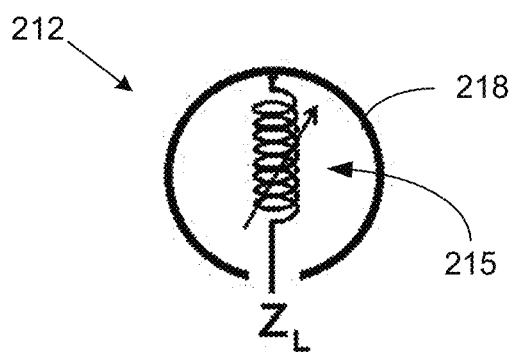

Referring next to FIG. 20, shown is a schematic representation illustrating a variable terminal 212 including a variable inductance 215 within the outer surface 218 of the terminal 212. By placing the variable inductor within the terminal 212, the load impedance $Z_L$ of the guided surface waveguide probe 300 of FIG. 3 (or the load impedance $Z_R$ of the tuned resonator 1406 of FIGS. 14B and 14C) can be adjusted by adjusting the inductance 215, without affecting the charge surface of the charge terminal $T_1$. In some embodiments, the variable terminal 203 of FIGS. 19A and 19B can include a variable inductance 215 within the cylindrical sections 206 and 209. Such a combination can provide a wider range of control over the load impedance $Z_L$ of the guided surface waveguide probe 300.

Figure 21A:
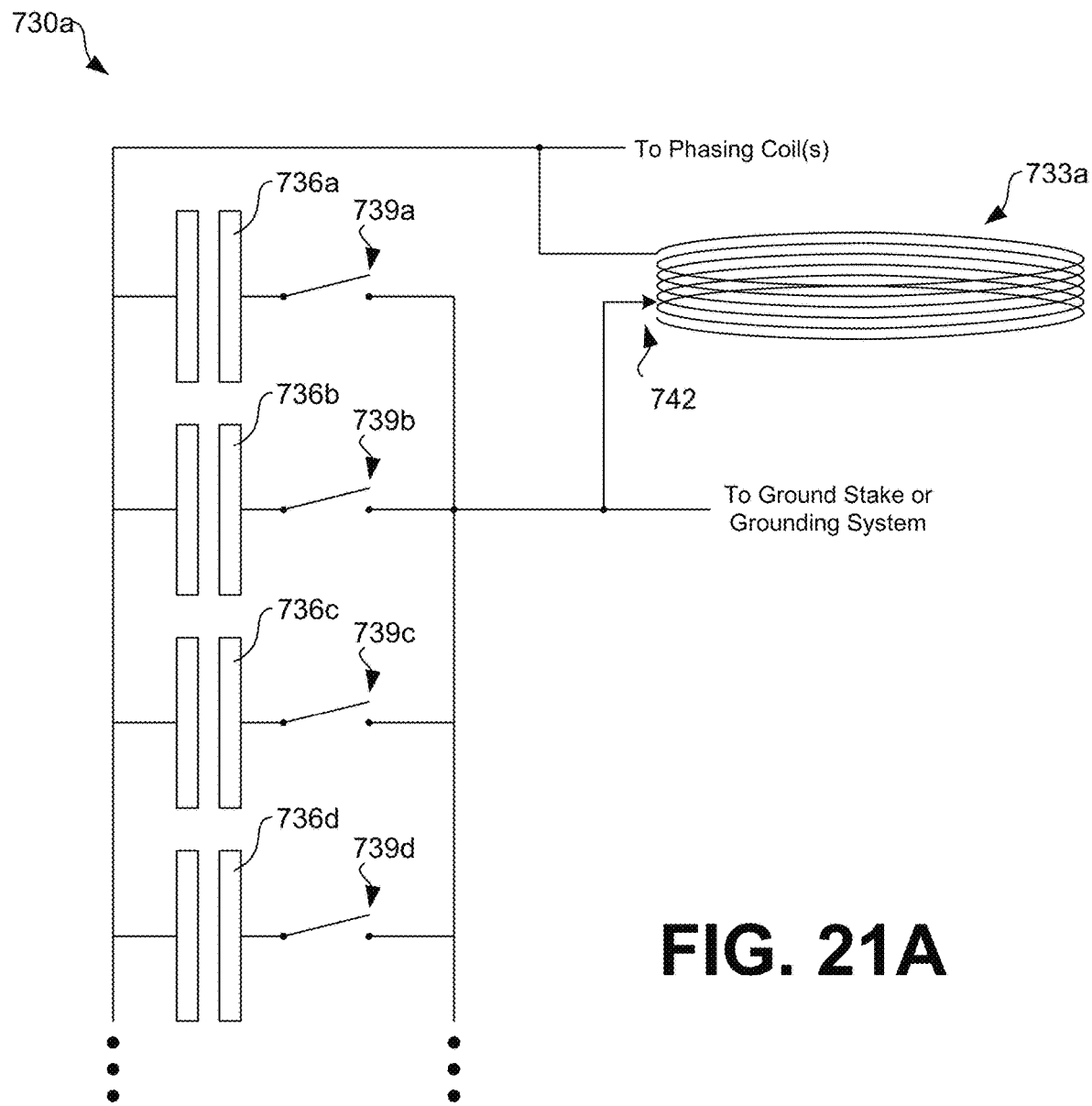
FIGS. 21A and 21B illustrate examples of tank circuits of a guided surface waveguide probe according to various embodiments of the present disclosure.

FIG. 21A illustrates an example of a lumped element tank circuit 730a of a guided surface waveguide probe 300 (e.g., FIGS. 7B-7D). The tank circuit 730a includes an inductive coil 733a, a number of parallel capacitors 736a-736d, and a number of switches 739a-739d corresponding to the parallel capacitors 736a-736d. With reference to the lumped element tank circuit 730 shown in FIGS. 7B-7D, the inductive coil 733a is analogous to the inductive coil 733 and the parallel capacitors 736a-736d are analogous to the capacitor 736. Note that although only a limited number of capacitors are shown, it is understood that any number of capacitors may be employed and switched into the tank circuit 730a as conditions demand. The lumped element tank circuit 730a can be electrically coupled at one end as shown in FIG. 21A to one or more coil(s) 709, such as one or more helical coil(s). The tank circuit 730a can be electrically coupled at the other end as shown in FIG. 21A to a ground stack or grounding system 715.

The capacitors 736a-736d can be embodied as any suitable type of capacitor and each can store the same or different amounts of charge in various embodiments, for flexibility. Any of the capacitors 736a-736d can be electrically coupled into the tank circuit 730a by closing corresponding ones of the switches 739a-739d. Similarly, any of the capacitors 736a-736d can be electrically isolated from the tank circuit 730a by opening corresponding ones of the switches 739a-739d. Thus, the capacitors 736a-736d and the switches 739a-739d can be considered a type of variable capacitor with a variable capacitance depending upon which of the switches 739a-739d are open (and closed). Thus, the equivalent parallel capacitance of the parallel capacitors 736a-736d will depend upon the state of the switches 739a-739d, thereby effectively forming a variable capacitor.

The inductive coil 733a can be embodied as a length of conductor, such as wire or pipe, for example, wrapped and supported around a coil support structure. The coil support structure may comprise a cylindrical body or other support structure to which the wire or pipe is attached in the form of a coil. In some cases, the connection from the inductive coil 733a to the ground stake or grounding system 715 can be adjusted using one or more taps 742 of the inductive coil 733a. Such a tap 742 may comprise, for example, a roller or other structure to facilitate easy adjustment. Alternatively, multiple taps 742 may be employed to vary the size of the inductive coil 733a, where one of the taps 742 is connected to the capacitors 736.

As described herein, a coil 709 such as a phasing coil (e.g., a helical coil) can provide both phase delay and phase shift. Further, the tank circuit 730a that includes the inductive coil 733a can provide a phase shift without a phase delay. In this sense, the inductive coil 733a comprises a lumped element assumed to have a uniformly distributed current throughout. In this respect, the inductive coil 733a is electrically small enough relative to the wavelength of transmission of the guided surface waveguide probe 300 such that any delay it introduces is relatively negligible. That is to say, the inductive coil 733a acts as a lumped element as part of the tank circuit 730a that provides an appreciable phase shift, without a phase delay.

Figure 21B:
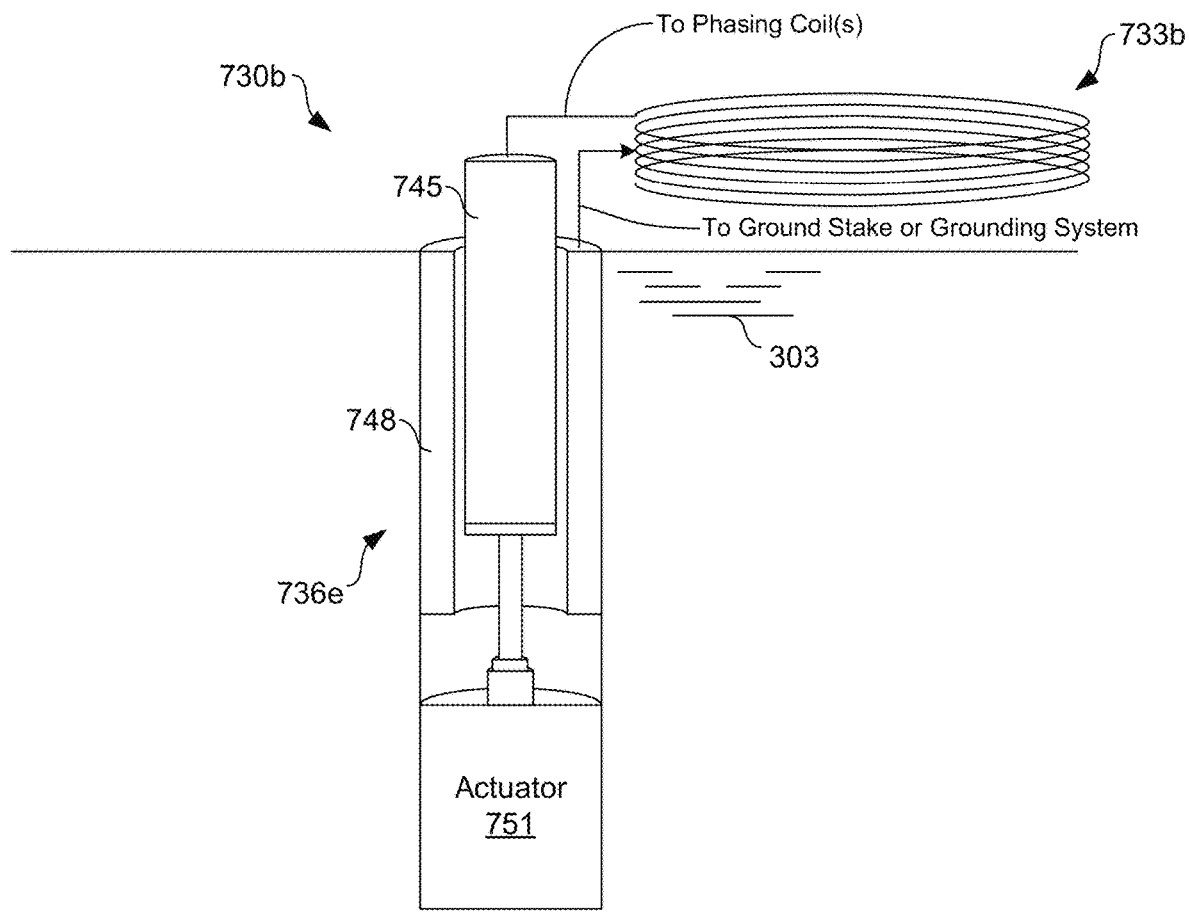

FIG. 21B illustrates another example tank circuit 730b of the guided surface waveguide probe 300 (FIGS. 7B-7D). As compared to the tank circuit 730a shown in FIG. 21A, the tank circuit 730b includes a variable capacitor 736e in place of the capacitors 736a-736d and switches 739a-739d. With reference to the tank circuit 730 shown in FIGS. 7B-7D, the inductive coil 733b is analogous to the inductive coil 733 and the variable capacitor 736e is analogous to the capacitor 736.

As shown, the variable capacitor 736e can be buried or embedded into the lossy conducting medium 303, such as the Earth. The variable capacitor 736e includes a pair of cylindrical, parallel charge conductors 745, 748 and an actuator 751. The actuator 751, for example, can be embodied as a hydraulic actuator that actuates a hydraulic piston. Alternatively, the actuator 751 may be embodied as an electric actuator that employs a motor or other electrical component that drives a screw shaft or other mechanical lifting structure. Further, the actuator 751 may be embodied as a pneumatic actuator that is employed to raise or lower a pneumatic cylinder. Still other types of actuators may be employed to move the inner charge conductor 745 relative to the outer charge conductor 748, or vice versa, or both. Also, some other type of actuator may be employed beyond those described herein.

The actuator 751 can be configured to raise and lower the inner charge conductor 745 within, or relative to, the outer charge conductor 748. By raising and lowering the inner charge plate 745 with respect to the outer charge plate 748, the capacitance of the variable capacitor 736e can be modified and, thus, the electrical characteristics of the tank circuit 730b adjusted. While the variable capacitor 736e is shown as being buried in the lossy conducting medium 303, it is understood that the variable capacitor 736e may also reside in a building or a substructure. Also, while the variable capacitor 736e is depicted as being cylindrical in shape, it is possible to use any shape such as rectangular, polygonal, or other shape.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. In addition, all optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another.

Therefore, the following is claimed:

1. A method, comprising:
   positioning a charge terminal at a defined height over a surface of a lossy conducting medium;
   adjusting a traveling wave phase delay ($\Phi$) of a feed network connected to the charge terminal to match a wave tilt angle ($\Psi$) corresponding to a complex Brewster angle of incidence ($\theta_{i,B}$) associated with the lossy conducting medium;
   adjusting a lumped element tank circuit in the feed network to substantially match a 90 degree standing wave phase shift between the charge terminal and a conducting image ground plane located a complex distance below the surface of the lossy conducting medium; and
   exciting the charge terminal with an excitation voltage via the feed network, where the excitation voltage establishes an electric field that couples into a guided surface waveguide mode along the surface of the lossy conducting medium.

2. The method of claim 1, wherein the feed network comprises a feed line conductor coupled to the charge terminal and at least one coil coupled between the lossy conducting medium and the lumped element tank circuit, where the traveling wave phase delay ($\Phi$) of the feed network includes a phase delay ($\theta_y$) associated with the feed line conductor and a phase delay ($\theta_c$) associated with the at least one coil.

3. The method of claim 2, wherein adjusting the traveling wave phase delay ($\Phi$) comprises adjusting the phase delay ($\theta_c$) associated with the at least one coil.

4. The method of claim 1, wherein the complex Brewster angle of incidence ($\theta_{i,B}$) associated with the lossy conducting medium is based upon an operational frequency of the excitation voltage and characteristics of the lossy conducting medium.

5. The method of claim 4, wherein the characteristics of the lossy conducting medium include conductivity and permittivity.

6. The method of claim 1, wherein an image ground plane impedance ($Z_{in}$) is based at least in part upon a phase shift ($\theta_d$) between a physical boundary of the lossy conducting medium and the conducting image ground plane.

7. The method of claim 1, wherein an impedance ($Z_t$) of the lumped element tank circuit is adjusted based upon a reactive component of an image ground plane impedance ($Z_{in}$).

8. The method of claim 7, wherein the impedance ($Z_t$) of the lumped element tank circuit is adjusted to match the reactive component of the image ground plane impedance ($Z_{in}$) with a structure impedance ($Z_{tuning}$) associated with the feed network comprising the lumped element tank circuit and the charge terminal.

9. The method of claim 1, wherein the traveling wave phase delay ($\Phi$) of the feed network is fixed while an impedance ($Z_t$) of the lumped element tank circuit is adjusted.

10. The method of claim 1, wherein the charge terminal is coupled to an excitation source via one or a plurality of coils in the feed network.

11. The method of claim 1, comprising:
    sensing a change in a characteristic of the lossy conducting medium;
    adjusting the traveling wave phase delay ($\Phi$) of the feed network connected to the charge terminal to match a modified wave tilt angle in response to the change in the characteristic of the lossy conducting medium, the modified wave tilt angle corresponding to a complex Brewster angle of incidence associated with the lossy conducting medium having the changed characteristic; and
    adjusting an impedance ($Z_t$) of the lumped element tank circuit based upon a new image ground plane impedance based upon the lossy conducting medium having the changed characteristic.

12. The method of claim 1, wherein the lossy conducting medium is a terrestrial medium.

13. A guided surface waveguide probe, comprising:
    a charge terminal elevated over a surface of a lossy conducting medium; and
    a feed network configured to couple an excitation source to the charge terminal, the feed network configured to provide a voltage to the charge terminal with a traveling wave phase delay ($\Phi$) that matches a wave tilt angle ($\Psi$) associated with a complex Brewster angle of incidence ($\theta_{i,B}$) associated with the lossy conducting medium and a 90 degree standing wave phase shift between the charge terminal and a conducting image ground plane located a complex distance below the surface of the lossy conducting medium, the feed network comprising a lumped element tank circuit adjusted based upon an image ground plane impedance ($Z_{in}$) associated with the lossy conducting medium and the traveling wave phase delay ($\Phi$).

14. The guided surface waveguide probe of claim 13, wherein the feed network comprises a feed line conductor coupled to the charge terminal and at least one coil coupled between the lumped element tank circuit and the feed line conductor, where the traveling wave phase delay ($\Phi$) of the feed network includes a phase delay ($\theta_y$) associated with the feed line conductor and a phase delay ($\theta_c$) associated with the at least one coil.

15. The guided surface waveguide probe of claim 14, wherein the at least one coil comprises a plurality of helical coils.

16. The guided surface waveguide probe of claim 14, wherein the lumped element tank circuit comprises an inductor and a variable capacitor connected in parallel.

17. The guided surface waveguide probe of claim 16, wherein the excitation source is magnetically coupled to the inductor of the lumped element tank circuit.

18. The guided surface waveguide probe of claim 14, wherein the excitation source is magnetically coupled to the at least one coil.

19. The guided surface waveguide probe of claim 13, comprising a probe control system configured to adjust the feed network based at least in part upon characteristics of the lossy conducting medium.

20. The guided surface waveguide probe of claim 19, wherein the probe control system adjusts a variable inductor or a variable capacitor of the lumped element tank circuit in response to a change in the characteristics of the lossy conducting medium.

* * * * *